(12) United States Patent
Hoellerer et al.

(10) Patent No.: US 7,263,667 B1
(45) Date of Patent: Aug. 28, 2007

(54) METHODS, APPARATUS AND DATA STRUCTURES FOR PROVIDING A USER INTERFACE WHICH FACILITATES DECISION MAKING

(75) Inventors: Tobias Hans Hoellerer, New York, NY (US); George G. Robertson, Seattle, WA (US); David D. Thiel, Redmond, WA (US); Daniel C. Robbins, Seattle, WA (US); Maarten R. van Dantzich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/329,140

(22) Filed: Jun. 9, 1999

(51) Int. Cl.
*G06F 3/00* (2006.01)

(52) U.S. Cl. .................. 715/782; 715/804; 715/805; 715/738; 715/745

(58) Field of Classification Search ............... 345/782, 345/848, 850, 857; 715/757, 782, 804, 848, 715/738, 745, 805, 512, 537, 541
See application file for complete search history.

(56) References Cited

U.S. PATENT DOCUMENTS

| | | | | |
|---|---|---|---|---|
| 5,303,388 A | * | 4/1994 | Kreitman et al. | 345/836 |
| 5,678,015 A | * | 10/1997 | Goh | 345/419 |
| 5,689,287 A | * | 11/1997 | Mackinlay et al. | 345/427 |
| 5,745,109 A | * | 4/1998 | Nakano et al. | 345/781 |
| 5,754,809 A | * | 5/1998 | Gandre | 715/782 |
| 5,880,733 A | * | 3/1999 | Horvitz et al. | 345/848 |
| 6,088,032 A | * | 7/2000 | Mackinlay | 715/848 |
| 6,182,098 B1 | * | 1/2001 | Selker | 345/649 |
| 6,229,542 B1 | * | 5/2001 | Miller | 715/782 |
| 6,240,421 B1 | * | 5/2001 | Stolarz | 345/419 |
| 6,297,824 B1 | * | 10/2001 | Hearst et al. | 345/848 |
| 6,363,404 B1 | * | 3/2002 | Dalal et al. | 345/582 |
| 6,577,304 B1 | * | 6/2003 | Yablonski et al. | 345/419 |
| 6,577,330 B1 | * | 6/2003 | Tsuda et al. | 715/782 |
| 6,597,358 B2 | * | 7/2003 | Miller | 345/427 |
| 6,710,788 B1 | * | 3/2004 | Freach et al. | 715/778 |

OTHER PUBLICATIONS

R.L. Kullberg, "Dynamic Timelines, Visualizing Historical Information in Three Dimensions", downloaded on Aug. 5, 1998 from http://robin.www.media.mit.edu/people/robin/thesis/toc.html.
Microsoft Expedia.com, downloaded on Jul. 30, 1998 from http://expedia.msn.com/daily/home/default-contents.hts?.
R. Stoakley et al, "Virtual Reality on a WIM: Interactive Worlds in Miniature", The University of Virginia, Department of Computer Science, downloaded on Jul. 30, 1998 from http://www.cs.virginia.edu/~uigrou...ions/95/conferences/chi/paper.html.

(Continued)

*Primary Examiner*—Ba Huynh
(74) *Attorney, Agent, or Firm*—Amin & Turocy, LLP

(57) ABSTRACT

A user interface for facilitating a decision making process, such as planning a trip. A unified view of various types of information related to an event may be provided. The unified view may be presented in a simulated three-dimensional environment having different types of information depicted on different windows. Different types of information related to a common event may be visually linked. A window showing a particular type of information may be brought into a focus view for closer inspection by a user. Alternative decisions may be depicted to permit vagueness or uncertainty, particularly at early iterations in the decision making process.

49 Claims, 46 Drawing Sheets

OTHER PUBLICATIONS

L. Tweedie et al, "The Attribute Explorer, Video Proceedings", *CHI'94 Boston, MA*, downloaded on Jul. 29, 1998 from http://www.ee.ic.ac.uk/research/information/www/LisaDir/attv.html.

P. Lucas et al, "Exploring Information with Visage", downloaded on Jul. 29, 1998 from http://www.maya.com/visage/base/papers/mayaVid.htm.

L. Tweedie et al, "Externalising Abstract Mathematical Models", *proceedings of CHI'96*, Vancouver, Canada, downloaded on Jul. 29, 1998 from http://www.ee.ic.ac.uk/research/in...tion/www/LisaDir/CHI96/ltltxt.html.

Visage: Features, downloaded on Jul. 29, 1998 from http://www.maya.com/visage/base/feature.html.

Visage: The Future, downloaded on Jul. 29, 1998 from http://www.maya.com/visage/base/future.html.

L. Tweedie et al, "The Influence Explorer (video)—a tool for design", Department of Electrical and Electronic Engineering, Imperial College of Science, downloaded on Jul. 29, 1998 from http://www1.acm.org:81/sigchi/chi9...ceedings/videos/Tweedie/lt2txt.htm.

Multi-D Olive, Background, downloaded on Jul. 29, 1998 from http://www.otal.umd.edu/Olive/Frames/Multi-D.html.

IBM, New data analysis software encourages worlds of discovery, downloaded on Jul. 29, 1998 from http://www.ibm.com?news/95020/pve-01.html.

Visage: A Scenario, downloaded on Jul. 29, 1998 from http://www.maya.com/visage/base/scenario.html.

Technical, downloaded on Jul. 29, 1998 from http://www.maya.com/visage/base/technical.html.

S.F. Roth et al, "Towards an Information Visualization Workspace: Combining Multiple Means of Expression", dwonloaded on Jul. 29, 1998 from http://www.cs.cmu.edu/~sage/HCI-journal-96/HCI-journal.html.

H. Dawkes et al, "VICKI-The VIsualisation Construction KIt", downloaded on Jul. 29, 1998 from http://www.ee.ic.ac.uk/research/information/www.LisaDir/VICKI/VICKI.html.

Visage, "Welcome to Visage", downloaded on Jul. 29, 1998 from http://www.maya.com/visage/.

Visage, "Information-Centric Data Visualization", downloaded on Jul. 29, 1998 from http://www.maya.com/visage/base/.

P. Lucas et al, "Visage: Dynamic Information Exploration", downloaded on Jul. 29, 1998 from http://www.maya.com/visage/base/papers/mayaDemo.htm.

Visage, "Using Visage-Link", Polymorphic Shared Frame, downloaded on Jul. 29, 1998 from http://www.maya.com/visage/link/shar_pol.html.

Visage, "Using Visage-Link, Shared Frame", downloaded on Jul. 29, 1998 from http://www.maya.com/visage/link/shar_reg.html.

Visage, "Using Visage-Web, Collaboration", downloaded on Jul. 29, 1998 from http://www.maya.com/visage/web/coll.html Visage, "Using Visage-Web, Integration", downloaded on Jul. 29, 1998 from http://www.maya.com/visage/web/inte.html.

Visage, "Using Visage-Web, Navigation", downloaded on Jul. 29, 1998 from http://www.maya.com/visage/web/navi.html.

Visage, "Visage-Link", downloaded on Jul. 29, 1998 from http://www.maya.com/visage/link/.

Visage, "Visage-Web", downloaded on Jul. 29, 1998 from http://www.maya.com/visage/web/.

Visage System, downloaded on Jul. 29, 1998 from http://www.cs.cmu.edu/Groups/sage/project/visage.html.

J. Kolojejchick et al, "Information Appliances and Tools in Visage", Jul./Aug. 1997.

* cited by examiner

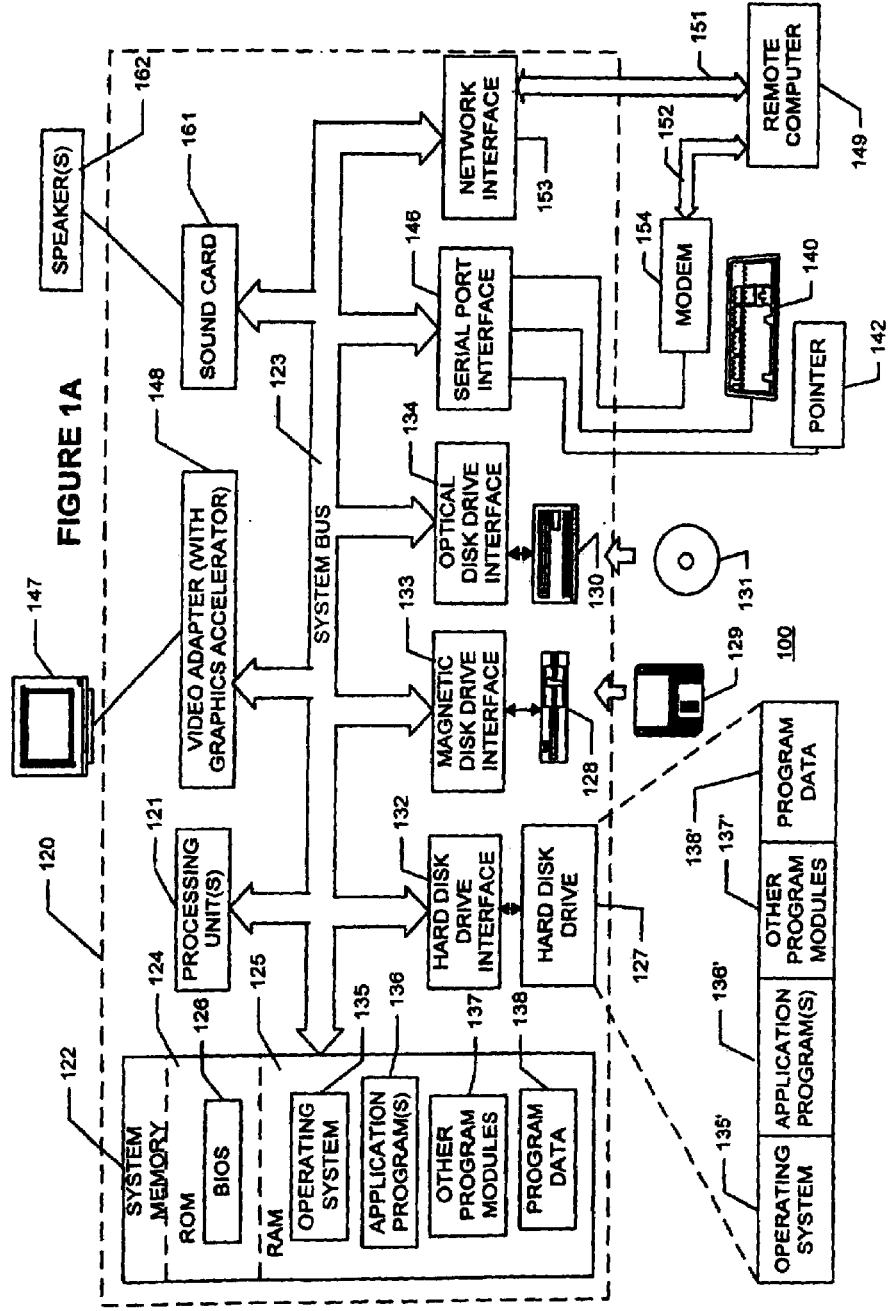

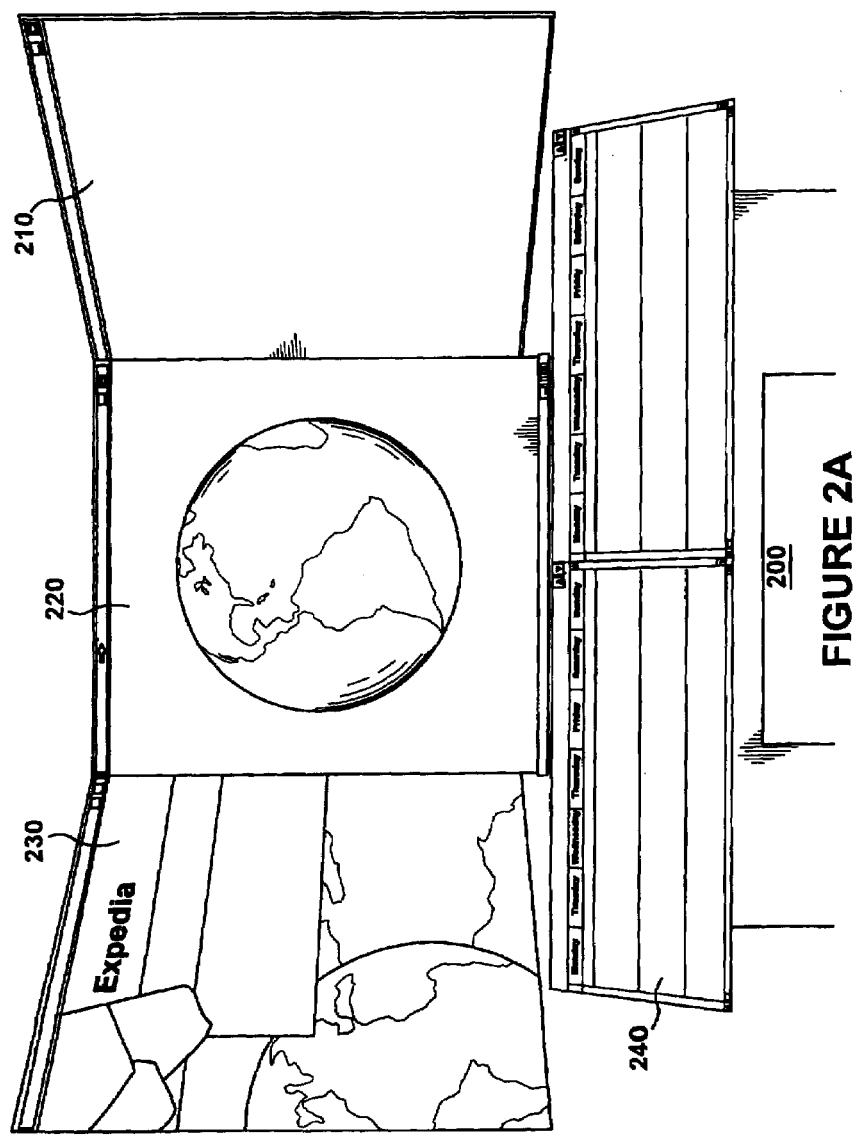

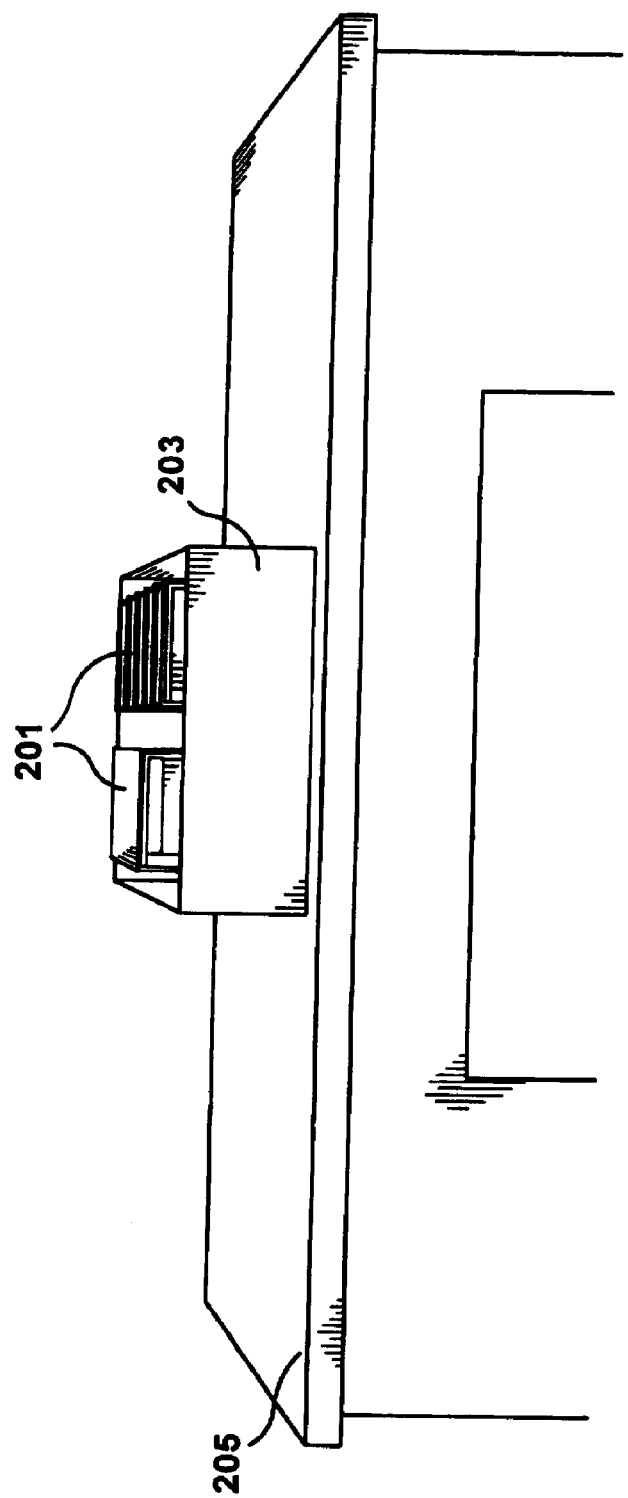

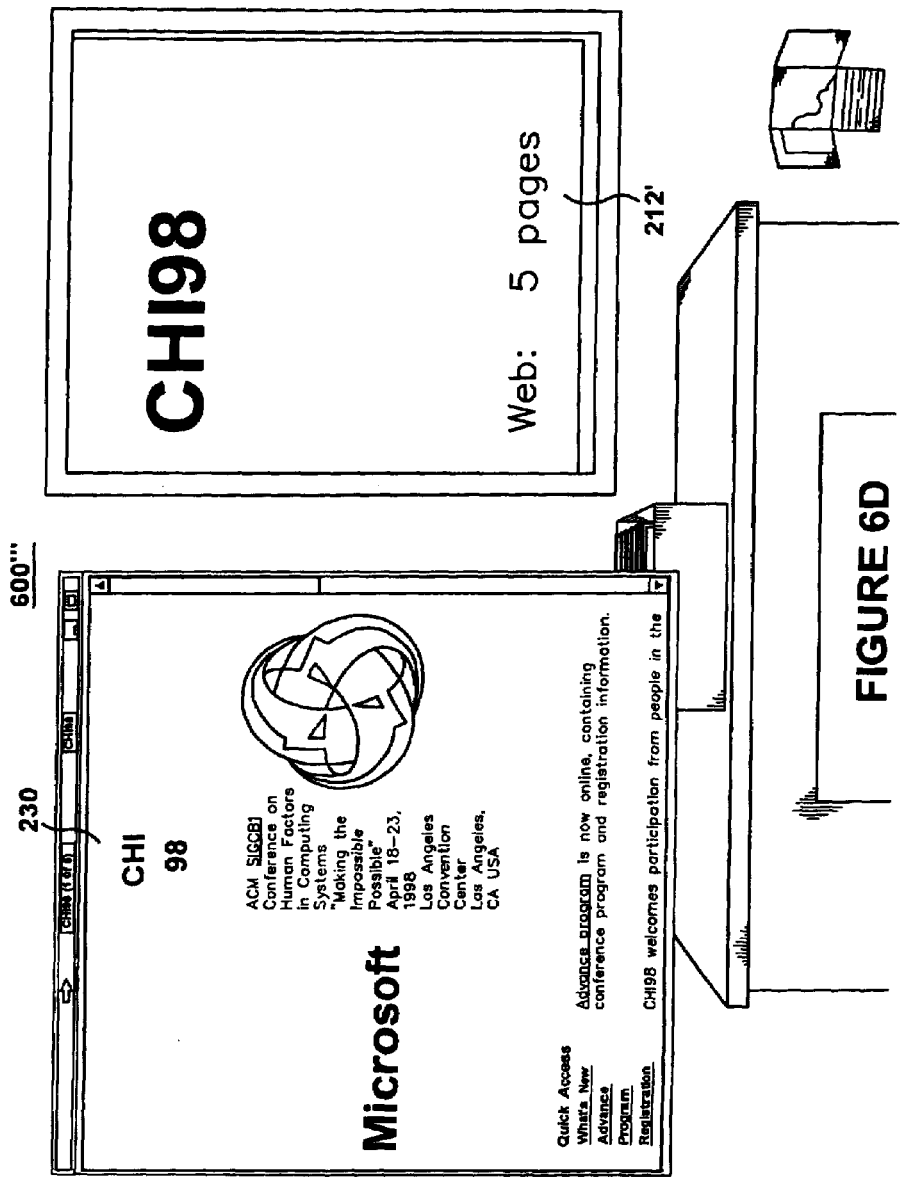

| NOTE ID | NOTE LOCATION | NOTE STATE (ACTIVE?) | NOTE TEXT | ... |
|---|---|---|---|---|
| 912 | 914 | 916 | 918 | |

| ALTERNATIVE ID | FIRST EVENT START TIME | FIRST EVENT END TIME | ... | $n^{th}$ EVENT START TIME | $n^{th}$ EVENT END TIME | ... |
|---|---|---|---|---|---|---|
| 1012 | 1014a | 1016a | | 1014b | 1016b | |

| RELATED INFORMATION ID | RELATED INFORMATION RANK | RELATED INFORMATION STATE | ... |
|---|---|---|---|
| 1112 | 1114 | 1118 | |

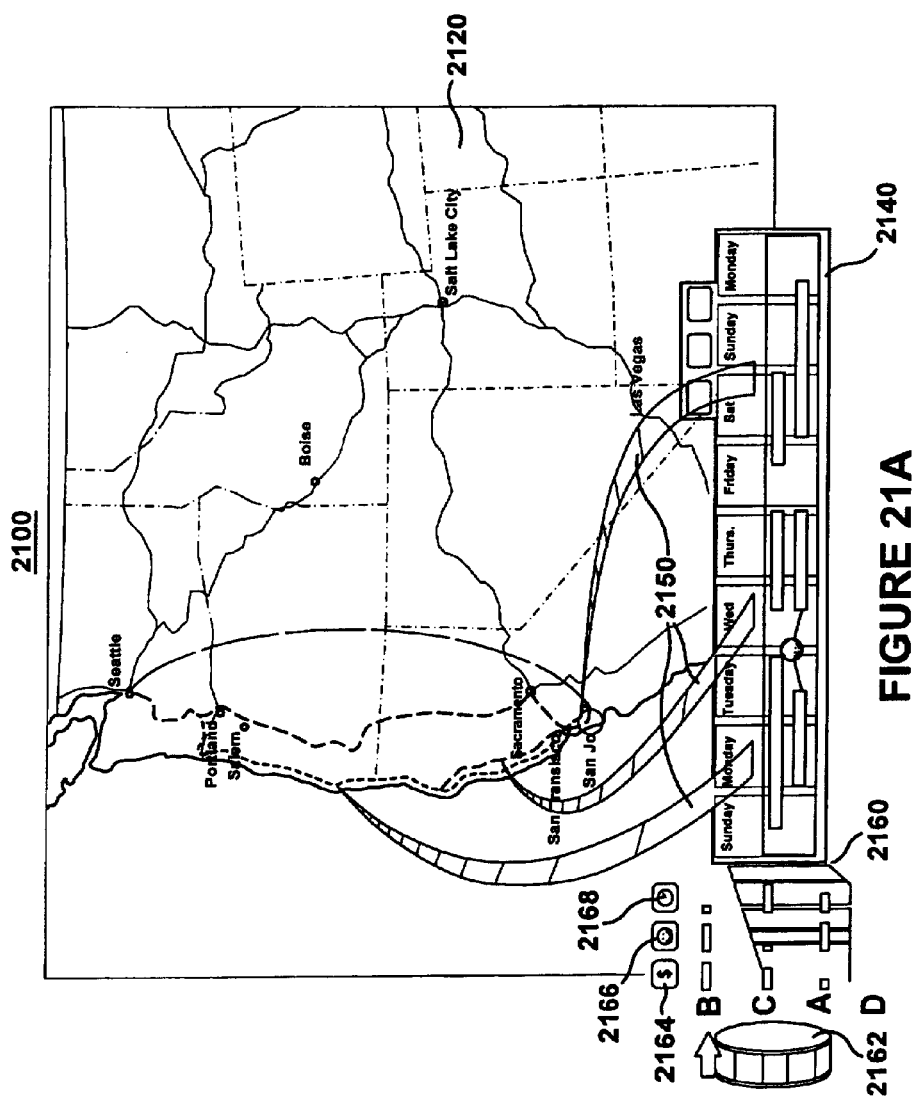

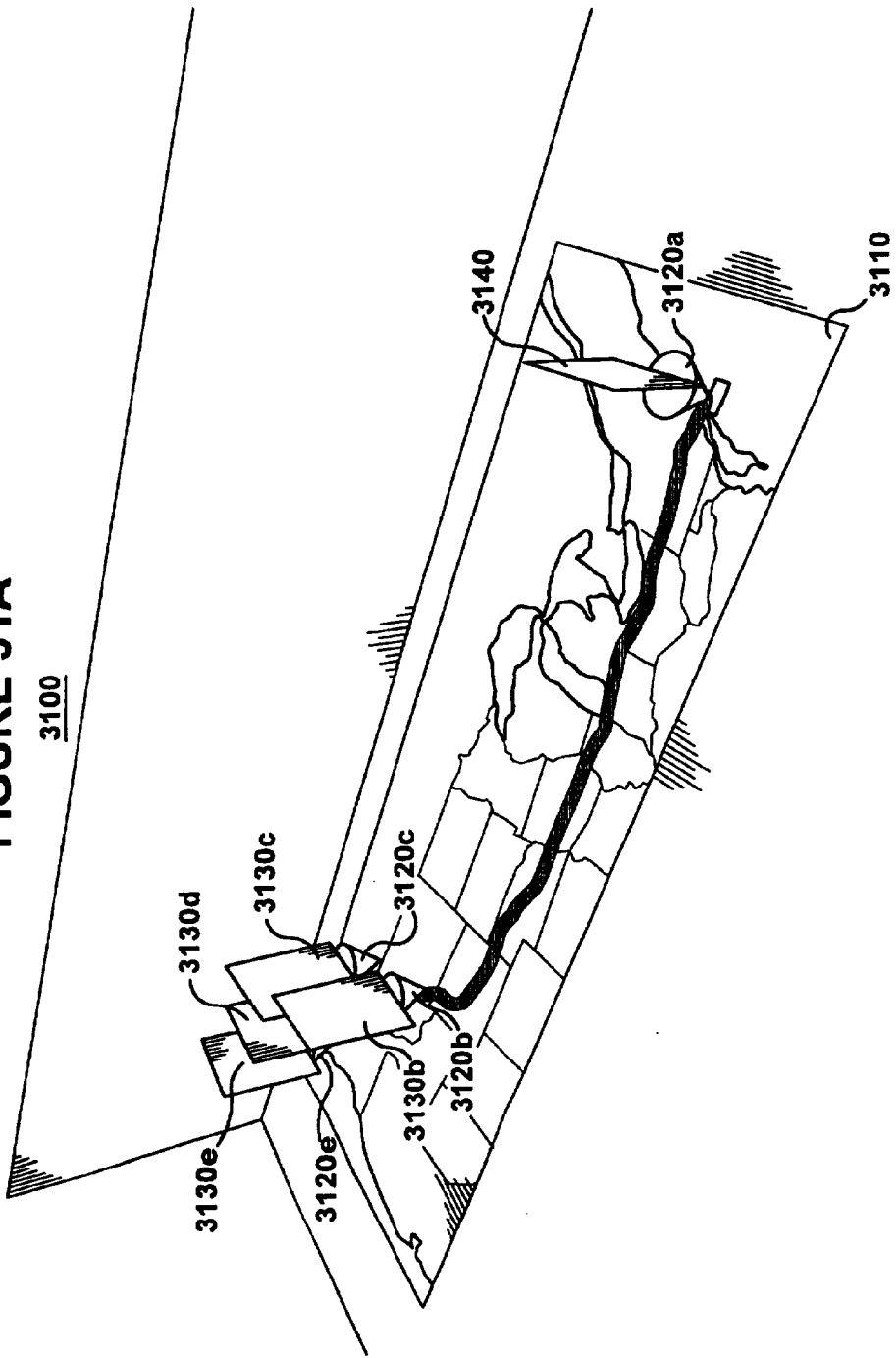

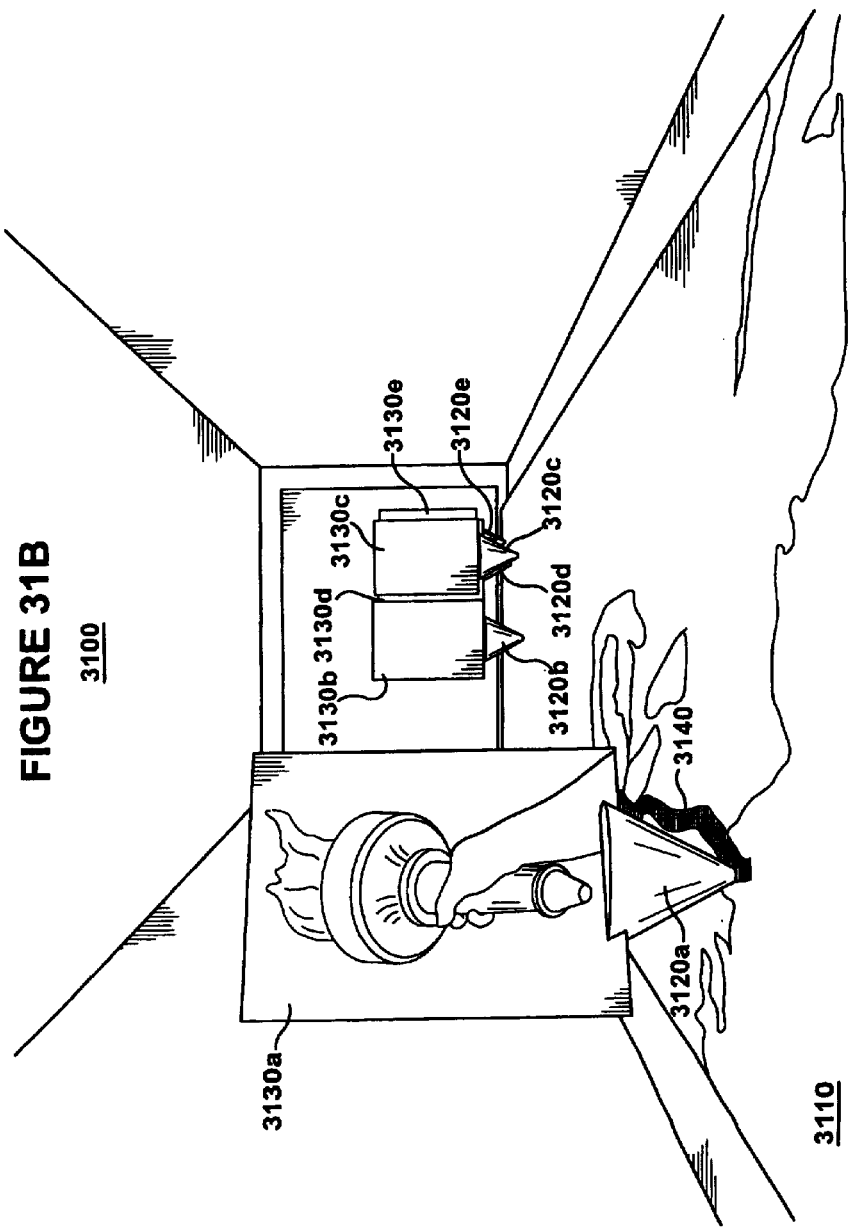

METHODS, APPARATUS AND DATA STRUCTURES FOR PROVIDING A USER INTERFACE WHICH FACILITATES DECISION MAKING

§ 1. BACKGROUND OF THE INVENTION

§ 1.1 Field of the Invention

The present invention concerns a user interface which facilitates a decision making process, for example, for planning a trip. In particular, the present invention concerns a user interface that visually links related information rendered in multiple windows. Alternative choices may be visually depicted.

§ 1.2 Related Art

§ 1.2.1 The Problem of Decision Making and Planning

Over the past few decades, two trends have permitted computer users to access a wealth of data and information. The first trend was the explosion in the amount of relatively inexpensive data storage means. The second trend was the increasing interconnection of computers, first by local area networks (or "LANs"), and more recently by wide area networks (or "WANs") which may be private, such as intranets for example, or public, such as the Internet for example. Both of these trends are expected to continue.

Although computer users now can access a wealth of data and information, challenges in interpreting data and using data and information to complete tasks remain. Applications for statistically processing data and for visually depicting (e.g., with pie charts, bar charts, graphs) data are widely available. Similarly, using data and information to complete relatively simple tasks is straight forward (e.g., determining the least expensive three or four bedroom home in Virginia using a relational data base).

However, many tasks involve making decisions based on a number of factors (or choices) and are subject to initial uncertainty or vagueness. Such decisions typically require fixing or limiting the value of one or more factors (or choosing), interpreting the result, and iterating towards a desirable result. For example, in the context of planning a trip, factors may include (i) what one wants to do, (ii) when one wants to do it, (iii) where one wants to go, (iv) how much one wants to spend, etc. Choices in a group of factors may limit choices in that group or another group. That is, options are narrowed as choices are made or factors are fixed. For example, if a person defines a budget of $1000.00 for a vacation, and decides to spend $400.00 on airfare and $400.00 on hotel accommodations, and decides that they will need $150.00 for meals, that person will not have the option of a $200.00 helicopter tour unless they increase their budget.

Again, in the context of planning a trip, such as a personal vacation for example, a person in Virginia might want to see a Washington Redskins football game, visit an aquarium, visit Aunt Betty in Delaware, see the Statue of Liberty and see autumn foliage. Time constraints should be accounted for. For example, when will a user's work schedule allow them to take a vacation, on what dates do the Washington Redskins play at home, when are aquariums and the Statue of Liberty open, when will Aunt Betty be home. Places may be determined. For example, do I want to see autumn foliage in Virginia or Vermont and do I want to visit the public aquarium in Baltimore, Md. or Camden, N.J. Budgetary limits may also be checked. For example, are those Redskins tickets going to cost too much? As choices are made, other choices are affected. For example, the peak time for autumn foliage in Vermont is late September, but the peak time for autumn foliage in Virginia is mid October. Further, data and information related to each of the factors may be best represented to a user in different ways. For example, time or date factors may be best represented on a calendar, cost factors may be best represented as a summed number, geographic factors may be best represented on a map, etc.

§1.2.2 Known Decision Making User Interfaces and their Perceived Limitations The foregoing trip planning scenario illustrates the challenges involved in performing or planning complex tasks having a number of variables. The articles: L. Tweedie, R. Spence, D. Williams, and R. Bhoghal, "The Attribute Explorer", *Video Proceedings, CHI '94*, Boston, Mass., ACM Press (1994), downloaded from http://www.ee.i-c.ac.uk/resarch/information/www/LisaDir/at tv.html on Jul. 29, 1998 (hereafter referred to as "the Attribute Explorer article") and H. Dawkes, L. Tweedie, and R. Spence, "VICKI—The VIsualisation Construction KIt", *Advanced Visual Interfaces Conference*, Gubbio, Italy (May 27–29), downloaded from http://www.ee.ic.ac.uk/research/information/www/LisaDir/V ICKI/VICKI.html on Jul. 29, 1998 (hereafter referred to as "the VICKI article") discuss tools for exploring "problem space" using a two dimensional graphical user interface (or "GUI"). The GUIs discussed in the Attribute Explorer and VICKI articles use sliders to permit parameters to be adjusted. Results are then fed back to the user via color coded histograms. More specifically, the Attribute Explorer and VICKI articles discuss manipulating factors (e.g., type, price, number of bedrooms, and garden size) in a house purchase task or decision. The various attributes are related via color.

Unfortunately, the GUIs discussed in the Explorer and VICKI articles are two dimensional and depict data related to various factors in the same way. Therefore, it is believed that these GUIs are not as useful when various types of data or information are best depicted in different ways.

The article, L. Tweedie, R. Spence, H. Dawkes, and H. Su, "The Influence Explorer—A Tool for Design", downloaded from http://www1.acm.org:81/sigchi . . . ceedings/videos/Tweedie/I t2txt.htm on Jul. 29, 1998 (hereafter referred to as "the Influence Explorer article") discusses a similar GUI in which the relationships between performance results and design parameters are depicted. Unfortunately, as with the GUIs discussed in the Attribute Explorer and VICKI articles, the GUI discussed in the Influence Explorer article is one dimensional and depicts data related to various factors in the same way. Therefore, it is believed that this GUI is not as useful when various types of data or information are best depicted in different ways.

The VISAGE product, from MAYA Design Group, Inc. of Pittsburgh, Pa. permits information objects to be depicted in various frames (e.g., a hierarchical outline, a bar chart, and a map). Using a hierarchical outline, a user can navigate through the information by "drilling down" (or segmenting aggregated data) and "rolling up" (or aggregating segmented data). Each of the frames has a script which governs the appearance of objects that the frame contains. Color is used to coordinate the same object shown in various frames. Objects can be dragged and dropped within and between various frames. Although the VISAGE product depicts data in various ways, the same data (not merely related information) is depicted in each of the frames. Furthermore, the VISAGE product depicts objects in frames in only one or two dimensions. The VISAGE product is discussed in the articles: S. Roth, M. Chuah, S. Keredjiev, J. Kolojujchick and P. Lucas, "Towards and Information Visualization Workspace: Combining Multiple Means of Expression", downloaded from http:www.cs.cmu,edu/~sage/HCI-journal-96/HCI-journal.html on Jul. 29, 1998; J. Kolojujchick, S. Roth, and P. Lucas, "Information Appliances and Tools in Visage", *IEEE Computer Graphics and Applications*, pp. 32–41 (July/August 1997); P. Lucas and S. Roth, "Exploring Information with Visage", downloaded from http://www.maya.com/visage/base/papers/mayaVid.htm on Jul. 29, 1998; and P. Lucas, C. Gomberg, and S. Roth, "Visage: Dynamic Information Exploration", downloaded from http://www.maya.com/visage/base/papers/mayaDemo.htm on Jul. 29, 1998.

None of the "decision making" user interfaces introduced above exploit three-dimensional graphics. As discussed in § 1.2.2.1 below, some known three dimensional user interfaces are concerned with accessing information, but not with using information when making decisions.

§ 1.2.2.1 Known Three Dimensional User Interfaces to Information

User interfaces providing a three dimensional depiction of related information have been discussed. For example, the article: Robertson, et al., "The Next Generation GUIs: Information Visualization Using 3D Interactive Animation," *Communications of the ACM*, Vol. 35, No. 4, pages 57–71 (April 1993) (hereinafter referred to as "the Information Visualizer article") discusses various proposals for an "Information Workspace". The Information Visualizer article discusses a perspective wall which permits information, having some sort of linear relationship or thread, to be presented in the relatively narrow aspect ratio of a typical video monitor. When an item is selected, the wall moves the item to a center panel as if it were a sheet in a player piano reel. Its intuitive three dimensional metaphor allows smooth transitions among views, thereby helping a user to perceive object constancy. Files may be classified by their modification date. Although the perspective wall technique lends itself to information having a linear (e.g., timeline) thread, it is less useful for other types of information, or for information in which a linear thread is unimportant. Furthermore, the perspective wall is not specifically designed for facilitating an iterative planning or decision making process.

Similarly, in the video, R. Kullberg, "Dynamic Timelines: Visualizing the History of Photography", *CHI '96 Video Program*, first 4:19, also discussed in the thesis of the same title, downloaded from http://robin.www.media.mit.ed/people/robin/thesis on Aug. 5, 1998 (hereafter referred to as "the Dynamic Timelines thesis"), a three dimensional user interface to photographs is discussed. Unfortunately, the photographs have a linear, and more specifically, a temporal, thread. Also, like the perspective wall, the dynamic timeline is not specifically designed for facilitating an iterative planning or decision making process.

§ 1.2.3 Unmet Needs

In view of the foregoing, there is an unmet need for a user interface which facilitates planning or making decisions based on a number of factors (or choices). Since factors may be subject to initial uncertainty or vagueness, such a user interface should facilitate an iterative planning or decision making process, allowing the user to make partial and/or vague decisions during the process. The results of alternative decisions should be visualized. Relationships between information should be depicted. These depictions are not limited to relating the same information shown in different ways. The user interface should permit a single display to include different windows of different types of related information such that a unified view of the task is presented to a user. However, the user interface should permit easy user interaction with any one of the different windows. Finally, intelligent help and access to information that may be needed or useful to complete the task should be provided to the user.

§ 2. SUMMARY OF THE INVENTION

The present invention provides a graphical user interface in which a number of windows or planes depict different types of related information. The consequences of changes to one type of information on one window are depicted in the other types of information on the other windows.

The present invention may further provide a graphical user interface in which the relationship between information in various windows is visually depicted, for example using color and colored rays. The colored rays may be translucent so that they do not occlude any information "behind" them.

The present invention may simulate a three dimensional environment including different windows or planes having the different types of information. The windows or planes may be related to one another as surfaces of a folded paper, or as facets of a geometric object that are connected with one another. The present invention may permit any plane or window to be brought into a normal, head on, view (referred to as "focus view") and depicted at a centered position on the display. In this regard, the present invention may permit the user to navigate between various windows, bringing any one of the windows into a focus view at any given time. The present invention may represent the windows as surfaces or facets on a geometric object, such as a cube for example, and may employ animation when a user navigates from one window to another. The present invention may use "world-in-miniature" (or "WIM") techniques in addition to, or instead of the representation of the windows on a geometric object, to facilitate navigation.

Finally, the present invention may facilitate the generation of queries, to be launched via an information browser, from words or phrases of free form notes. The present invention may recognize relevant facts (e.g., in the context of a trip planner, recognize dates, places, etc.) in one information type to generate related information in another information type.

§ 3. BRIEF DESCRIPTION OF THE DRAWINGS

FIG. 1A is a personal computer on which the user interface of the present invention may be effected. FIG. 1B is a machine on which the user interface of the present invention may be effected.

FIGS. 2A and 2B are displays of default views of a user interface in accordance with an exemplary embodiment of the present invention. FIG. 2C is a display of folders, such as that of FIGS. 2A and 2B, arranged in a box. FIG. 2D is a display of the box of folders of FIG. 2C on a desktop.

Figure 6A:
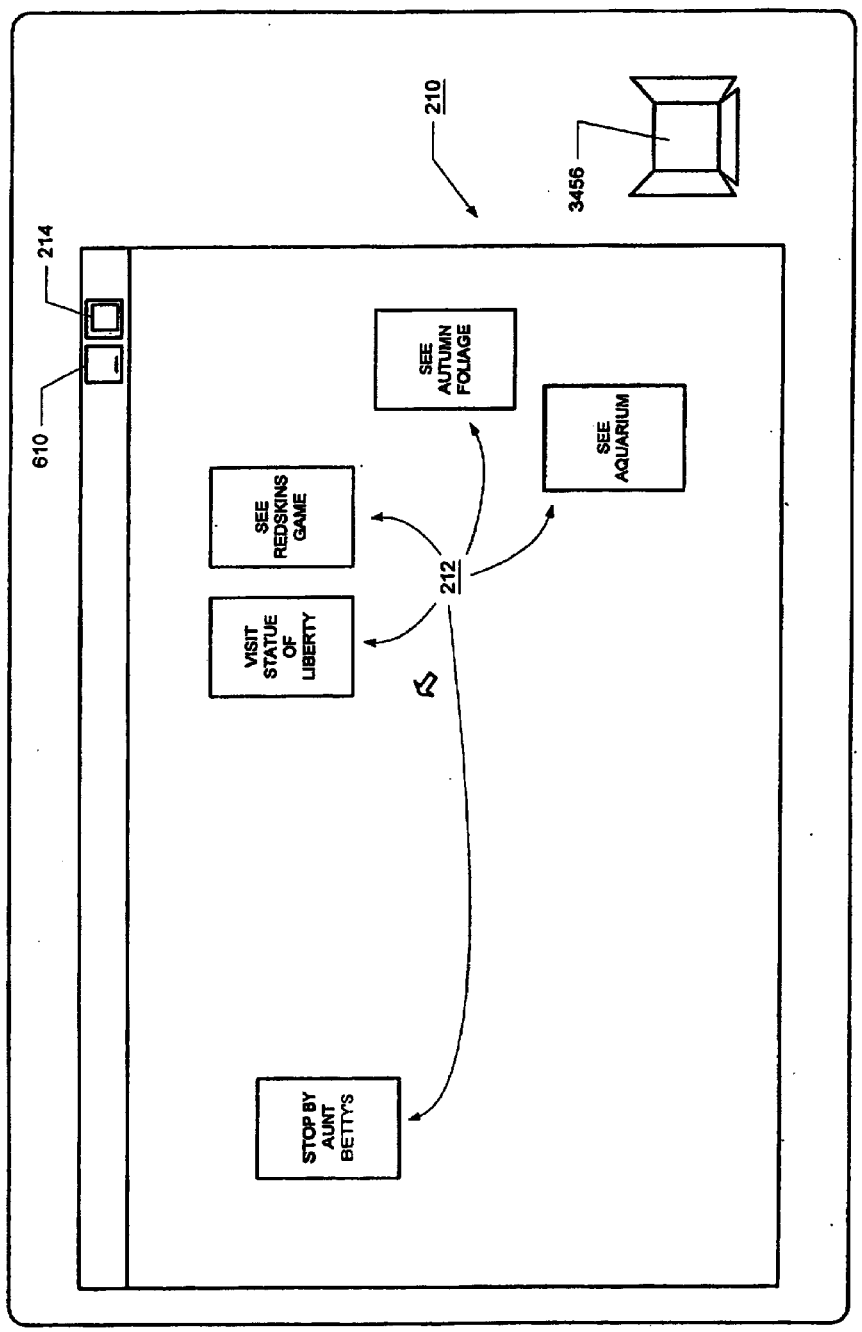
Figure 6B:
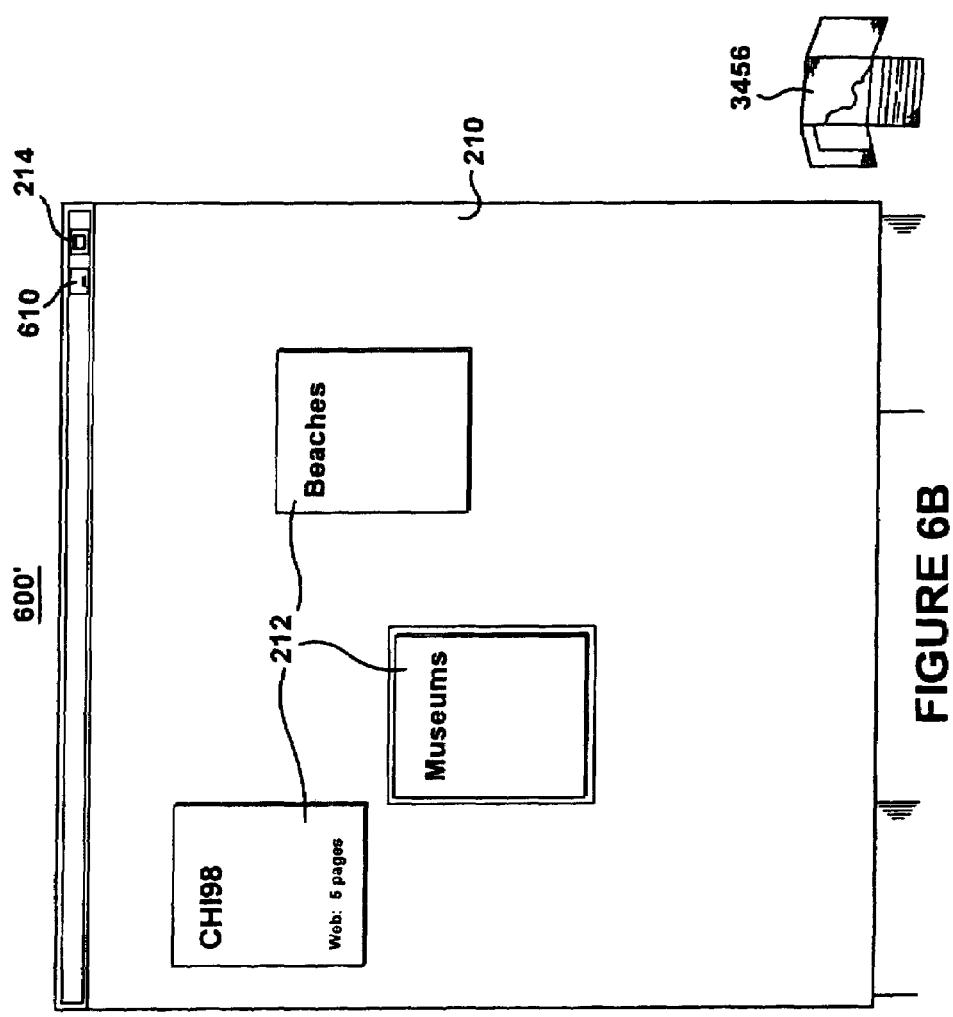
Figure 6C:
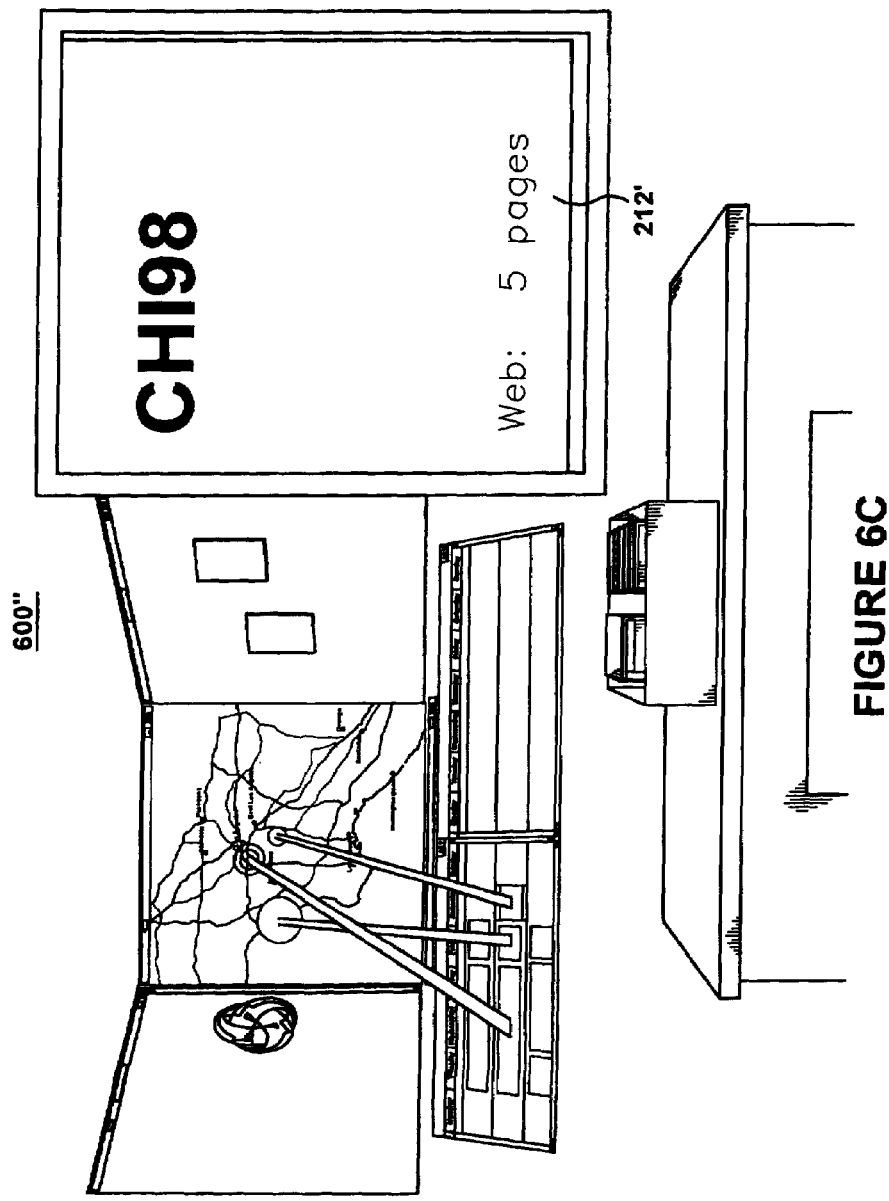
Figure 6E:
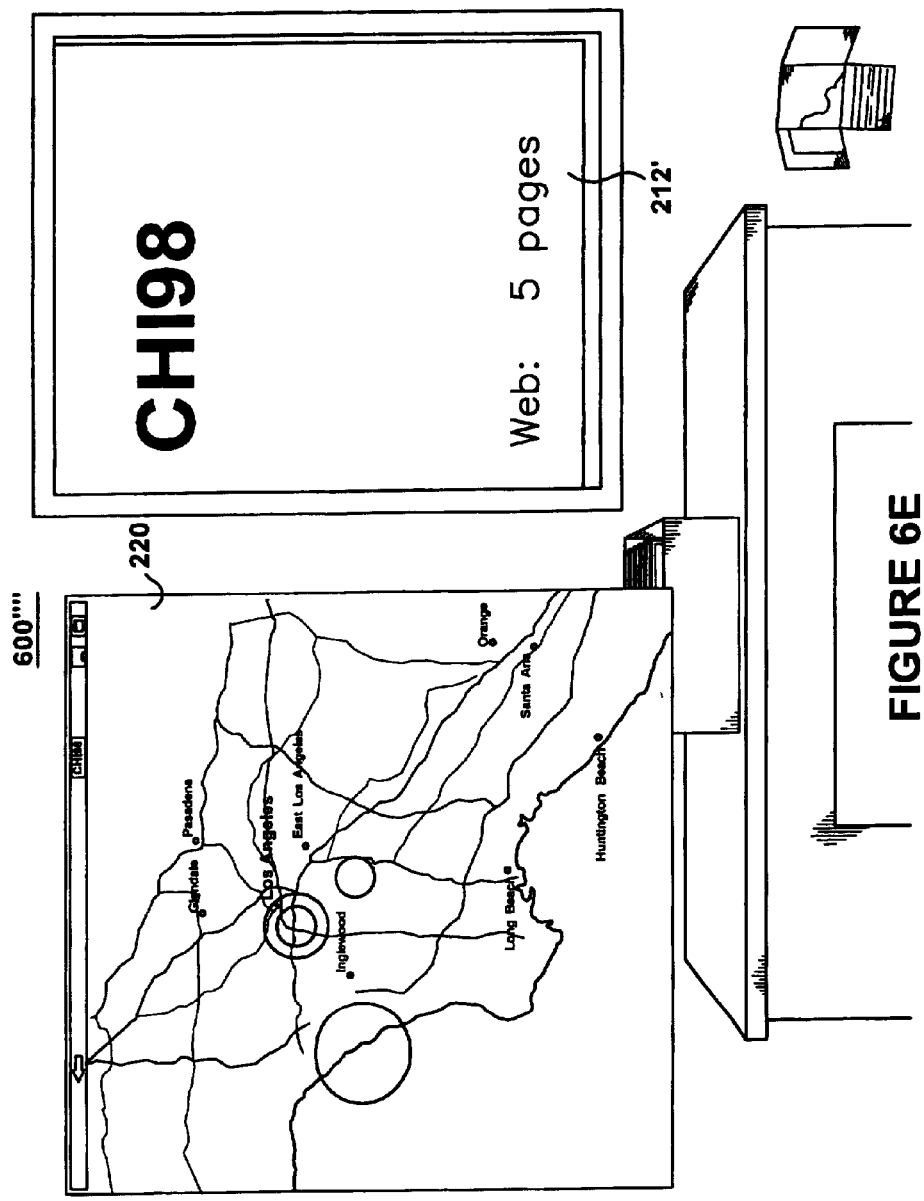

FIG. 6A is a high level diagram of a display, and FIG. 6B is an actual display, of a bulletin board window, in a focus view, of a user interface in accordance with an exemplary embodiment of the present invention. FIG. 6C is a display of a note, in a preferred viewing location, the contents of which may be edited. FIG. 6D is a display of a browser query launched based on the contents of a note. FIG. 6E is a display of a location on a map based on contents of a note.

Figure 7:
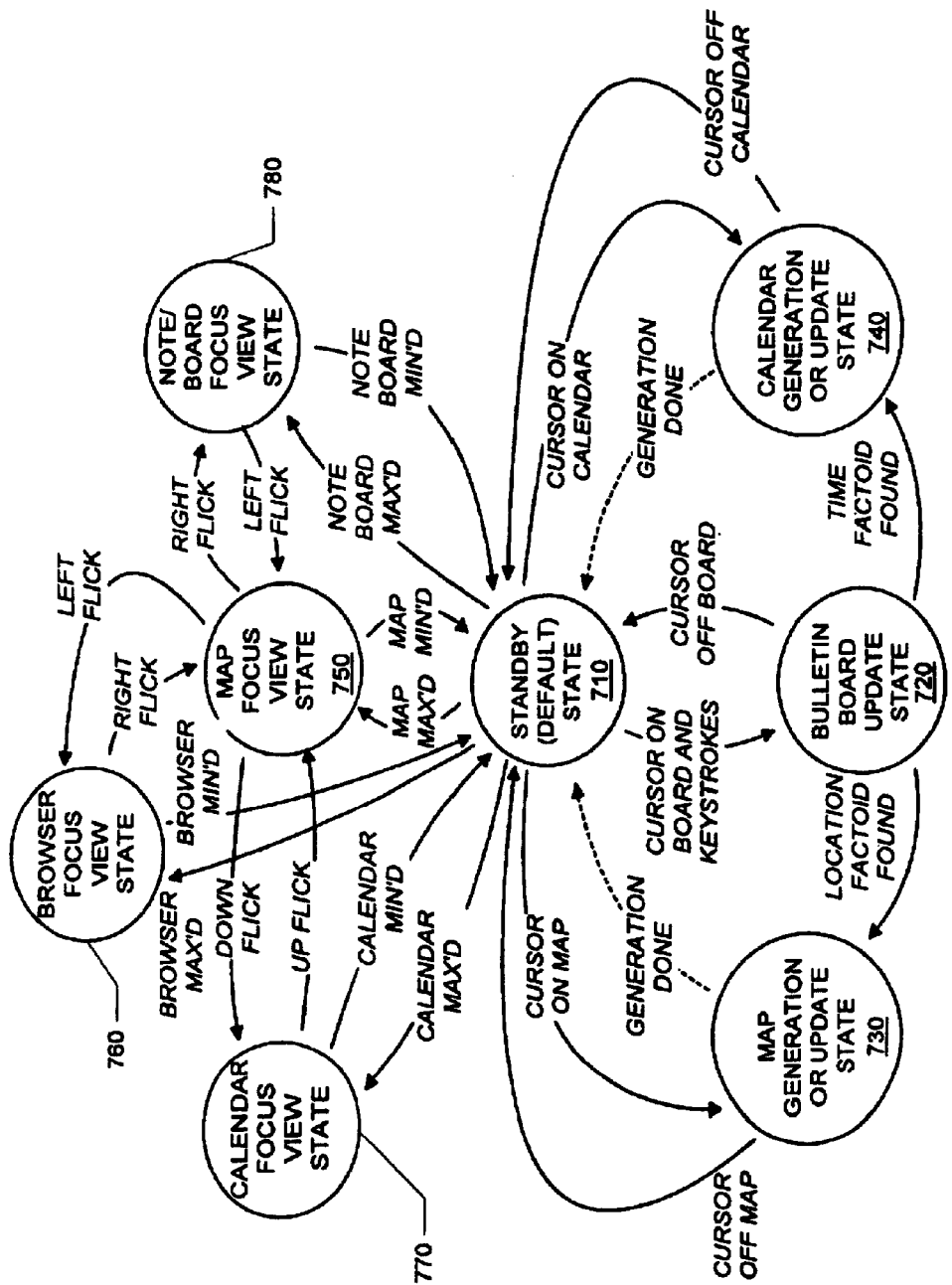

FIG. 7 is a diagram of states and state transitions in an exemplary embodiment of the present invention.

Figure 8:
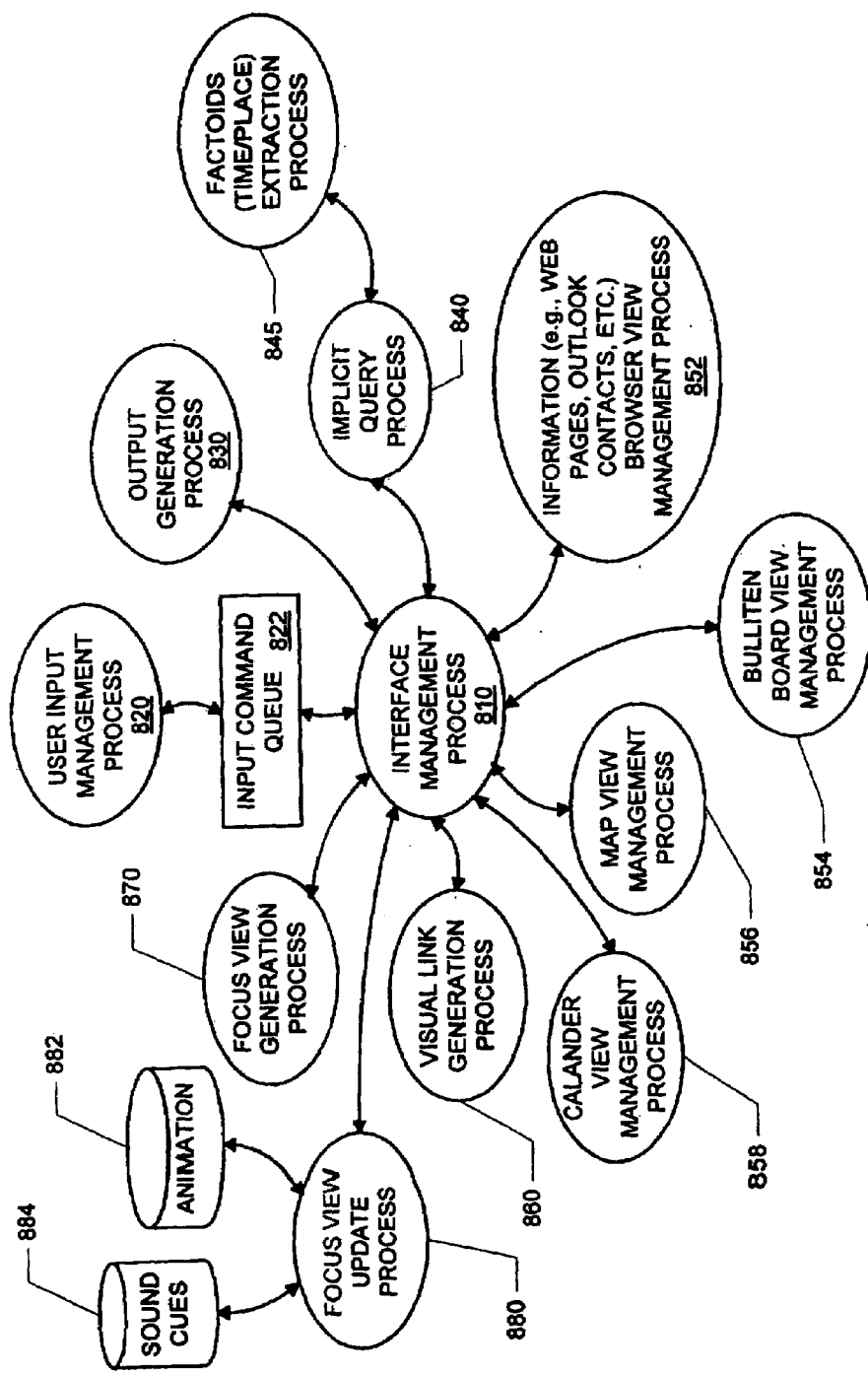

FIG. 8 is a diagram of processes which may be used to effect certain aspects of an exemplary embodiment of the present invention.

FIGS. 9 through 12 depict data structures which may be used in an exemplary embodiment of the present invention.

Figure 13:
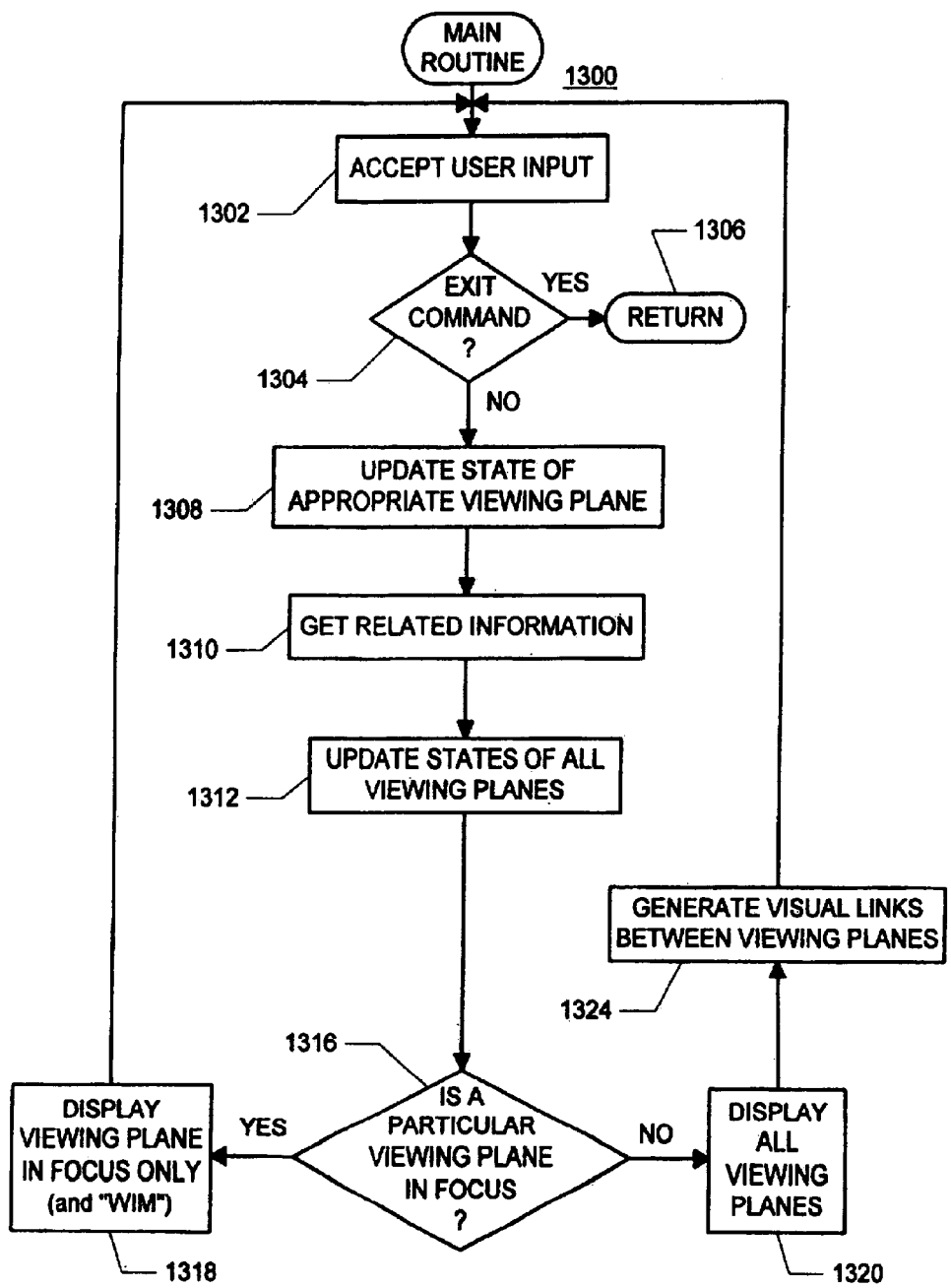

FIG. 13 is a flow diagram of an exemplary main routine process in accordance with an exemplary methodology of the present invention.

Figure 14:
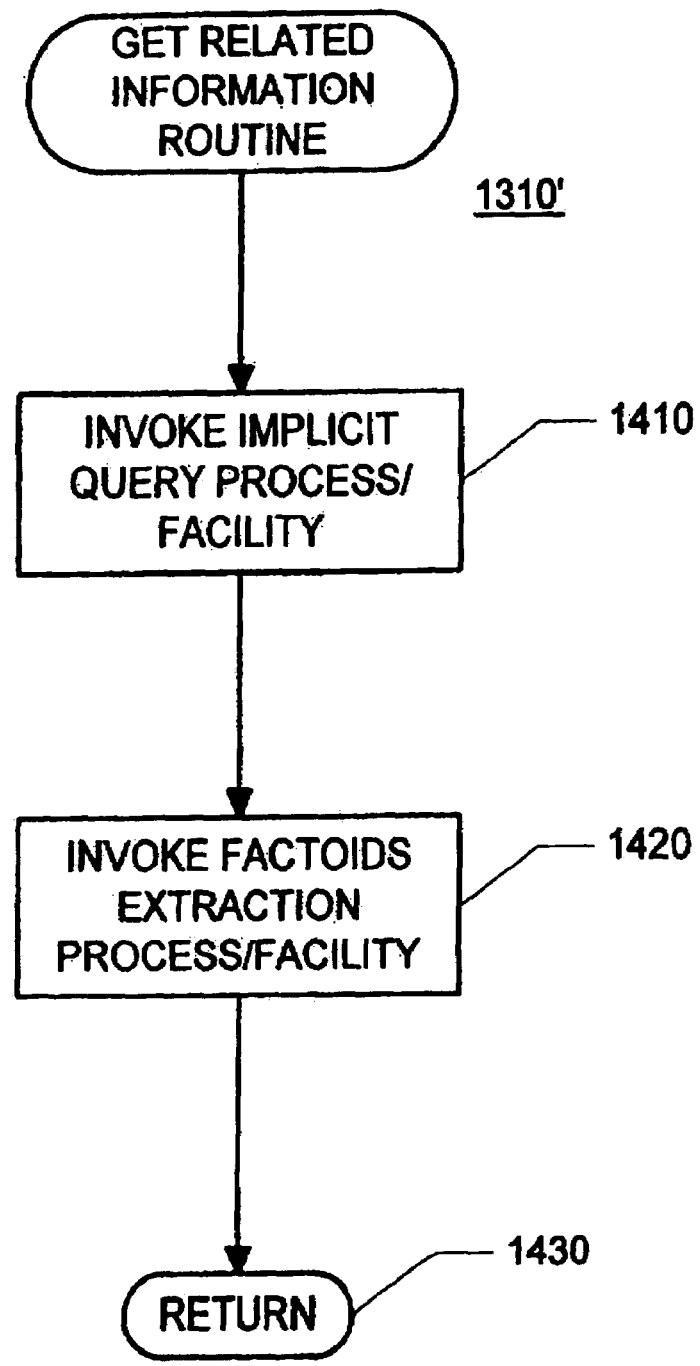

FIG. 14 is a flow diagram of an exemplary process to get related information, which process may be called by the main routine process of FIG. 13.

Figure 15:
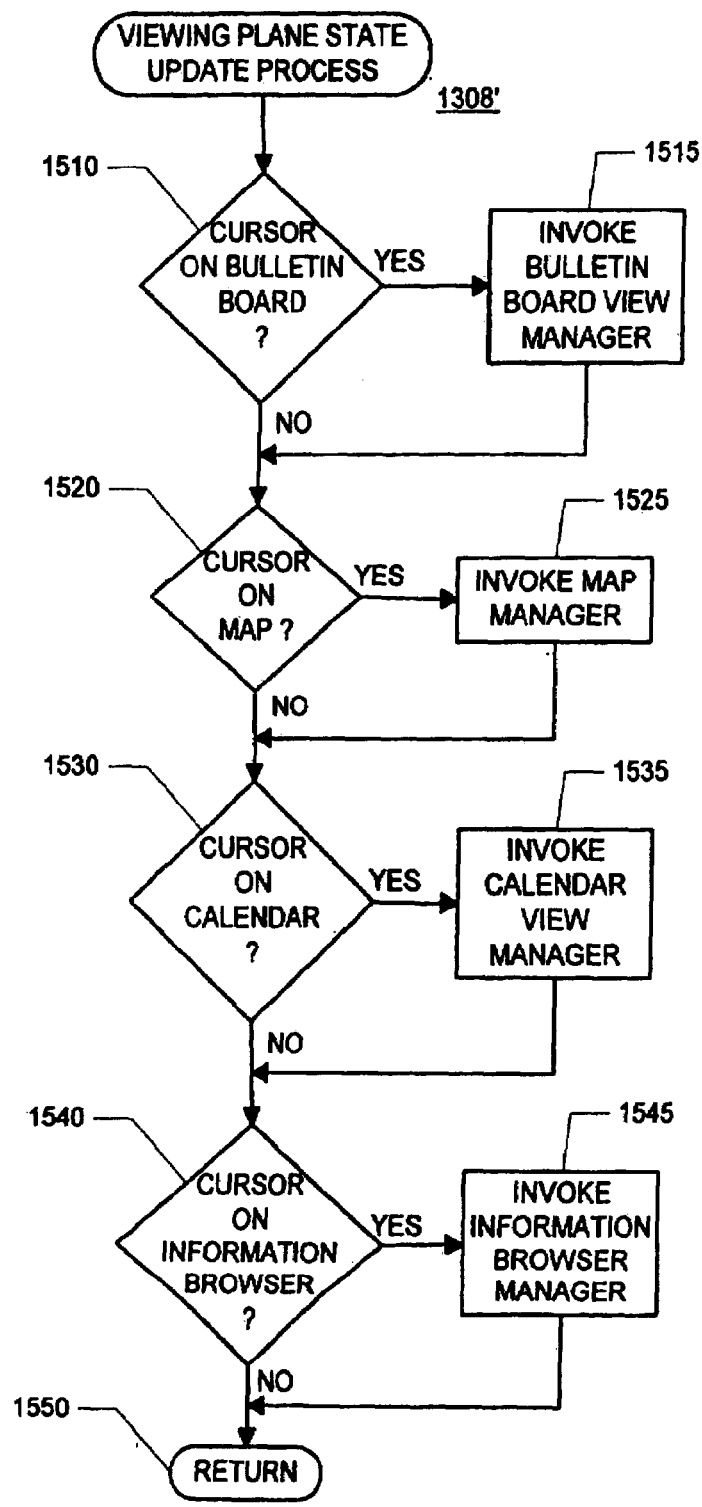

FIG. 15 is a flow diagram of an exemplary process to update viewing plane states, which process may be called by the main routine process of FIG. 13.

Figure 16:
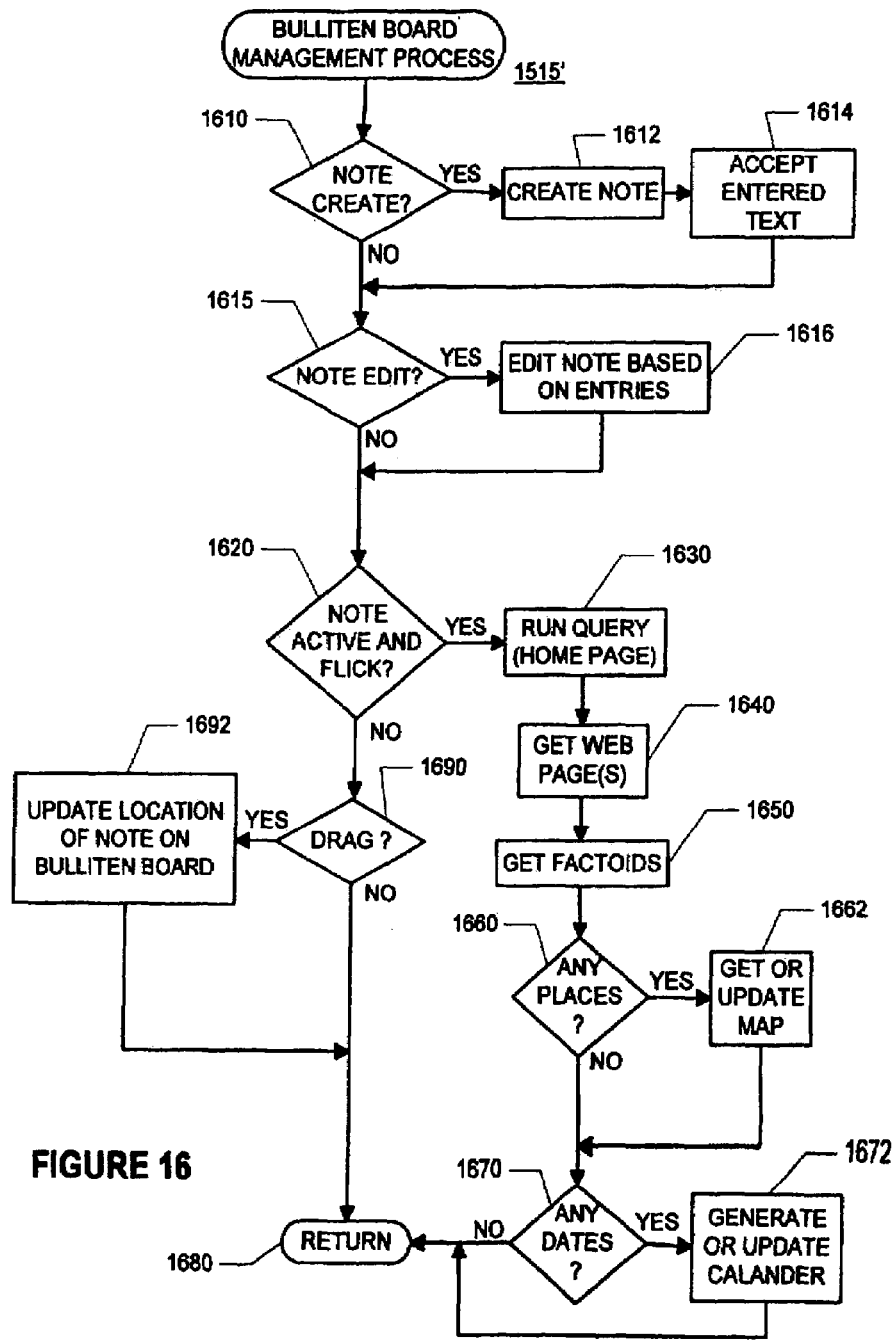

FIG. 16 is a flow diagram of an exemplary process to manage a bulletin board, which process may be called by the process of FIG. 15.

Figure 17:
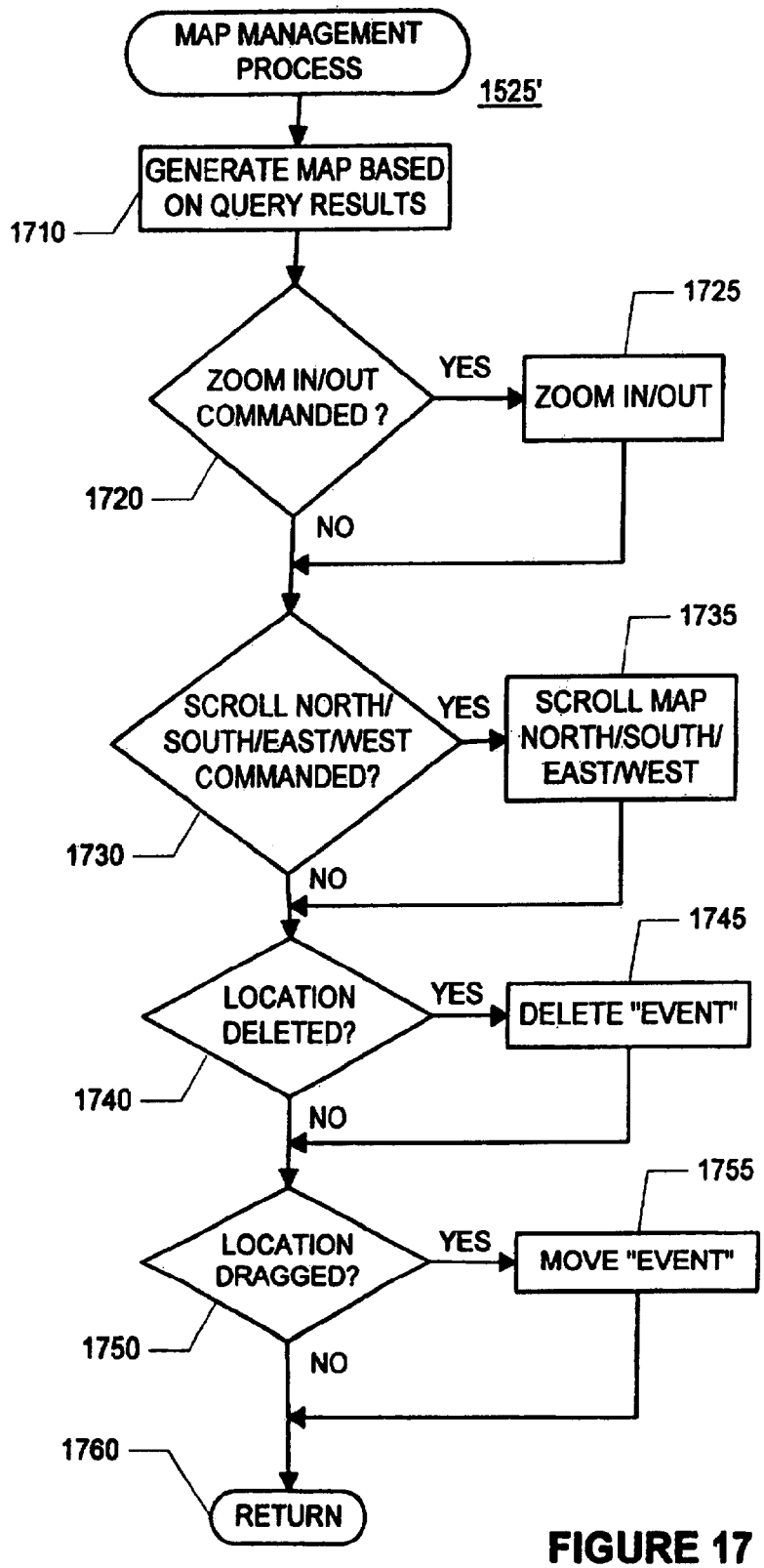

FIG. 17 is a flow diagram of an exemplary process to manage a map, which process may be called by the process of FIG. 15.

Figure 18:
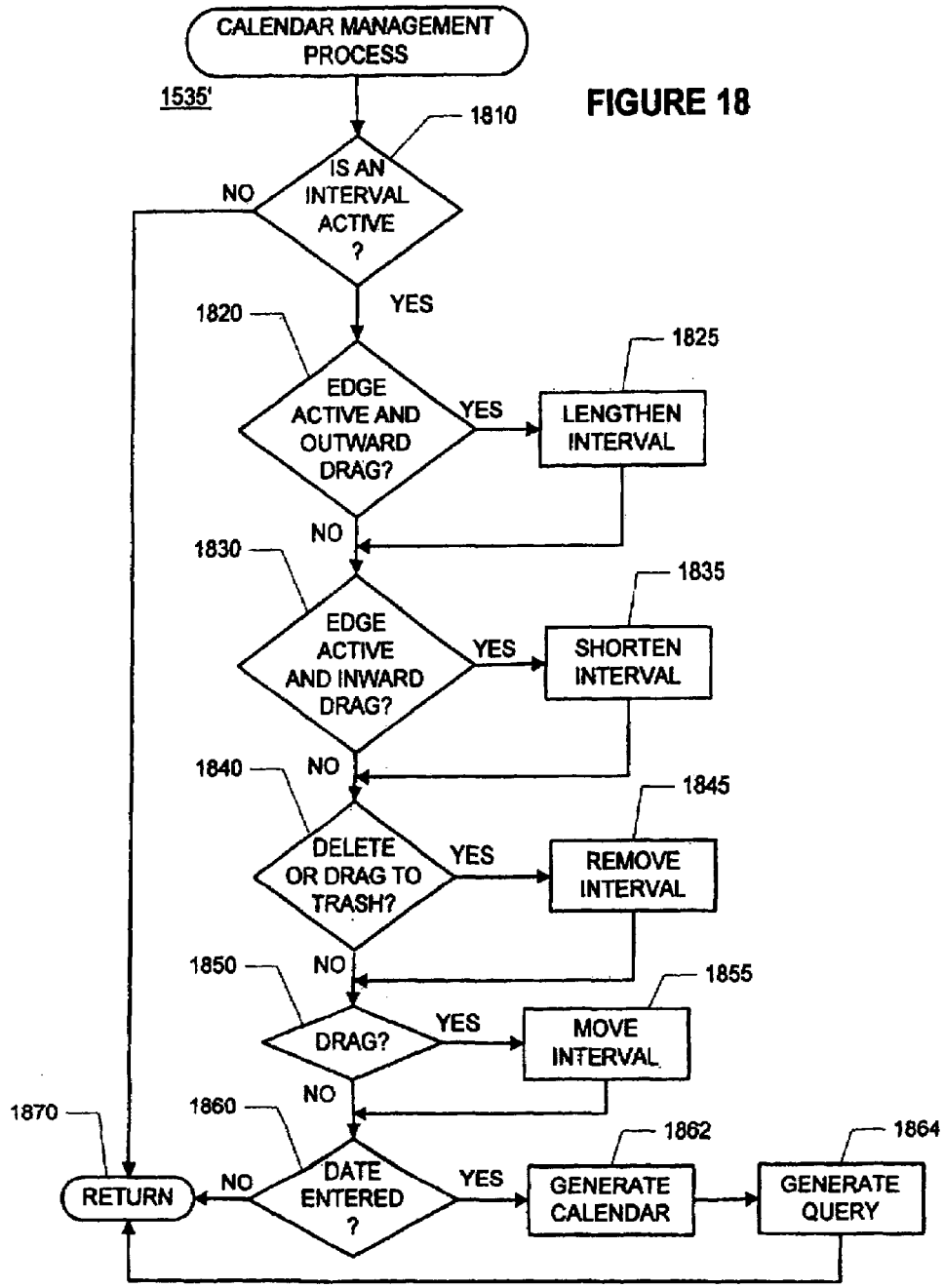

FIG. 18 is a flow diagram of an exemplary process to manage a calendar, which process may be called by the process of FIG. 15.

Figure 19:
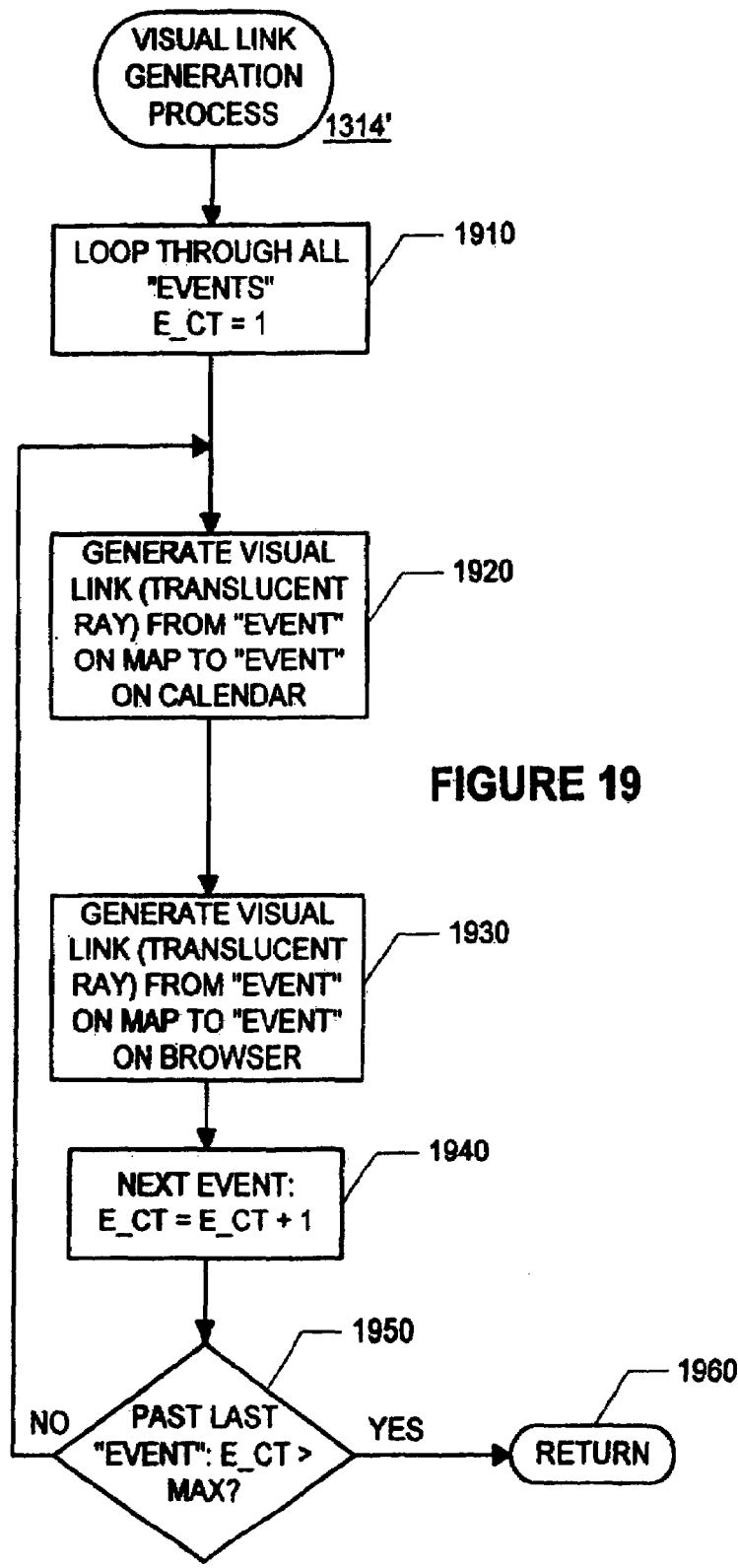

FIG. 19 is a flow diagram of an exemplary process to generate visual links, which process may be called by the main routine process of FIG. 13.

Figure 20:
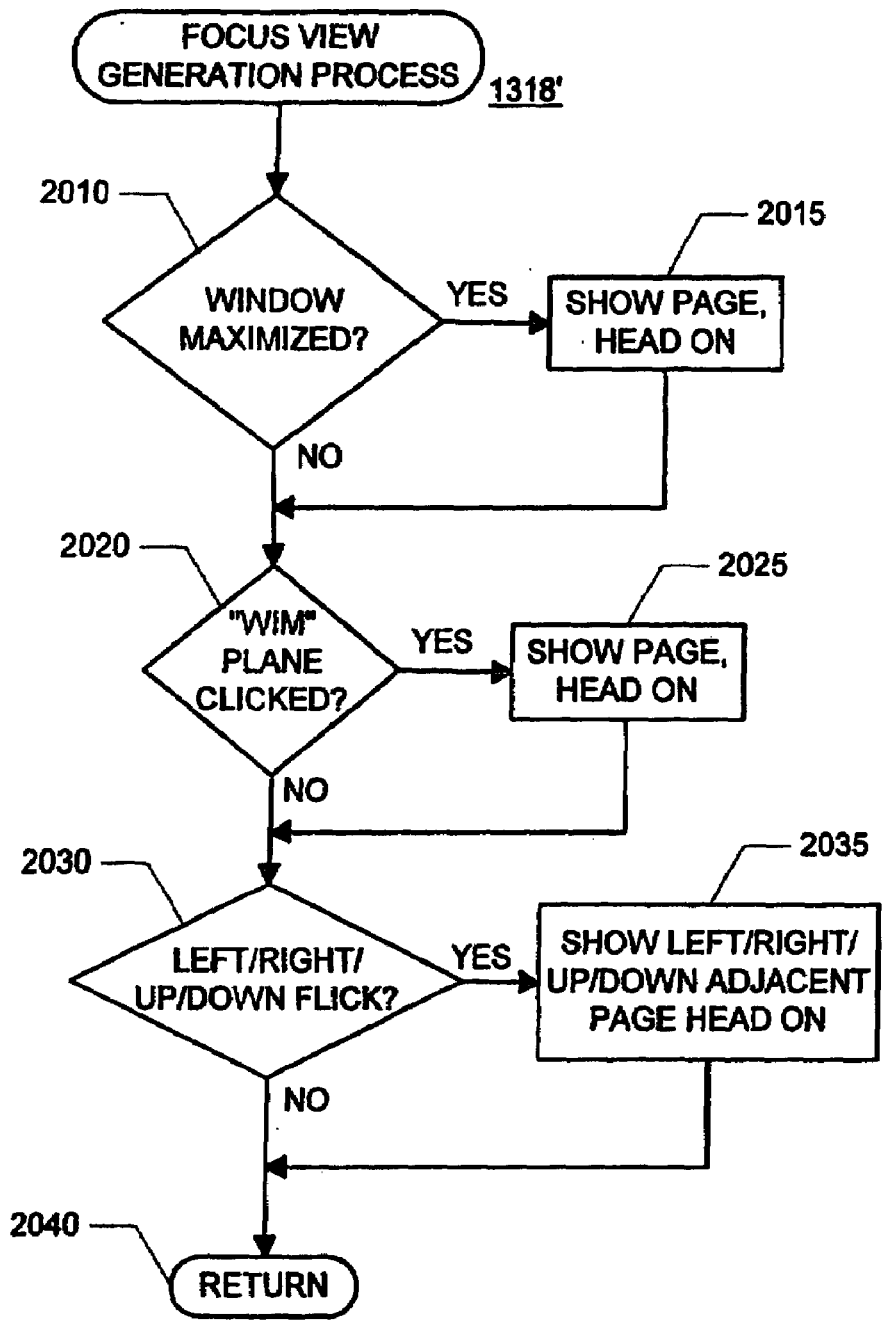

FIG. 20 is a flow diagram of an exemplary process to generate a focus view, which process may be called by the main routine process of FIG. 13.

Figure 21B:
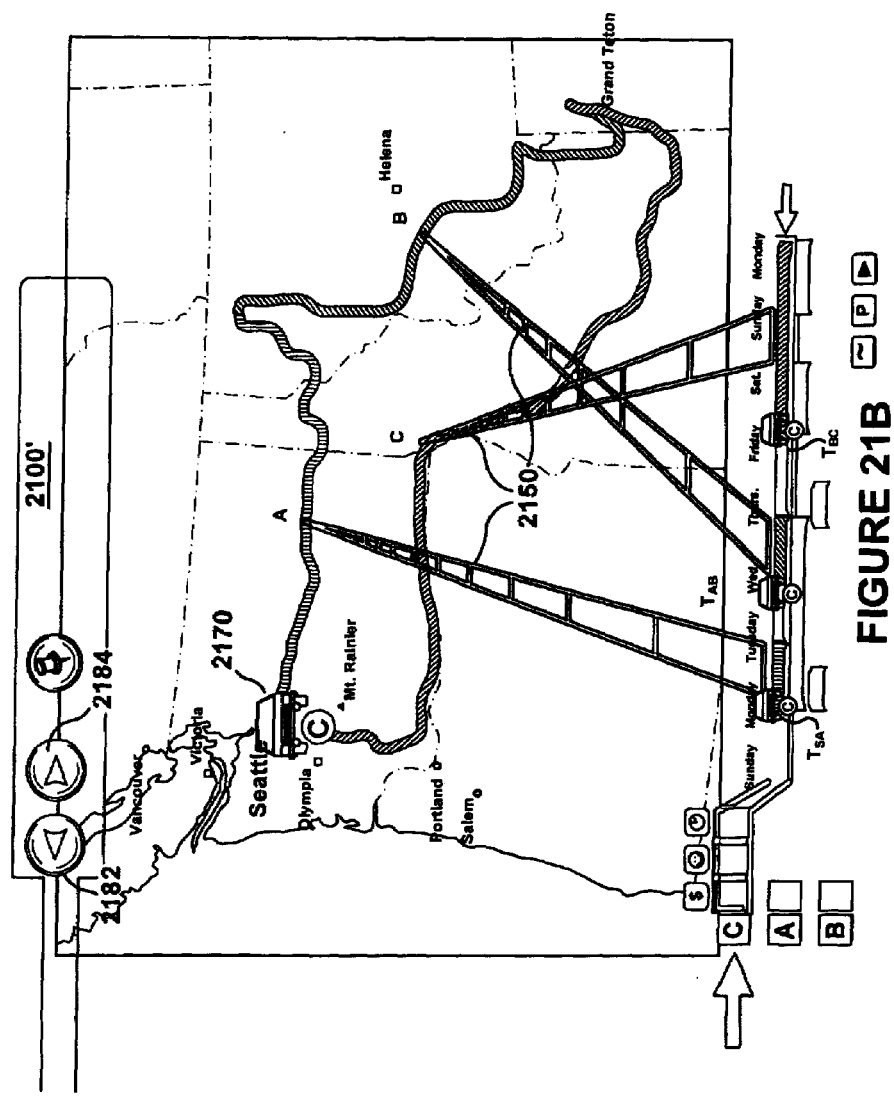
Figure 21C:
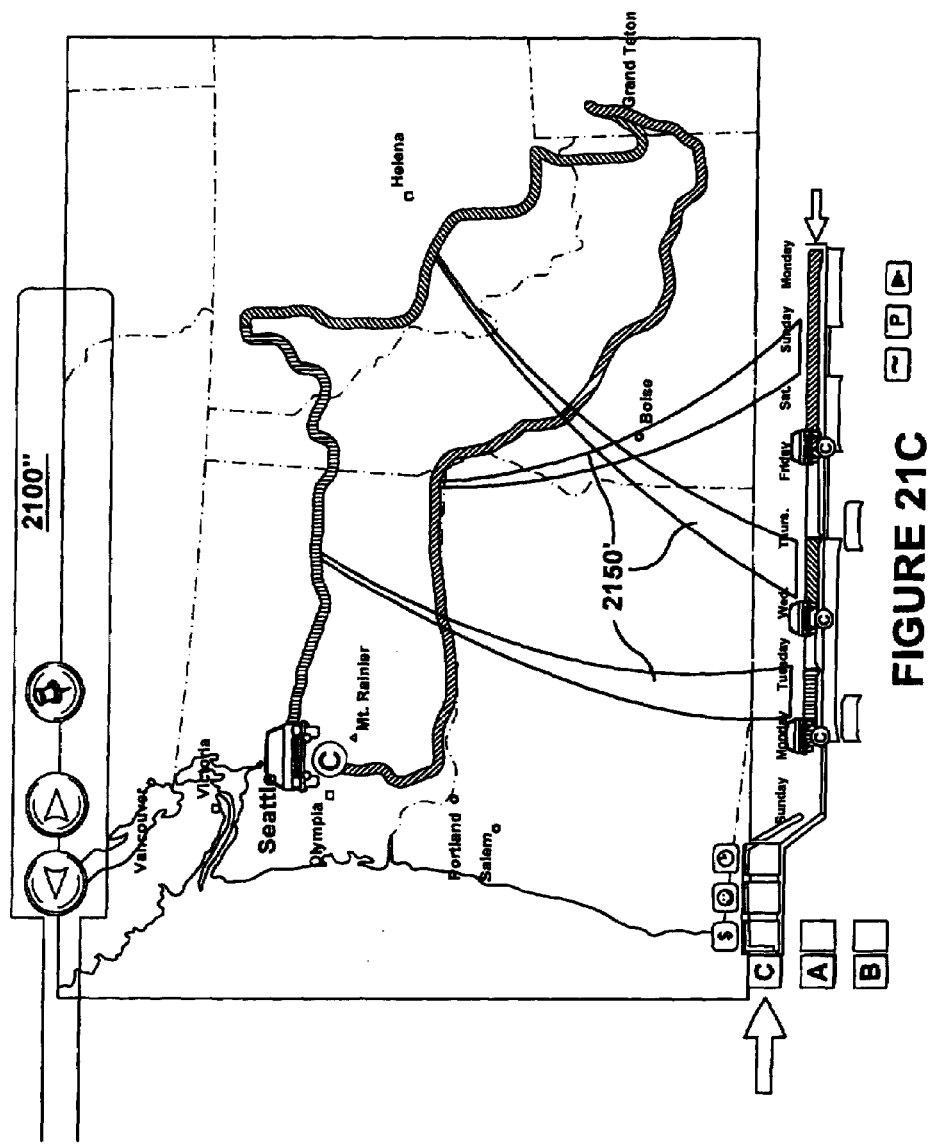

FIGS. 21A through 21C are displays depicting alternative map and calendar windows.

Figure 22:
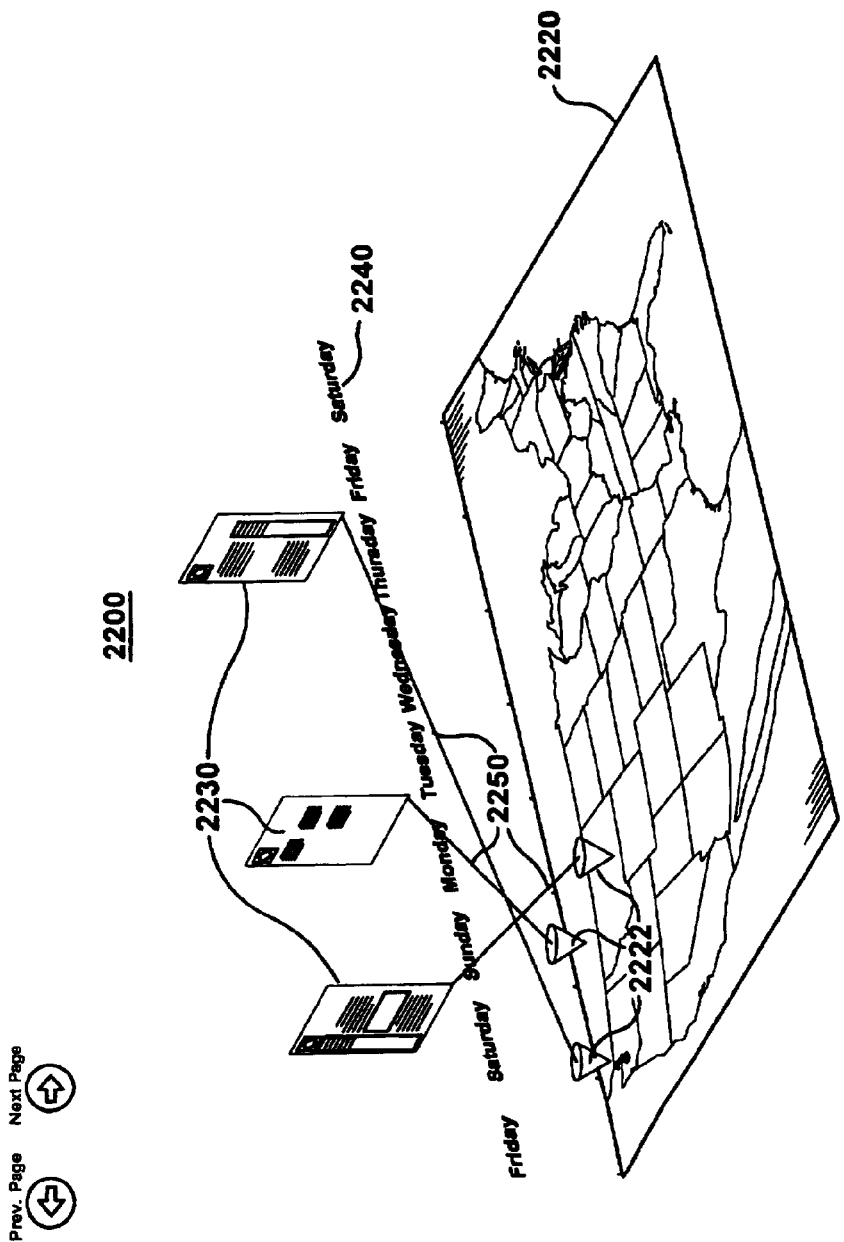

FIG. 22 is an alternative default display of a user interface in accordance with the present invention.

Figure 23A:
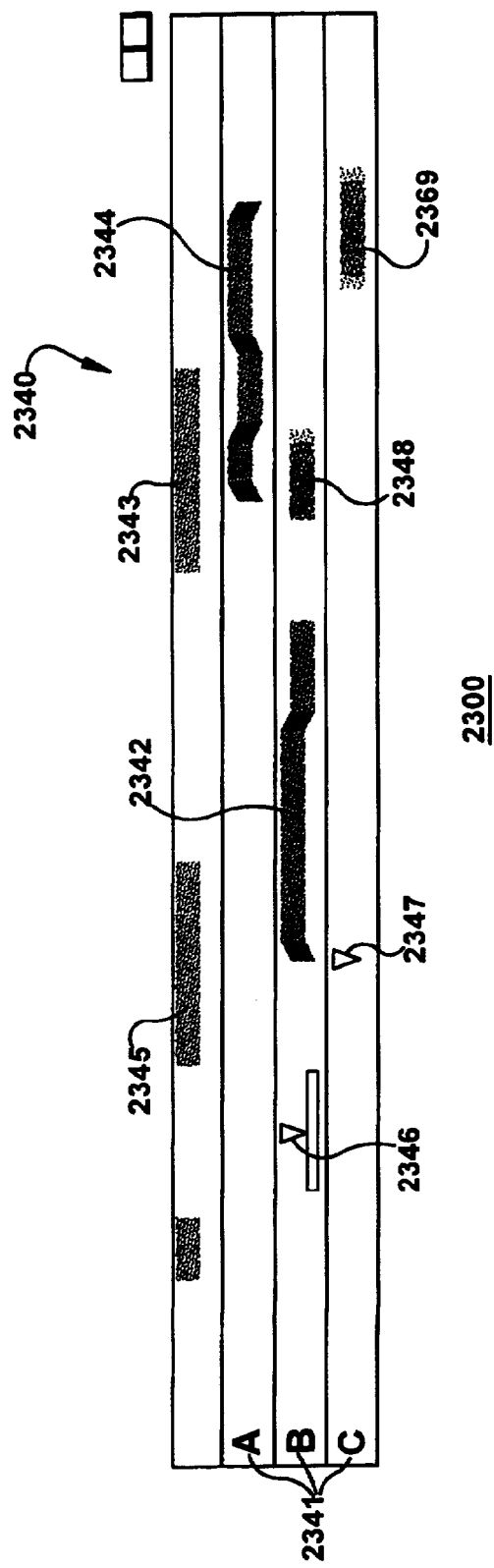
Figure 23B:
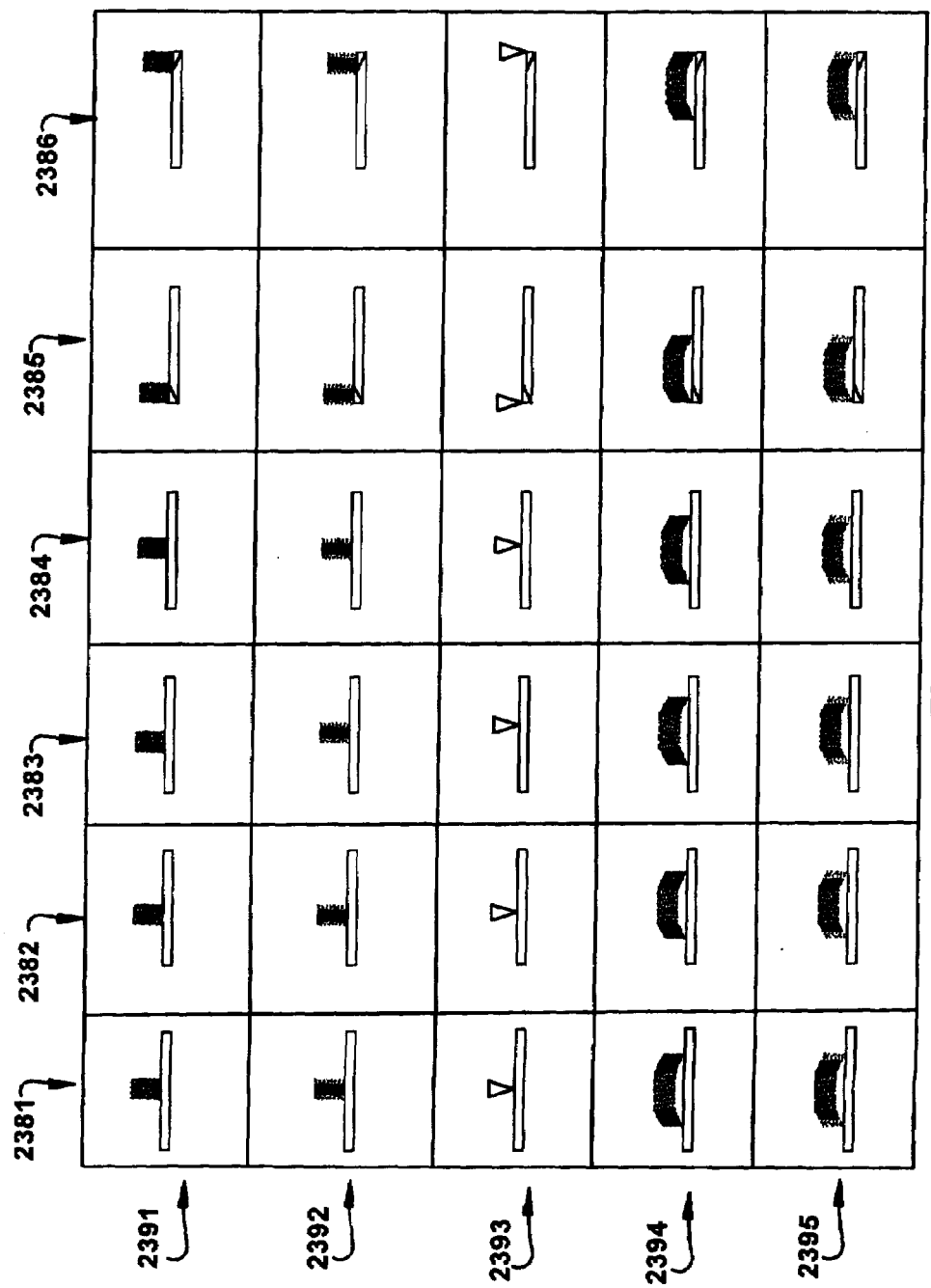

FIG. 23A is a display depicting an alternative calendar window. FIG. 23B is a table of graphical representations which may be used in the alternative calendar window of FIG. 23A.

Figure 24:
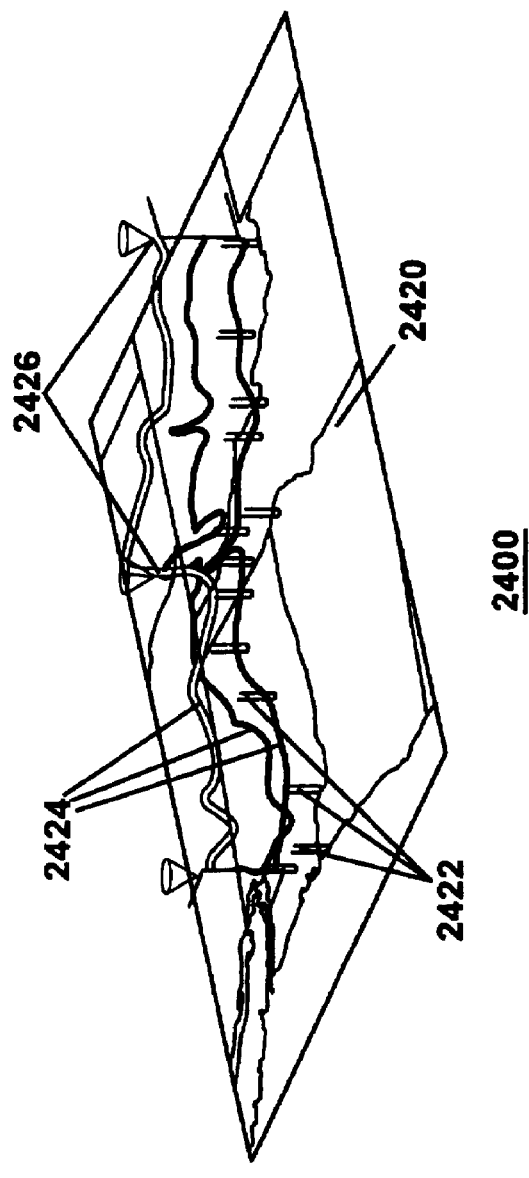

FIG. 24 is a display depicting an alternative map window.

Figure 25:
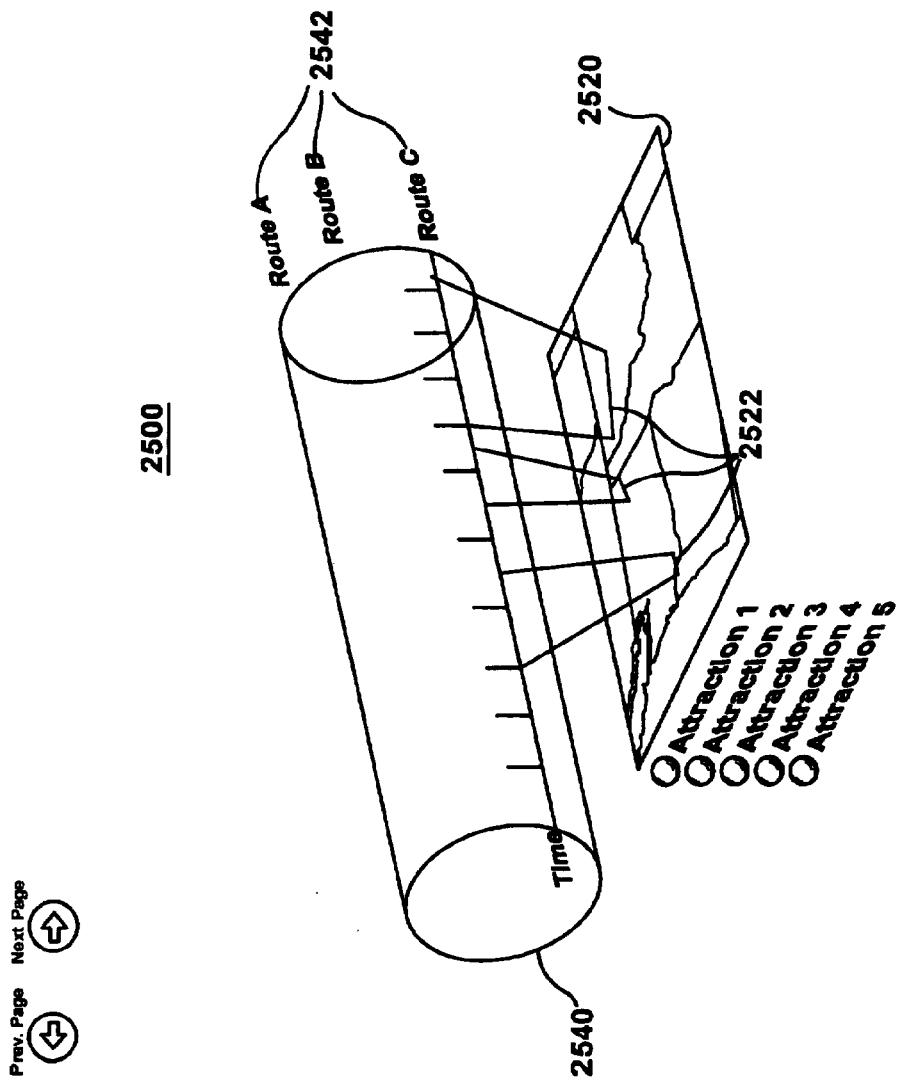

FIG. 25 is a display depicting alternative combined calendar and map windows.

Figure 26:
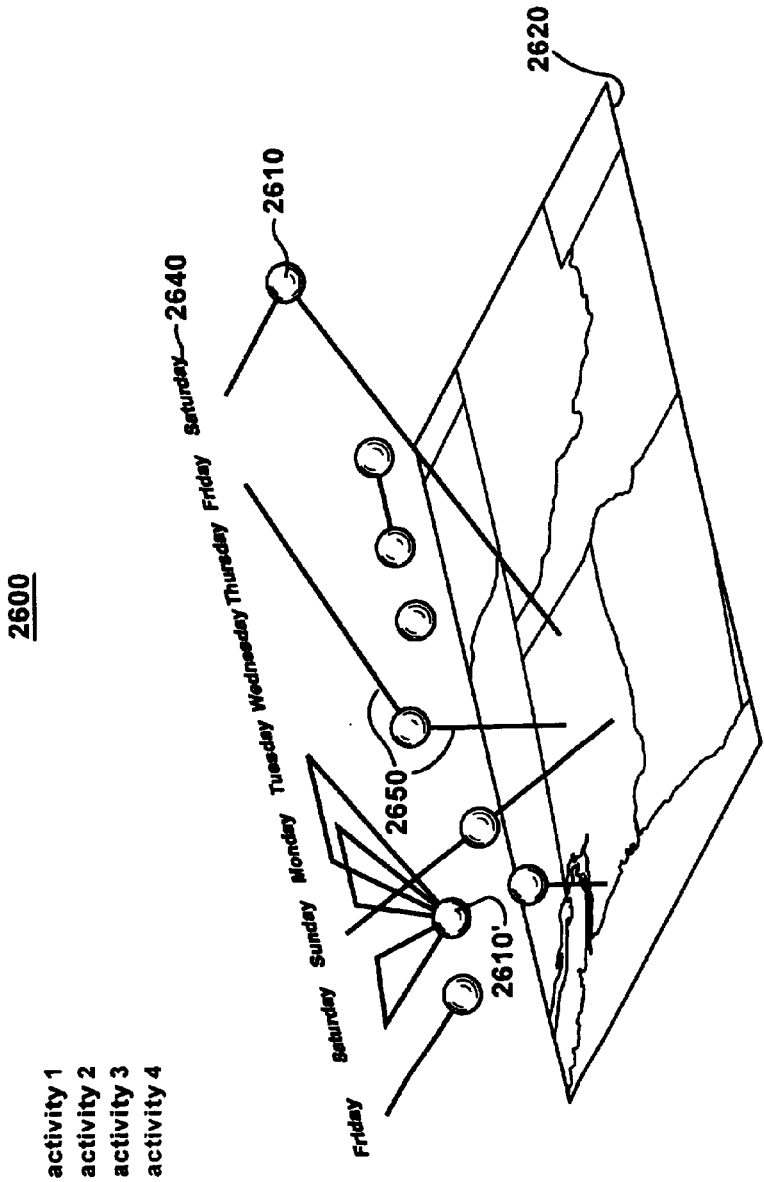
Figure 27:
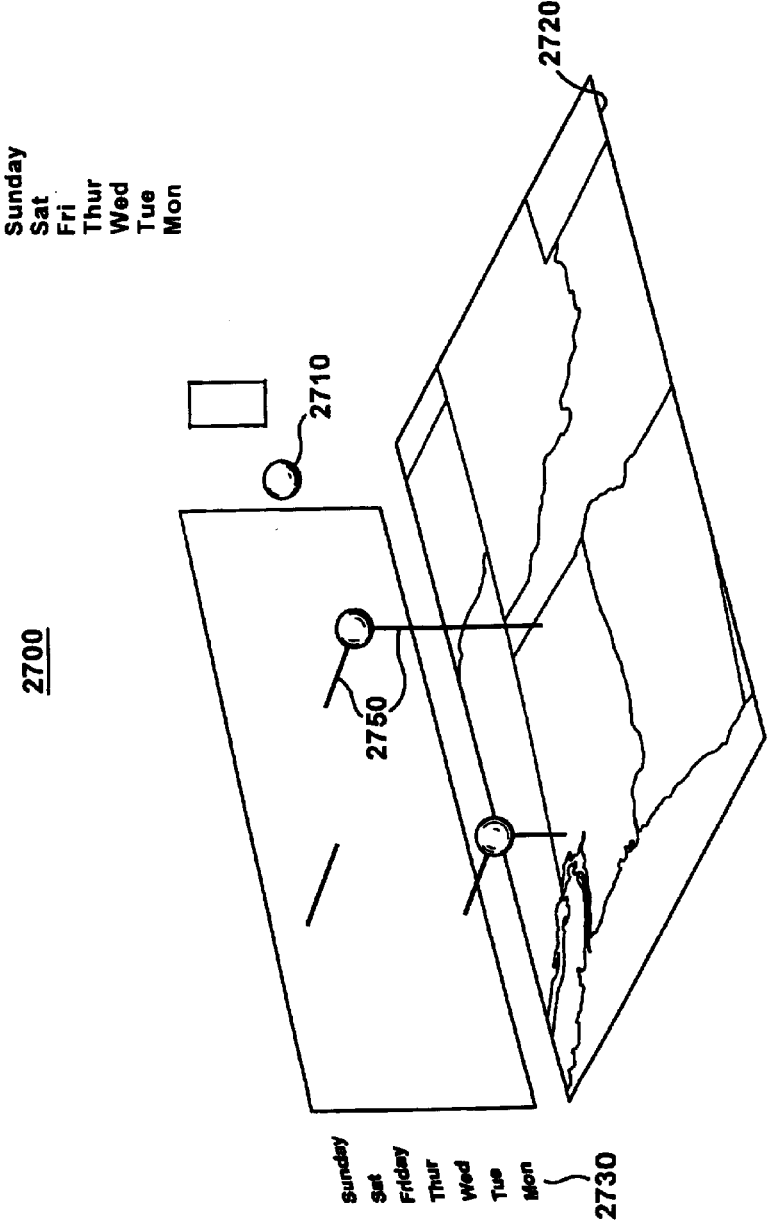

FIGS. 26 and 27 are displays depicting alternative combined calendar, map, and event views.

Figure 28:
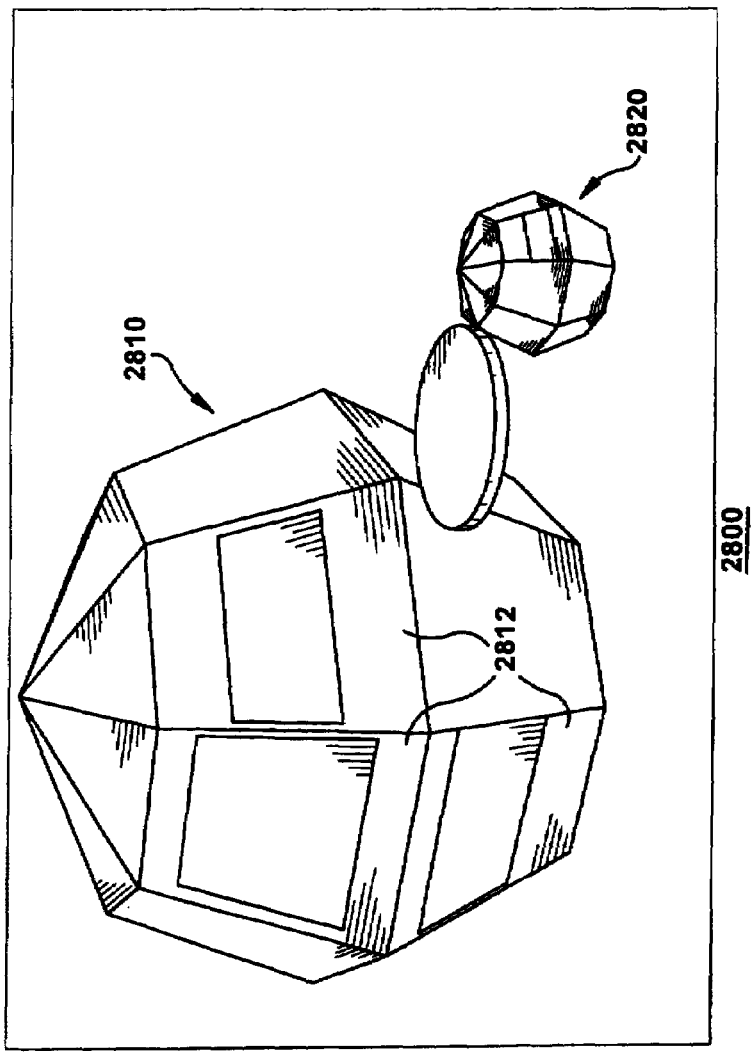

FIG. 28 is a display which shows an alternative arrangement of windows on a geometric object.

Figure 29:
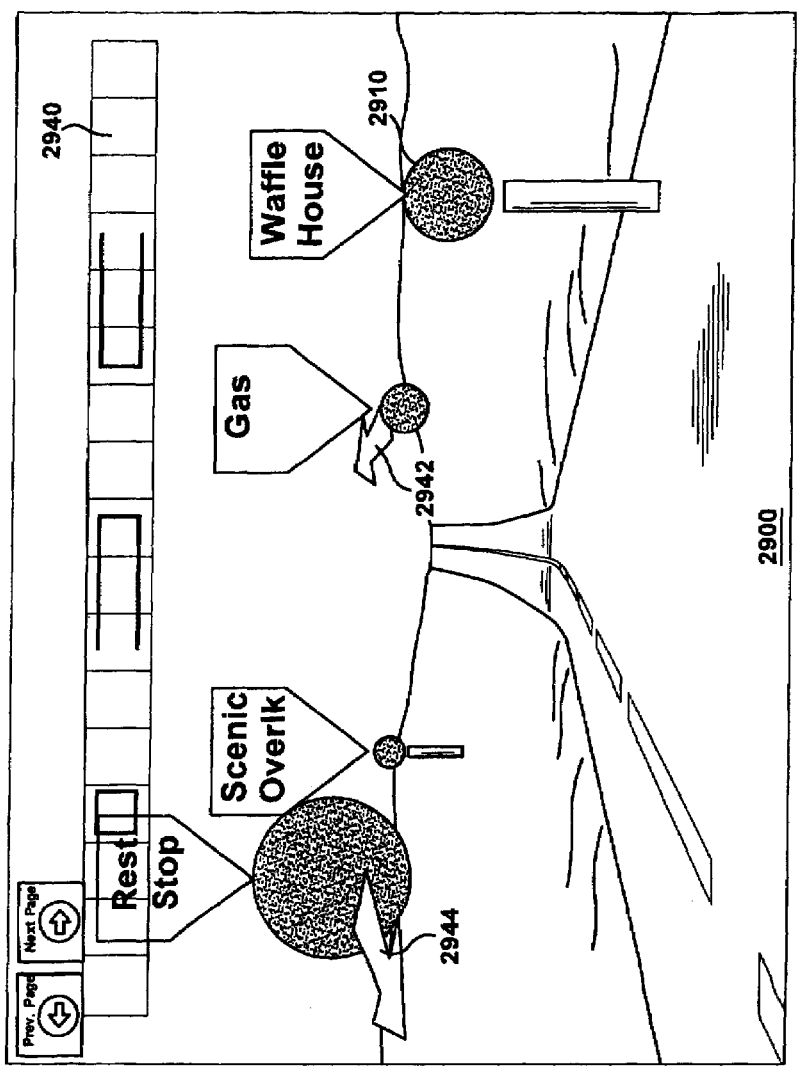

FIG. 29 is an alternative display of a trip plan.

Figure 30:
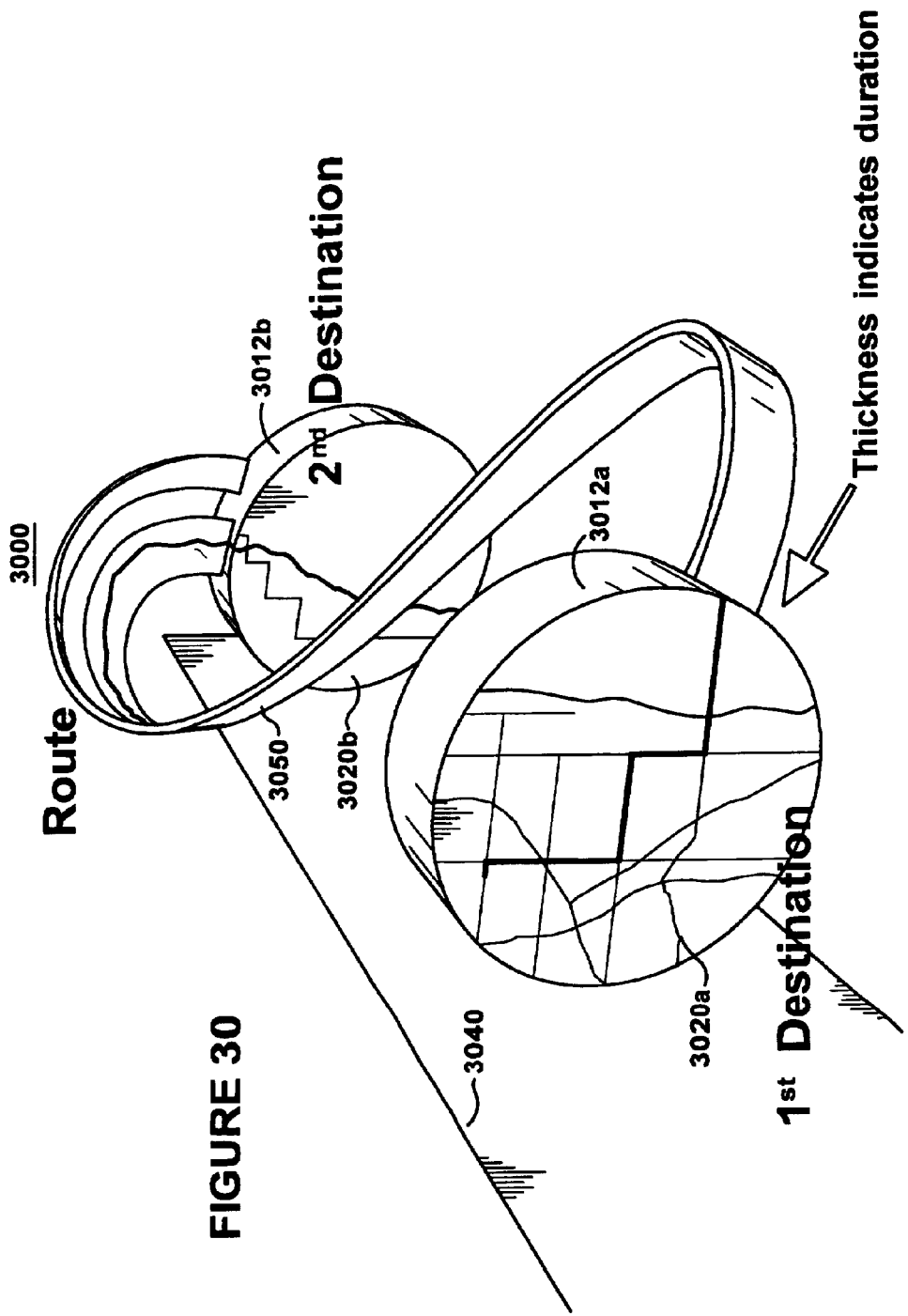

FIG. 30 is a display depicting alternative calendar and map views.

FIGS. 31A and 31B are views of a display depicting alternative event and map views.

Figure 32:
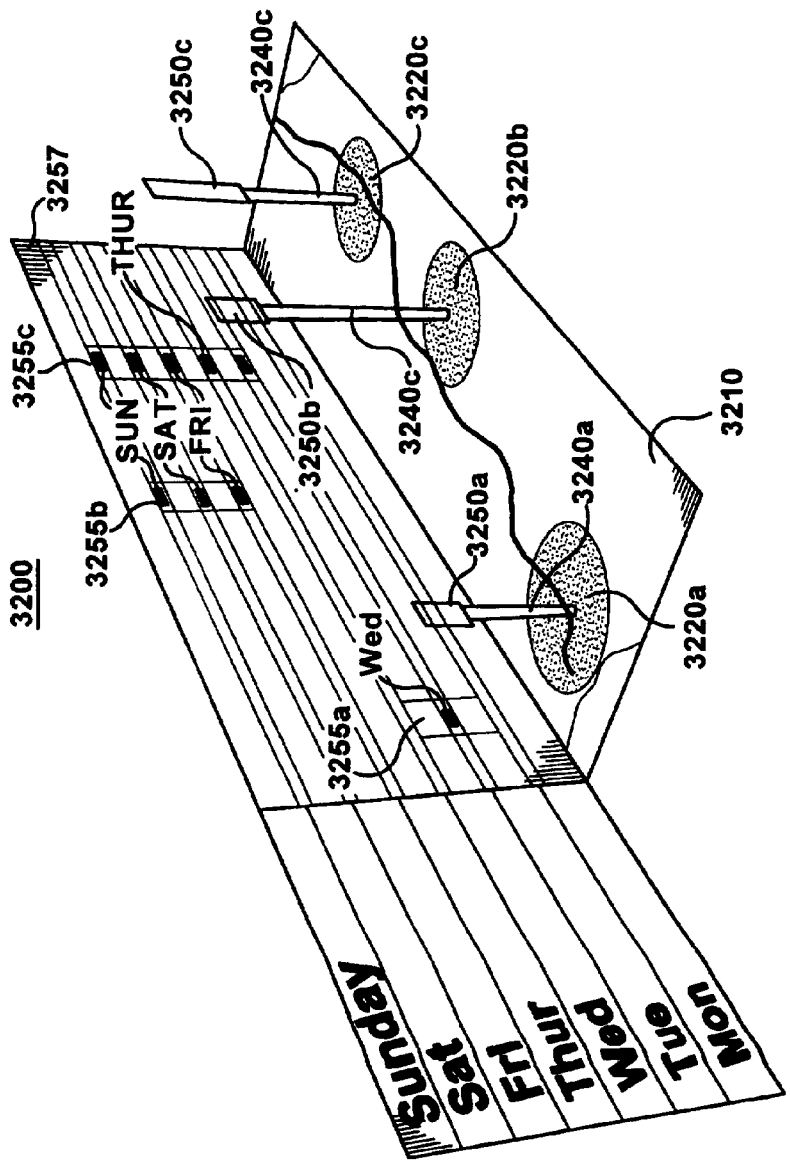

FIG. 32 is a display depicting alternative map and calendar views.

Figure 33A:
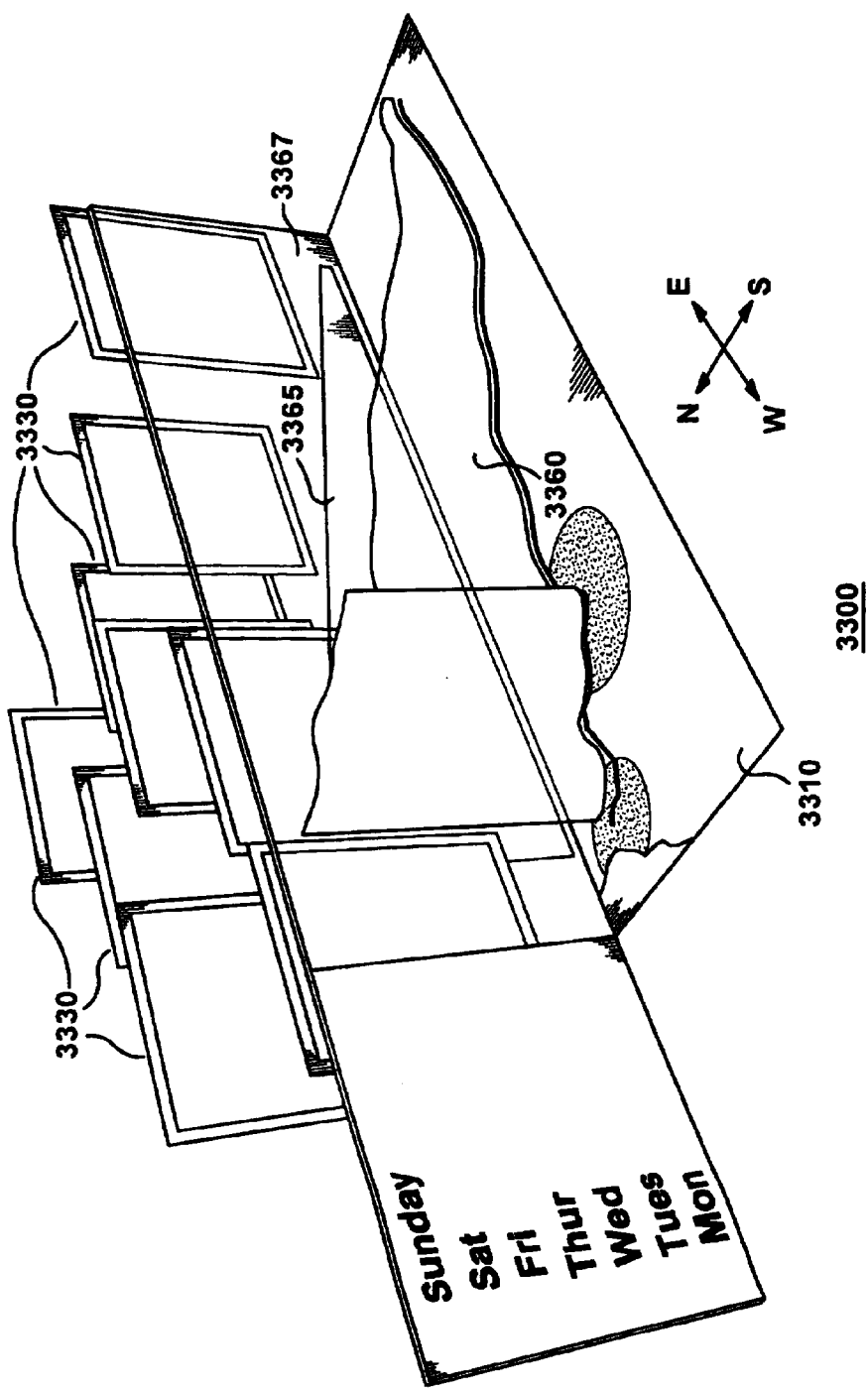
Figure 33B:
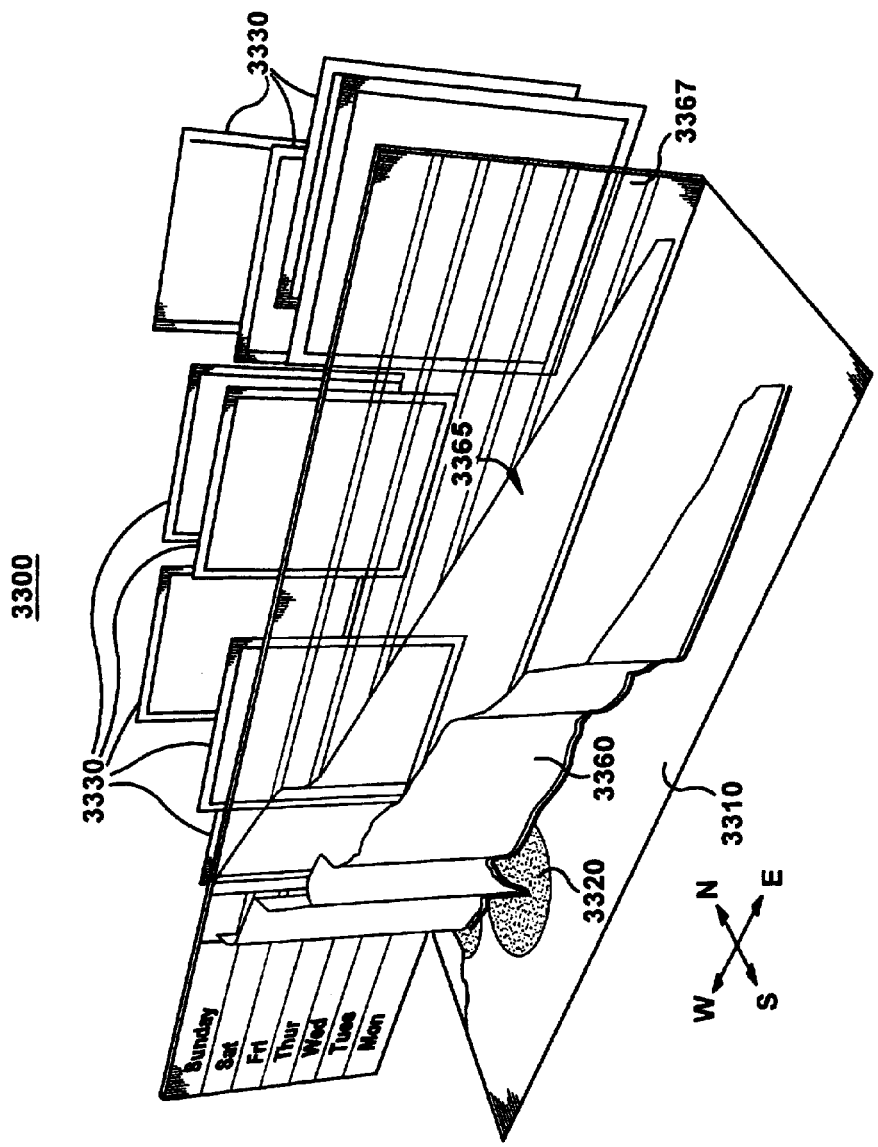

FIGS. 33A and 33B are views of a display having alternative map, calendar, and event views.

§ 4. DETAILED DESCRIPTION

The present invention concerns novel methods, apparatus and data structures for providing a user interface. The following description is presented to enable one skilled in the art to make and use the invention, and is provided in the context of a particular application (i.e., travel planning) and its requirements. Various modifications to the disclosed embodiment will be apparent to those skilled in the art, and the general principles set forth below may be applied to other embodiments and applications. Thus, the present invention is not intended to be limited to the embodiments shown.

Features of, and functions which may be performed by, the present invention will first be described in § 4.1 below. Then, structures, methodologies, data structures and displays of exemplary embodiments of the present invention will be described in § 4.2 below.

§ 4.1 Functions which May be Performed by the Present Invention

Recall from § 1.2.3 above, that there exists a need for a user interface, and in particular a graphical user interface, for facilitating planning or making decisions based on a number of factors (or choices). Recall also that since factors may be subject to initial uncertainty or vagueness, such a user interface should facilitate an iterative planning or decision making process and should visually depict the results of alternative decisions. The present invention meets this need by providing a graphical user interface in which a number of windows or planes depict different types of related information. The consequences of changes to one type of information on one window are depicted in the other types of information on the other windows.

Recall also from § 1.2.3 above, that relationships between information, not necessarily the same information depicted in different ways, should be depicted. The present invention meets this need by providing a graphical user interface in which the relationship between information in various windows is visually depicted, for example using color and colored rays. The colored rays may be translucent so that they do not occlude any information "behind" them.

Recall also from § 1.2.3 above, that the user interface should permit a single display to have different windows of different types of related information such that a unified view of the task is presented to a user. The present invention meets this need by simulating a three dimensional environment including different windows or planes having the different types of information. The windows or planes may be related to one another as surfaces of a folded paper, or as facets of a geometric object that are connected with one another. However, recall from § 1.2.3 that the user interface should permit easy interaction with any one of the different displays. One way the present invention meets this need is by permitting any plane or window to be brought into a normal, head on, view (referred to as "focus view") and depicted at a centered position on the display. However, this is not the only way a user can interact with the displays—in an exemplary user interface, all of the (rendered) windows are always active. In such an exemplary user interface, the focus view is merely provided to aid interaction for those users that prefer a larger, normal view. In this regard, the present invention may permit the user to navigate between various windows, bringing any one of the windows into a focus view at any given time. The present invention may represent the windows as surfaces or facets on a geometric object, such as a cube for example, and may employ animation when a user navigates from one window to another. The present invention may use "world-in-miniature" (or "WIM") techniques in addition to, or instead of the representation of the windows on a geometric object, to facilitate navigation.

Finally, recall from § 1.2.3 above, that intelligent help and access to information that may be needed in completing the task should be provided to the user. The present invention meets this need in two (2) ways. First, the present invention may generate queries, to be launched via an information browser, from words or phrases of free form notes. Second, the present invention may recognize relevant facts (e.g., in the context of a trip planner, recognize dates, places, etc.) in one information type to generate related information in another information type.

Having described functions which may be performed by the present invention, structures, methodologies, data structures and displays which may be used by the present invention are now described in § 4.2.

§ 4.2 Structures, Methodologies, Data Structures, and Displays which May be Used By the Present Invention In the following, exemplary systems on which the present invention may operate are described in § 4.2.1, exemplary displays which may be generated by the present invention are described in § 4.2.2, a state diagram which illustrates exemplary interactions between the user interface and a user is described in § 4.2.3, exemplary processes and data structures which may be used to effect certain aspects of the present invention are described in § 4.2.4, flow diagrams showing an operation of an exemplary methodology of the present invention are described in § 4.2.5, and alternative displays which may be generated by the present invention are described in § 4.2.6.

§ 4.2.1 Exemplary Systems

FIG. 1A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

Referring to FIG. 1A, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 123, magnetic disk 129, (magneto) optical disk 131, ROM 124 or RAM 125, such as an operating system 135 (for example, Windows NT® 4.0, sold by Microsoft Corporation of Redmond, Wash.), one or more application programs 136, other program modules 137 (such as ReActor infrastructure and Microsoft Interactive Sound System, both from Microsoft Corporation of Redmond, Wash., for example), and/or program data 138 for example. A user may enter commands and information into the personal computer 120 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB). The video monitor 147 or other type of display device may also be connected to the system bus 123 via an interface, such as a video adapter 148 for example. The video adapter 148 may include a graphics accelerator (e.g., Intense 3D Pro 1000 or Intense 3D Pro 2200 from Intergraph Corporation of Huntsville, Ala.). One or more speakers 162 may be connected to the system bus 123 via a sound card 161 (e.g., a wave table synthesizer such as product number AWE64 Gold Card from Creative Labs of Milpitas, Calif.). In addition to the monitor 147 and speaker(s) 162, the personal computer 120 may include other peripheral output devices (not shown), such as a printer for example.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device 150 has been illustrated in FIG. 1A. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

Figure 1B:
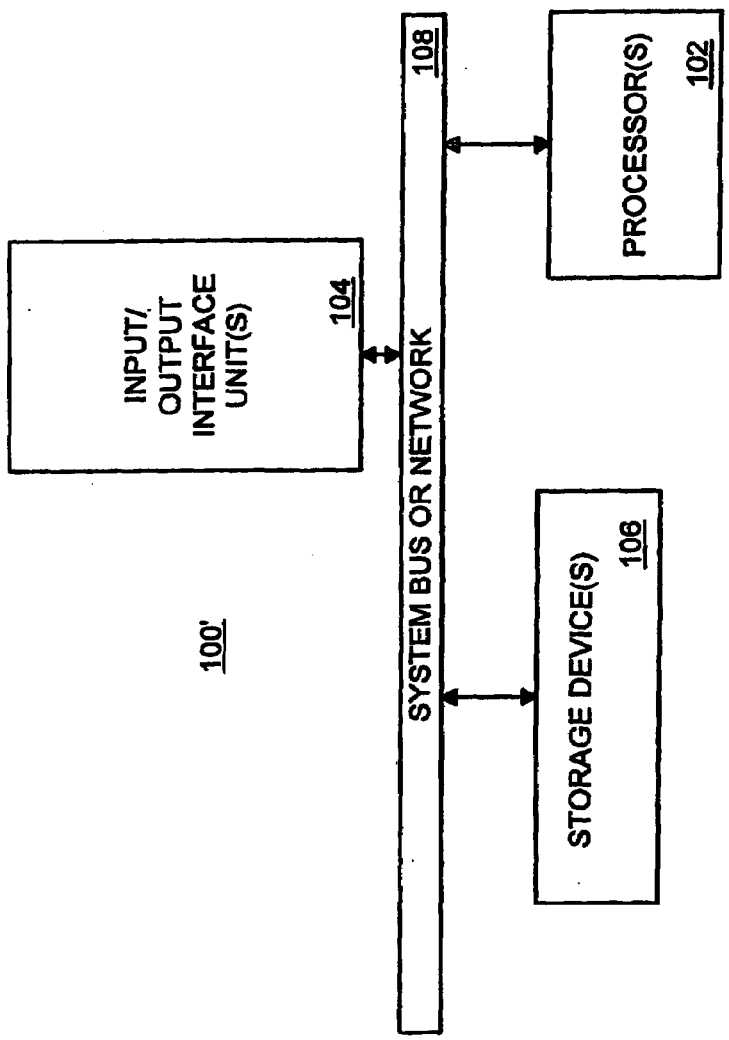

FIG. 1B is a more general machine 100' which may effect one or more of the processes discussed above. The machine 100' basically includes a processor(s) 102, an input/output interface unit(s) 104, a storage device(s) 106, and a system bus or network 108 for facilitating data and control communications among the coupled elements. The processor(s) 102 may execute machine-executable instructions to effect one or more aspects of the present invention. At least a portion of the machine executable instructions and data structures may be stored (temporarily or more permanently) on the storage devices 106 and/or may be received from an external source via an input interface unit 104.

§ 4.2.2 Exemplary Displays

As discussed in § 4.1 above, present invention may provide a graphical user interface in which a number of windows or planes depict different types of related information. The display 200 of an exemplary graphical user interface, for use in the context of planning a trip, is depicted in FIG. 2A. The display 200 includes a number of windows 210, 220, 230, and 240. A first window 210 represents a bulletin board upon which notes (none shown in this Figure) containing things that a user wants to do (e.g., see a Redskins game, visit Aunt Bettie, see autumn foliage, see an aquarium, and see the Statue of Liberty) are posted. A second window 220 is a map for depicting places (e.g., Washington, D.C., Aunt Betty's home town in Delaware, Vermont or Virginia, Baltimore or Camden, New York harbor, etc.) to be visited during the vacation. A third window 230 is an information browser, such as an Internet browser for example, for finding information related to things that the user wants to do. Finally, a fourth window 240 is a calendar for depicting when various places will be visited during the vacation. In this example, the calendar permits three (3) alternative trips to be compared and the trip will span two (2) weeks.

Figure 2B:
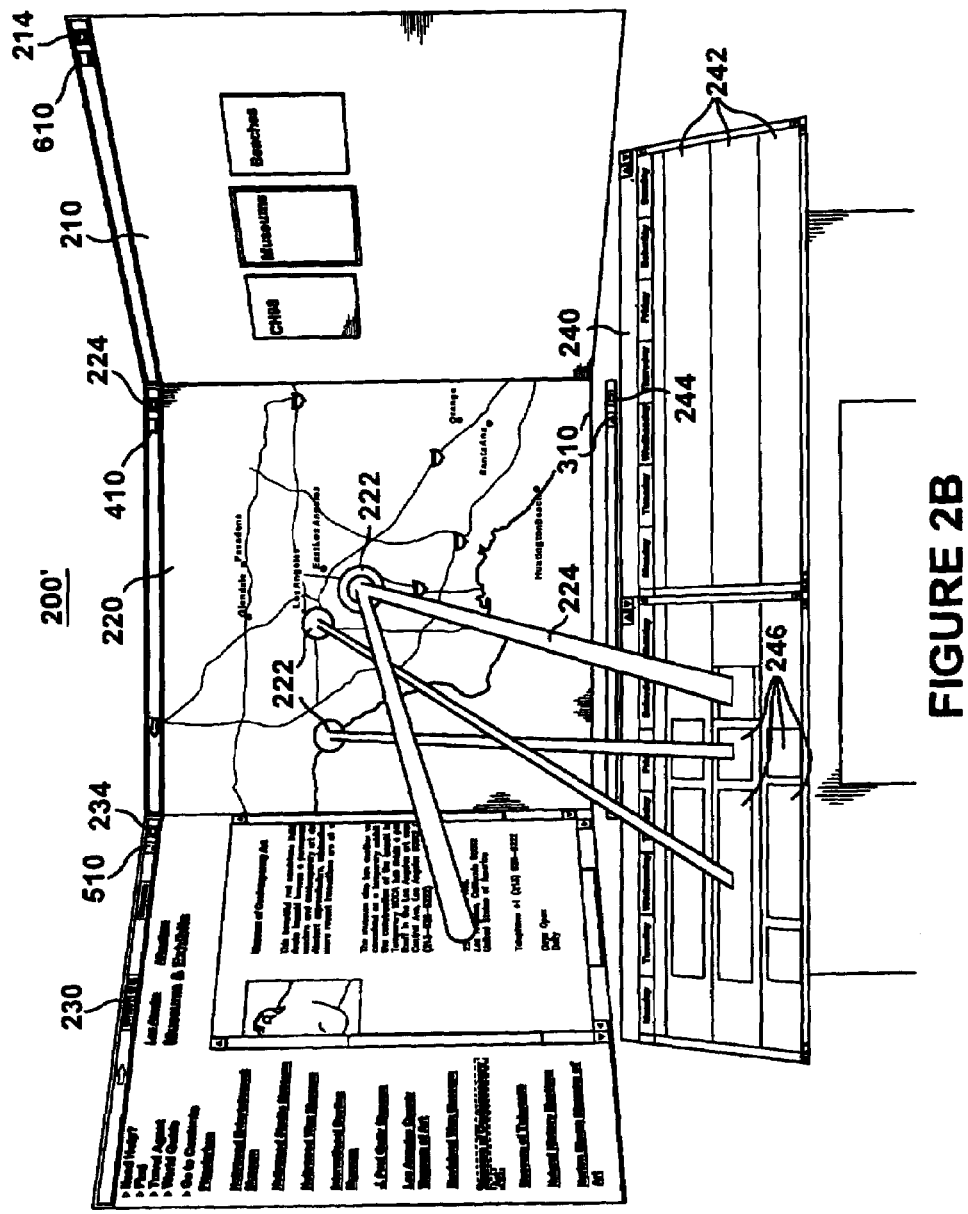

FIG. 2B is a display 200' in which the windows 210, 220, 230 and 240 depict relevant information. For example, the bulletin board window 210 includes a number of notes 212 on which the user may jot down things that they want to do on their trip. The contents of the notes 212 are unconstrained—they are free form textual inputs. This facilitates initial user vagueness or uncertainty. The map window 220 depicts a map, in which places 222 to be visited are highlighted, with a colored marker icon for example. The colors of the highlighting may match various colors of related notes 212. The Internet browser window 230 includes information which may be related to the notes 212 on the bulletin board window 220, the places 222 on the map window 220, and/or to dates 241 on the calendar window 240. For example, as described in more detail below, information entered on a note 212 may be used to generate a query which is launched via the Internet browser 230. Similarly, a place entered on a map and/or a date entered on a calendar may also be used to generate a query. Any geographic information in a web page rendered on the Internet browser 230 may be visually linked with related information on the map window 220, with translucent colored ray 223. The information on the map may be visually linked with related information on the calendar 240, with translucent colored ray 224. Finally, the calendar window 240 includes three (3) alternative trip scenarios 242. Each of the scenarios may include one or more segments 246. The segments typically have a corresponding note 212 on the bulletin board window 210 which has a corresponding color.

Figure 2C:
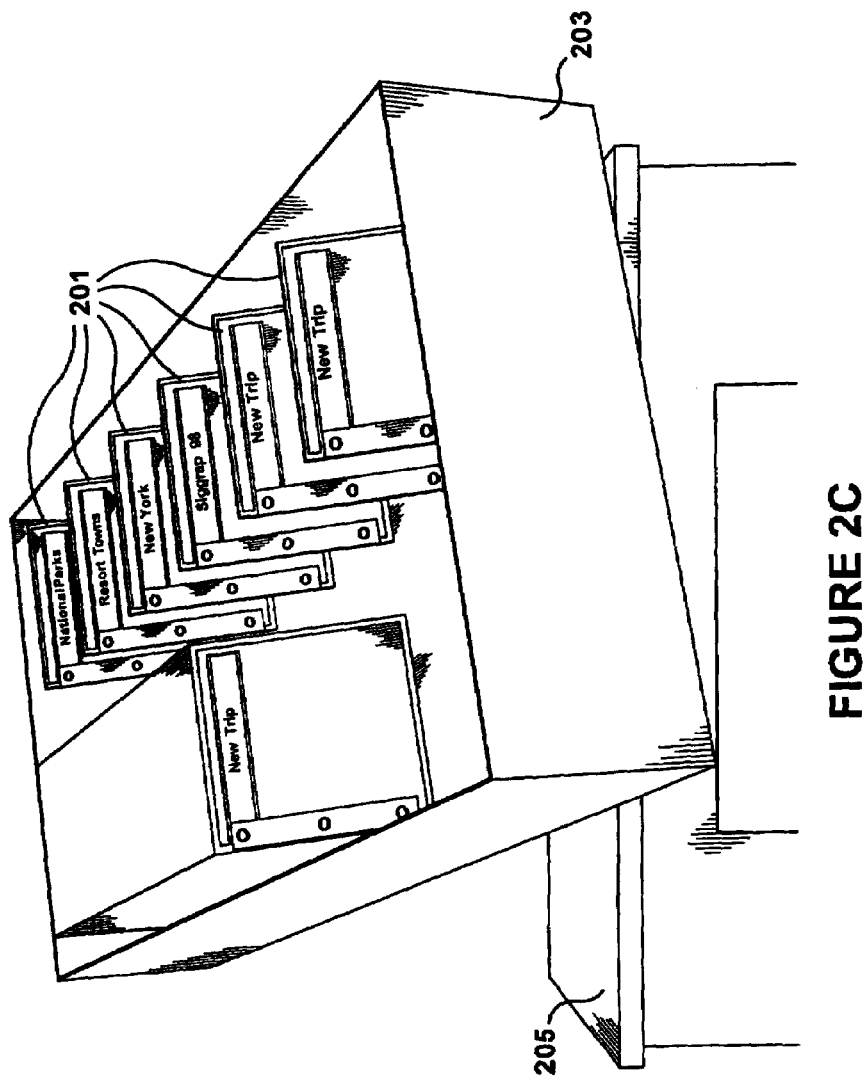

Note that each of the windows 210, 220, 230, and 240 can represent a sheet of a folder. Referring to FIG. 2C, various folders 201 corresponding to various trips (or other objects of a decision making process) may be stored in a box representation 203. As shown in FIGS. 2C and 2D, the box 203 may be arranged on the top surface of a desk representation 205. The desk 205, box 203, and folder 201 metaphors may be rendered when starting and exiting the user interface of the present invention. Alternatively, a new or existing trip file may be opened in the user interface of the present invention and managed via a known file management utility, such as File Manager of Windows NT® for example.

Recall that user interaction with any given window should be easy. By clicking the maximize button 214, 224, 234, or 244 of any one of the windows, that window is presented in a focus view. A user may then return to the default display 200' by clicking the minimize button 314, 414, 514, or 614 of any of the windows then in the focus view, which is described below. Users may act on windows in both the default and the focus view; the focus view serves to provide extra screen space to a specific window.

Figure 3:
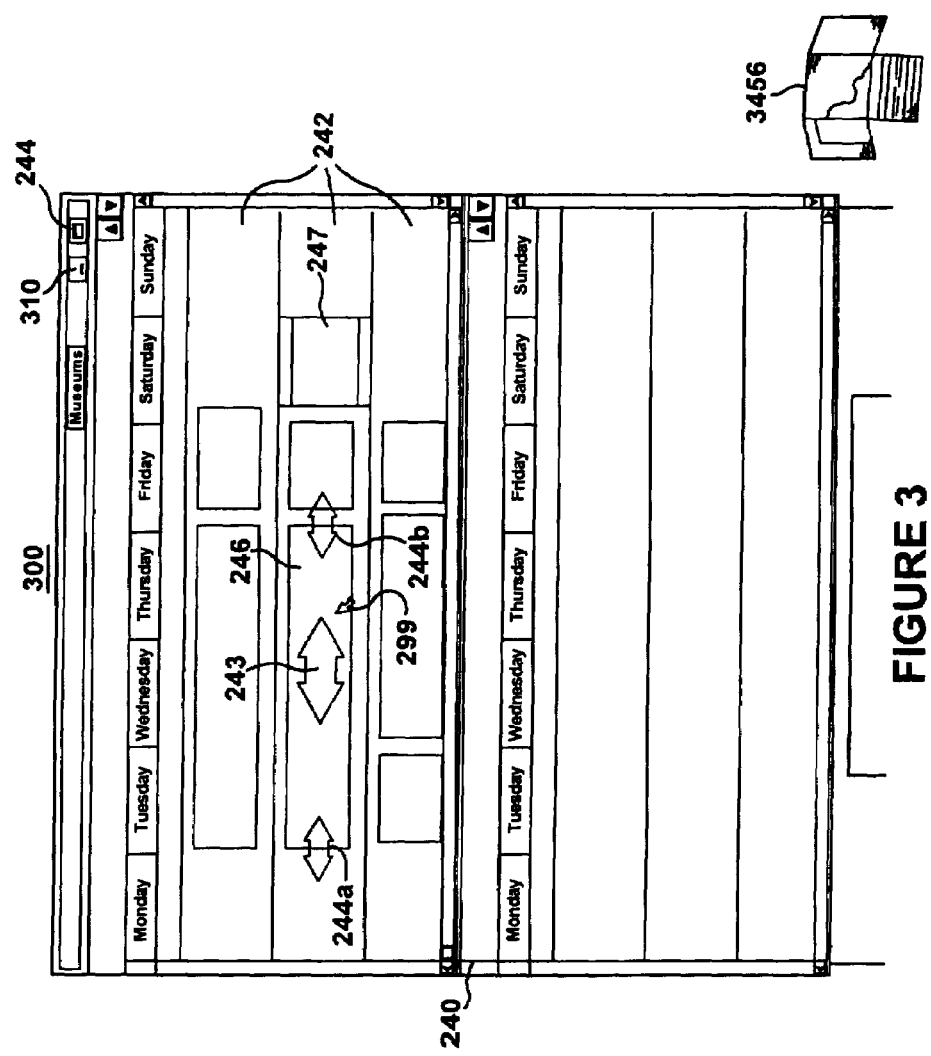
FIG. 3 is a display of a calendar window, in a focus view, of a user interface in accordance with an exemplary embodiment of the present invention.

FIG. 3 is a display 300 which depicts the calendar window 240 in focus view. The displayed calendar window 240 allows three (3) alternative plans 242 to be entered. Each of the three (3) alternative plans 242 has a first week (among the top group of the alternatives) and a second week (among the bottom group of the alternatives). Trip intervals 246 may be automatically generated from temporal information within a note 212 on the bulletin board window 210 and/or from temporal information extracted from a file rendered on the browser window 230, or they may be manually added by a user. Calendar information may also be provided from a network-based groupware application such as Microsoft Exchange™. When a cursor 299 is positioned "on", or relatively close to, an interval 246, "handles" for manipulating the interval may be presented. In this case, a first handle 243 may be used to drag the interval, in its entirety, forward (right) or backward (left) in time. Further handles 244a and 244b may be used to move the start or end of the interval, respectively, forward (right) or backward (left) in time.

In general, when an interval 246 is moved to an area (time or date) occupied by another interval, it will "push" that other interval. However, an interval may be fixed in time, either automatically or in response to a user command, such that when another interval is moved into its area (time), that other interval will be divided over the fixed interval, or jump, in its entirety, to the other side of the fixed interval. As shown in FIG. 3, a fixed interval 247 may be rendered differently from normal intervals 246.

If a minimize button 310 is activated by the user, the trip folder 201 is folded up and returned to the box of trips 203. If the maximize/minimize toggle button 244 is activated, default display 200' is reentered. Finally, as shown in FIG. 3, in addition to the calendar window 240, a WIM tool 3456 is displayed. In response to a user activating (e.g., clicking) any of the faces of the WIM tool 3456, a corresponding window is displayed. The WIM tool 3456, even if inactive, serves as a map to aid inter-window navigation by the user. Thus, as can be appreciated, when the calendar view 300 is displayed in focus view, an downward flicking gesture will cause the map window 220 to be displayed in the focus view.

Figure 4A:
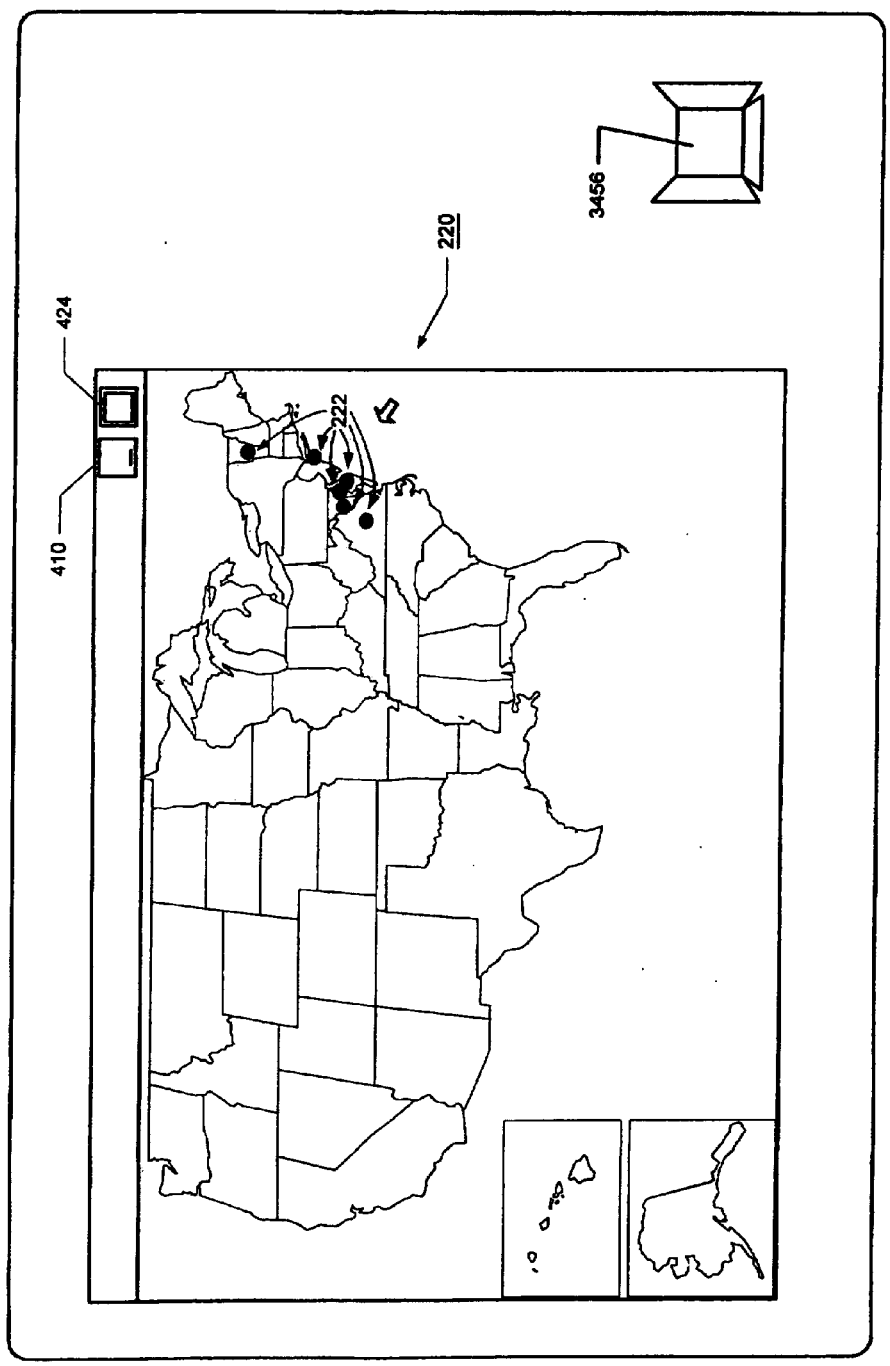
FIG. 4A is a high level diagram of a display.
Figure 4B:
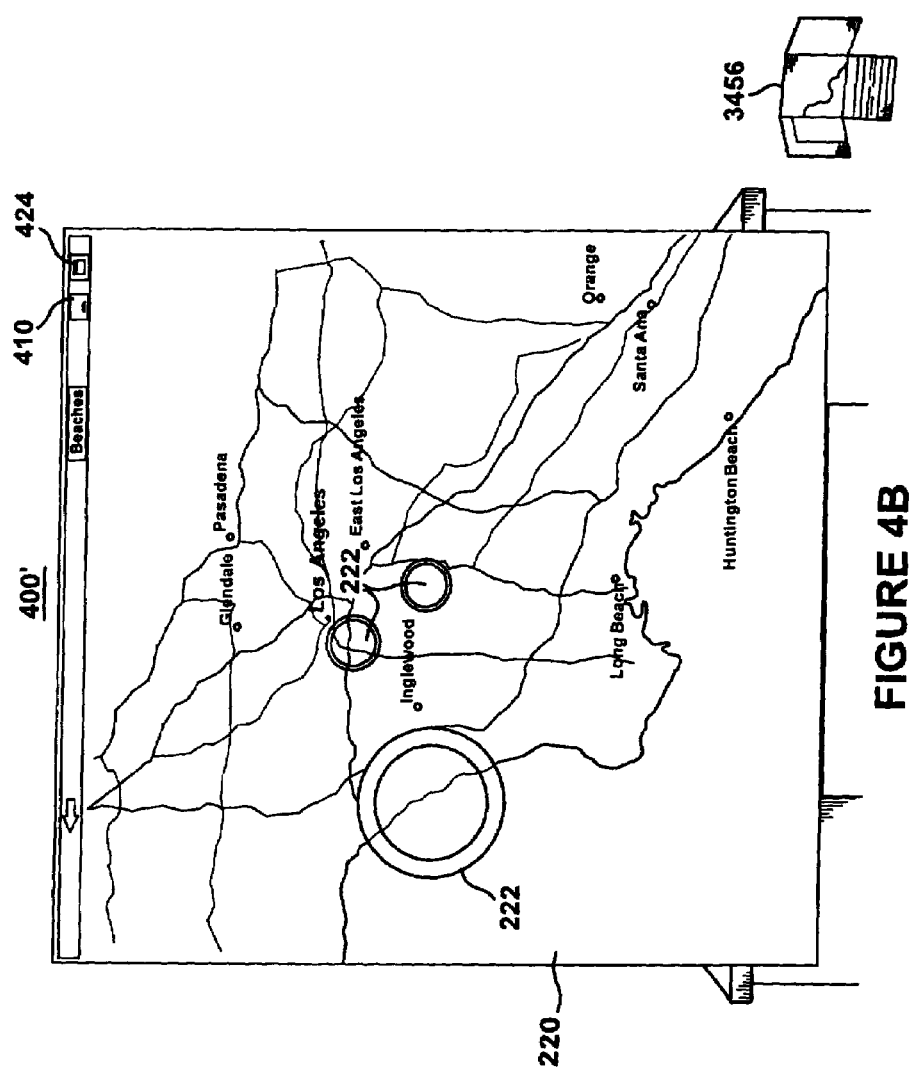
FIG. 4B is an actual display, of a map window, in a focus view, of a user interface in accordance with an exemplary embodiment of the present invention.

FIG. 4A is a high level diagram of a display 400, and FIG. 4B is an actual display 400', of a map window 220 in a focus view. Locations of events are depicted with markers such as circles, as shown in FIGS. 4A and 4B. These circles may be colored to match colors of corresponding notes 212 on the bulletin board window 210 and intervals 246 or 247 on the calendar window 240. These markers may be moved by the user, for example using traditional drag-and-drop mouse gestures. Further, the user may add or delete events from the map. In one implementation, when an event is added to the map, a note 212 with the name of the location is added to the bulletin board 210 and a query may be launched. Finally, the user can navigate the map via zoom-in, zoom-out, and scrolling commands or command tools (not shown).

If a minimize button 410 is activated by the user, trip folder 201 is folded up and returned to the box of trips 203. If the maximize/minimize toggle button 424 is activated, the default display 200' is reentered. In addition to the map window 220, a WIM tool 3456 is displayed. In response to a user activating (e.g., clicking) any of the faces of the WIM tool 3456, a corresponding window is displayed. To reiterate, the WIM tool, even if inactive, aids inter-window navigation. Thus as can be appreciated, when the map window 220 is displayed in focus view 400/400', a right, left, or upward flicking gesture will cause the browser window 230, the bulletin board window 210, or the calendar window 240, respectively, to be displayed in the focus view.

Figure 5A:
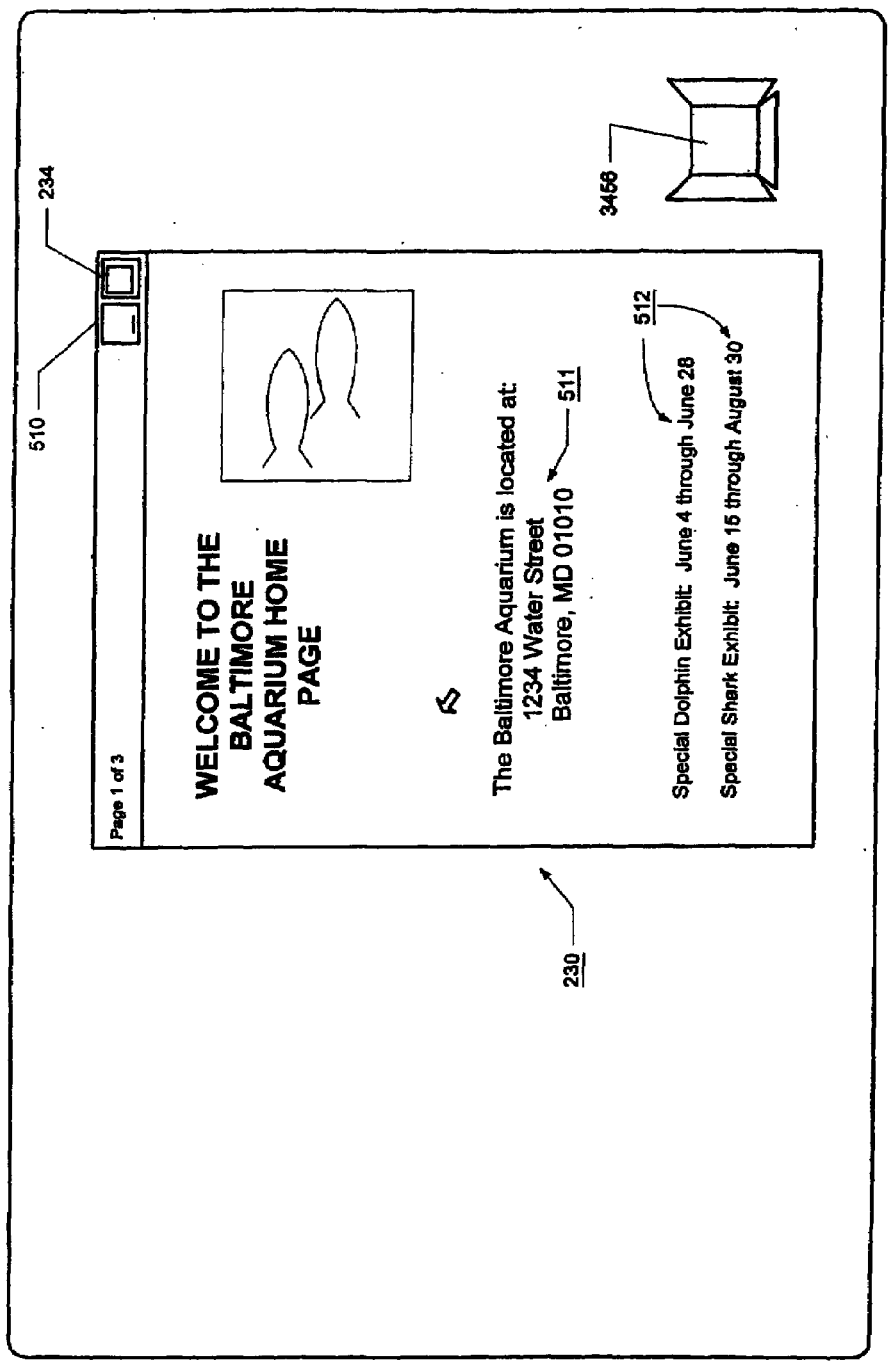
FIG. 5A is a high level diagram of a display.
Figure 5B:
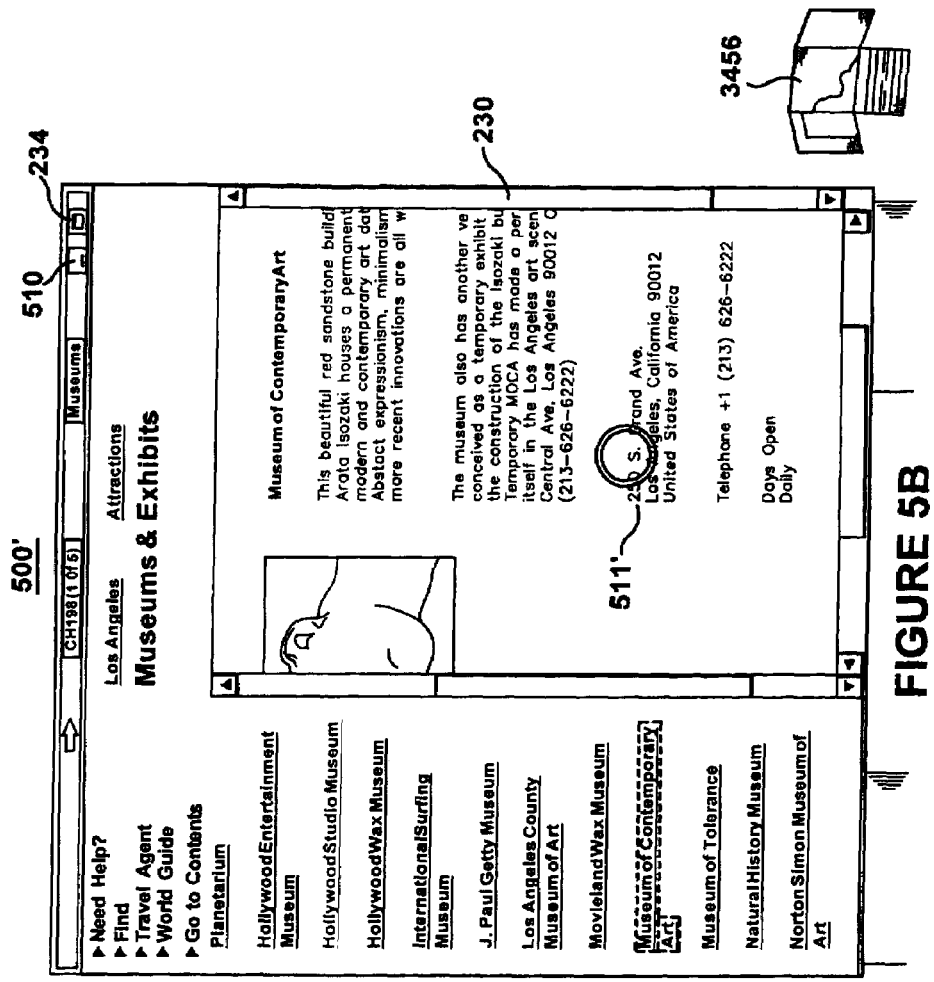
FIG. 5B is an actual display, of a browser window, in a focus view, of a user interface in accordance with an exemplary embodiment of the present invention.

FIG. 5A is a high level diagram of a display 500, and FIG. 5B is an actual display 500', which depict the browser window 230 displayed in focus view. The browser window 230 renders a retrieved web page, such as an HTML web page for example. Places (e.g., addresses) 511 and/or times or dates 512 may be extracted from the rendered web page and displayed on the map window 220 and/or the calendar window 240, respectively. If a minimize button 510 is activated by the user, trip folder 201 is folded up and returned to the box of trips 203. If the maximize/minimize toggle button 234 is activated, the default display 200' is reentered. As was the case with the calendar window 240 and the map window 220, in addition to the browser window 230, a WIM tool 3456 is displayed. In response to a user activity (e.g., clicking) any of the faces of the WIM tool 3456, a corresponding window is displayed. When in the browser view 500/500', a left flicking gesture will cause the map window 220 to be displayed in the focus view.

FIG. 6A is a high level diagram of a display 600, and FIG. 6B is an actual display 600', which depict the bulletin board window 210 in focus view. A note 212 can be opened in response to a user command, such as clicking on an empty portion of the bulletin board for example. A blank note 212 will then be brought to a preferred viewing position (e.g., to the right foreground) as shown in FIG. 6C. Text may then be entered onto the note 212'. Similarly, an existing note may be edited by selecting (e.g., via a mouse click) the note to bring it to the preferred viewing position. From the preferred viewing location, the default view 200' can be reentered by deselecting (e.g., by double-clicking or a flicking gesture) the note 212'. When the note is returned to the bulletin board 210, the text may be used by the system to launch a query using the browser (See, e.g., FIG. 6D.), any dates may be indicated on the calendar window 240, and/or any places or addresses may be indicted on the map window 220 (See, e.g., FIG. 6E.).

The notes 212 can be repositioned on the bulletin board 210 using, for example, traditional drag and-drop mouse operations.

Referring back to FIGS. 6A and 6B, if a minimize button 610 is activated by the user, trip folder 201 is folded up and returned to the box of trips 203. If the maximize/minimize toggle button 214 is activated, the default display 200' is reentered. In addition to the bulletin board window 210, a WIM tool 3456 is displayed. In response to a user activating (e.g., clicking) any of the faces of the WIM tool 3456, a corresponding window is displayed. As can be appreciated, when in the bulletin board view 600/600', a right flicking gesture will cause the map window 220 to be displayed in the focus view.

Recall that in each of the focus views shown in displays 300, 400/400', 500/500', and 600/600' of FIGS. 3, 4A, 4B, 5A, 5B, 6A, and 6B, respectively, a world-in-miniature (or "WIM") tool 3456 is provided. Recall further that the WIM tool 3456 includes a miniature representation of the display 200' and includes a miniature bulletin board window representation 210", a miniature map window representation 220", a miniature browser window representation 230", and a miniature calendar window representation 240". Clicking any of the miniature windows representations will bring the corresponding window into the focus view. World-in-Miniature tools are discussed in the article, R. Stoakley, M. J. Conway, R. Pausch, "Virtual Reality on a WIM: Interactive Worlds in Miniature", downloaded from http://www.cs.cmu.edu/~stage3/publications/95/conferences/chi/paper.html.) on Jul. 30, 1998 (referred to as "the WIM article").

§ 4.2.3 Exemplary User-GUI Interaction (State Diagram)

FIG. 7 is diagram illustrating states and state transitions that may be used by the exemplary trip planner of the present invention. When in a stand-by or default state 710, the present invention may render display 200'. If a cursor, the position of which may be controlled by a user input to a pointing device which may provide a two-dimensional input, is positioned over an empty spot on the bulletin board window 210 and a note creation command, such as a mouse click for example, is entered, or if the cursor is positioned over a note 212 on the bulletin board window 210 and a note edit command, such as a mouse click for example, is entered, the bulletin board update state 720 is entered. This state 720 is discussed in more detail in § 4.2.5 below with reference to FIG. 16. In this state, the user may (a) create a new note or (b) edit an existing note. In either case, the note 212 being created or edited is brought to the foreground of the display 200'. (Recall FIG. 6C.) The note may correspond to events or themes of the vacation (e.g., visit Aunt Betty, see autumn foliage, see Redskins game, visit an aquarium, see the Statue of Liberty). The contents of the note 212 may be used to generate a query to be launched via an information browser, such as an Internet browser or a address list (or "contacts" found in the Outlook™ program sold by Microsoft Corporation of Redmond, Wash.). A query based on the contents of the note 212 may be launched when a note 212 is commanded, using a mouse flickering gesture for example, to be placed back (or "posted") on the bulletin board 210. The movement of the note 212 from the foreground of the display 200 to the bulletin board window 210 may be accompanied by an animation. For example, a note "See the Statue of Liberty" may uncover a home page of the Statue of Liberty or a note "Visit Aunt Betty" may uncover a contact file for Aunt Betty. The query may also include other information, such as a user profile for example. The user profile may be based on explicitly entered information and/or information inferred from past use of the application, or other applications, by the user. For example, if the user profile indicates that a user is an architecture buff, the note "Statue of Liberty" may also uncover architecturally significant buildings in downtown Manhattan.

The information returned may include information relevant to one of the windows. In the context of the trip planning application, such information (which may be referred to as "factoids") may include dates, places, addresses, proper names, etc. Thus, if, as shown in FIG. 7, the information uncovered in the query includes time or date factoids, the calendar generation or update state 740 is entered. This state 740 is discussed in more detail in § 4.2.5 below with reference to FIG. 18. For example, if a contact file for Aunt Betty includes her birthday, that date will be reflected in the calendar window 240 or if the Statue of Liberty home page has a date of an upcoming special event, the date of that event will be reflected in the calendar window 240.

Similarly, if the information uncovered in the query includes geographic or address factoids, the map generation or update state 730 is entered. This state 730 is discussed in more detail in § 4.2.5 below with reference to FIG. 17. For example, if a contact file for Aunt Betty includes her home address, the address, at an appropriate level (street, city, county, state) of detail will be reflected in the map window 220 or if the Statue of Liberty home page has its location, that information will be reflected, at an appropriate level of detail, in the map window 220.

Naturally, if the geographic scope of the trip is defined in the map window 220 or the temporal scope of the trip is defined in the calendar window 240, place or time factoids that fall within the defined geographic scope or temporal scope, respectively, will be considered particularly relevant.

Referring to the bulletin board update state 720, if the cursor is removed from the bulletin board, the standby state 710 is reentered. Also, in the map generation or update state 730 and the calendar generation or update state 740, after the factoid induced map 220 or calendar 240 is generated, the standby state 710 is reentered 710.

The map generation or update state 730 may also be entered from the standby state 710 when the cursor is positioned on the map window 220. The standby state 710 is reentered when the cursor is taken off of the map window 220. Similarly, the calendar generation or update state 740 may also be entered from the standby state 710 when the cursor is positioned on the calendar window 240. The standby state 710 is reentered when the cursor is taken off the calendar window 240.

Also, from the standby state, if the map window 220, browser window 230, calendar window 240, or bulletin board window 210 is maximized, then the map focus view state 750 (Recall FIGS. 4A and 4B.), the browser focus view state 760 (Recall FIGS. 5A and 5B.), the calendar focus view state 770 (Recall FIG. 3.), or the bulletin board focus view state 780 (Recall FIGS. 6A and 6B.), respectively, is entered into. As mentioned above, the standby state is reentered from any of the focus view states when the window then in the focus view state is minimized (Recall buttons 310, 410, 510, and 610.).

As discussed above, each of the windows may be thought of as a surface of a geometric object, in this case, as four (4) sides of a cube for example. Therefore, by rotating the cube, the window in a focus view can be changed. For example, referring to FIGS. 2A, 2B, and 7, from the map focus view state 750, a right "flicking" (e.g., holding a mouse button briefly while moving the mouse to the right) gesture causes entry into the bulletin board focus view state 780, a left flicking gesture causes entry into the information browser focus view state 760, and a downward flicking gesture causes entry into the calendar focus view state 770. Similarly, from the information browser focus view state 760, a right flicking gesture causes entry into the map focus view state 750. From the bulletin board focus view state 780, a left flicking gesture causes entry into the map focus view state 750. Finally, from the calendar focus view state 770, an upward flicking gesture causes entry into the map focus view state 750. Transitions from one focus view state to another may be accompanied by a short rotation animation and associated audio to reinforce the cube metaphor. As discussed above, though not shown in FIG. 7 for purposes of clarity, various focus view states may be entered using a world-in-miniature (or "WIM") tool 3456. Further, as discussed above, the WIM tool 3456, even if inactive, can serve as an inter-window navigation aide.

Having described exemplary displays and states which may be used by the present invention, exemplary processes and data structures are now described in § 4.2.4 below with reference to FIGS. 8 through 12.

§ 4.2.4 Exemplary Processes and Data Structures

§ 4.2.4.1 Exemplary Processes

FIG. 8 is a diagram of processes and stored data which may be used to effect, at least certain aspects of, the user interface of the present invention. Basically, the processing by the present invention may be thought of as a sequence of cycles. In each cycle, user inputs are accepted, states are determined, windows are updated, if necessary, based on such user inputs, and a display is rendered (and audio is output) based on the state and the contents of the windows. Referring to FIG. 8, user inputs are managed by an input management process (or more generally, "an input manager") 820. Referring back to FIG. 1A, this process may be carried out by the pointer 142, the serial port interface 146, and program modules 137. Any user inputs may be provided to an input command queue 822 for buffering. The queued commands are then read by an interface management process 810.

The interface management process 810 will maintain a present location of a cursor. The information browser view management process (or more generally, "an information browser manager") 852, the bulletin board view management process (or more generally, "a bulletin board manager") 854, the map view management process (or more generally, "a map manager") 856, and the calendar view management process (or more generally, "a calendar manager") 858 manage the browser window 230, the bulletin board window 210, the map window 220, and the calendar window 240, respectively. Each of these processes maintains status information of its associated window. If any one of these windows is maximized, or if a window representation in a world-in-miniature (or "WIM") tool 3456 is selected, the focus view generation process (or more generally, "a focus view generator") 870 is invoked. Consequently, the output generation process (or more generally, "an output generator") 830 will generate a display with the appropriate window in the focus view.

If the window in the focus view is changed, for example by a flicking gesture or by selecting another window in the WIM tool 3456, then the focus view update process (or more generally, "a focus view update facility") 880 is invoked. The change from one window in the focus view to another may be accompanied by a stored animation 882 and a sound cue 884. The output generation process 830 generates a video display of this animation.

If a user enters information into any of the windows, such as the entry of a note of the bulletin board window 210 for example, the implicit query process (or more generally, "a implicit query facility") 840 is invoked. The query may use the information browser, such as an Internet browser or address file for example, to facilitate the query. (An exemplary implicit query method is disclosed in U.S. patent application Ser. No. 09/152,713, entitled "Methods, Apparatus and Data Structures for Providing a User Interface which Exploits Spatial Memory in Three Dimensions, to Objects, and which Visually Groups Matching Objects," filed on Sep. 14, 1998, and incorporated herein by reference.) The results of the query are then submitted to a factoids extraction process (or more generally, "a factoids extractor") 845. If any times, dates, or places are returned, the calendar window 240 or map window 220, respectively, are updated based on such factoid information.

Having described processes which may be used by the present invention, exemplary data structures which may be used by the present invention are described in §4.2.4.2 below.

§4.2.4.2 Exemplary Data Structures

FIGS. 9 through 12 illustrate exemplary data structures which may be used by the present invention. Referring first to FIG. 9, recall that notes 212 can be entered or edited and posted on the bulletin board window 210. The data structure 900 includes records 910. Each of the records 910 corresponds to a note 212 and may include a field 912 containing a value for uniquely identifying the note 212, a field 914 containing a location of the note 212, a field 916 for indicating a state (e.g., active or inactive) of the note 212, and a field 918 for storing content (e.g., text) of the note 212.

Referring to FIG. 10, recall that the calendar window 240 may include a number of alternative trip plans. Each of the trip plans includes one or more events (e.g., see a Redskins game, visit Aunt Betty, visit an aquarium, see autumn foliage, see the Statue of Liberty). The data structure 1000 includes records 1010. Each of the records 1010 corresponds to a trip plan and may include a field 1012 for containing a unique identifier for identifying each of the alternative trip plans, fields 1014 for containing the start time of each of the events, and fields 1016 for containing the end time of each of the events.

Referring to FIG. 11, recall that entering information, such as flicking a note 212 onto the bulletin board window 210 for example, in one window may be used to generate a query for processing by the information browser. The returned information 1100 includes records 1110 corresponding to each piece (e.g., a web page or a contact card) of returned information. Each record 1110 may include a field 1112 for containing an identifier for the related information, a field 1114 for containing a related information rank, and a field 1116 for containing a related information state (e.g., active or top-of-stack, inactive, next-in-stack, etc.). Therefore, if the contents of a note 212 entered on the bulletin board window 210 are used to generate a query launched via an Internet browser, a number of web pages may be returned. The web pages may be identified by their URL ("Uniform Resource Locator"), be rank ordered based on their perceived relevance, and be active and shown on the browser window 230 or inactive. Thus, a number of web pages (or other content being browsed) may be cycled through by the user.

Figure 12:
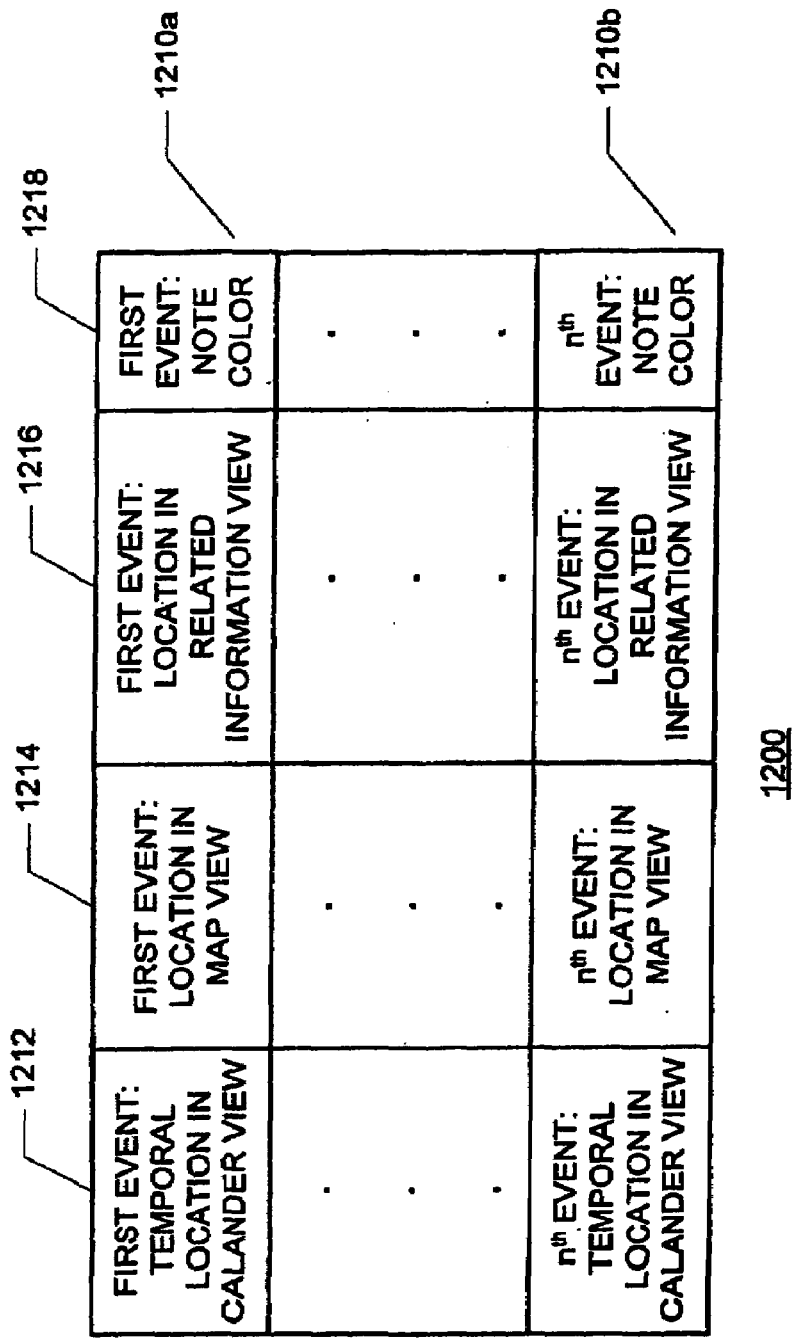

Referring to FIGS. 2B and 12, recall that related information in the various windows are visually linked, for example, with translucent colored rays. An event defines a group of related information. That is, a Statue of Liberty event may include a note 212 to visit the Statue of Liberty on the bulletin board window 210, a marker at the location of the Statue of Liberty on the map window 220, a home page of the Statute of Liberty on the information browser window 230, and a date of a special event at the Statue of Liberty on the calendar window 240. As shown in FIG. 12, each event has a record 1210. Each record 1210 may include a field 1212 for containing a temporal location of the event on the calendar window 240, a field 1214 for containing a location of the event on the map window 220, a field 1216 for containing a location of the event on the browser window 230, and a field 1218 for containing a unique color associated with the event. Actually, since the calendar window 240 may include a number of alternative trip plans, it may show a given event at different (or the same) dates in different trip alternatives. Therefore, the field 1212 may include a location of an event for each of the alternative trip plans.

§ 4.2.5 Exemplary Methodologies

Having described various displays, processes, and data structures above, methodologies for effecting at least some of the processes described in § 4.2.4.1 above are now described with reference to FIGS. 13 through 20.

FIG. 13 is a flow diagram of a main routine 1300 which may be run or managed by the interface management process 810. First, as shown in step 1302, a user input is accepted. (Recall user input management process 820 and input command queue 822.) Next, as shown in decision step 1304, it is determined whether or not the user has entered an "exit" (or "quit") command. If so, the main routine 1300 is terminated via return node 1306. If, on the other hand, no exit command was entered, processing continues at step 1308 where a state of an appropriate window is updated, if necessary. (Recall states 720, 730, and 740 of FIG. 7.) Next, related information is gathered in step 1310. (Recall the implicit query process 840 and the factoids extraction process 845 of FIG. 8.) Then, the states of the other windows are updated, if necessary, in step 1312. (Recall transitions from state 720 to states 730 and 740 in FIG. 7.)

In decision step 1316, it is determined whether a particular window is in the focus view. (Recall states 750, 760, 770, and 780 of FIG. 7, and FIGS. 3, 4, 5, and 6.) If so, as shown in step 1318, the particular window is displayed in the focus view. (Recall process 870 of FIG. 8 and states 750, 760, 770, and 780 of FIG. 7.) Processing then returns to step 1302. If, on the other hand, no particular window is in the focus view, as shown in step 1320, then all of the windows are displayed. (Recall FIGS. 2A and 2B and state 710 of FIG. 7.) Since all of the windows have been updated and may include related information, such related information is visually associated. In step 1324, visual links between related information in various windows are generated. (Recall process 860 of FIG. 8.) Also recall from FIG. 12 that related information are associated with an event and that the locations of the related information in a given event are stored in records 1210. Processing then returns to step 1302.

Recall from FIG. 13, that related information is obtained in step 1310. FIG. 14 is a flow diagram of an exemplary process 1310' for obtaining related information. First, an implicit query process is invoked as shown in step 1410. (Recall process 840 of FIG. 8.) The query may be formed, at least in part, based on words entered on a note. Though not described in detail here, the query may also be formed, at least in part, based on a place entered on the map window 220 or a date entered on the calendar window 240. Recall that information from a user profile may also be used when generating the query. Then, as shown in step 1420, a factoids extraction process is invoked. (Recall process 845 of FIG. 8.) That is, if the information returned from the query includes a time or date, or a place such information is depicted on the calendar window 240 or the map window 220, respectively. The process 1310' is then terminated via return node 1430.

Recall from FIG. 13 that the state of an appropriate window may be updated at step 1308. FIG. 15 is a flow diagram of an exemplary process 1308' for updating an appropriate one of the windows. First, at decision step 1510, it is determined whether or not the cursor is on the bulletin board window 210. If so, a bulletin board view manager is invoked (Recall process 854 of FIG. 8.) as shown in step 1515 and processing continues at decision step 1520. If not, processing simply continues at decision step 1520. At decision step 1520, it is determined whether or not the cursor is on the map window 220. If so, a map view manager is invoked (Recall process 856 of FIG. 8.) as shown in step 1525 and processing continues at decision step 1530. If not, processing simply continues at decision step 1530. At decision step 1530, it is determined whether or not the cursor is on the calendar window 240. If so, a calendar view manager is invoked (Recall process 858 of FIG. 8.) as shown in step 1535 and processing continues at decision step 1540. If not, processing simply continues at decision step 1540. Finally, at decision step 1540, it is determined whether or not the cursor is on the information browser window 230. If so, an information browser view manager is invoked (Recall process 852 of FIG. 8.) as shown in step 1545 and the process 1308' is terminated via return node 1550. If not, the process 1308' is simply terminated via return node 1550.

Recall from FIG. 15 that the bulletin board view manager (Recall process 854 of FIG. 8) may be invoked at step 1515. FIG. 16 is a flow diagram of an exemplary process 1515' for managing the bulletin board. Basically, the bulletin board management process 1515' permits (a) notes to be created or edited, (b) queries to be generated and launched, and (c) notes to be repositioned.

First, regarding creating (or editing) notes, as shown in decision step 1610 if the user generates a note creation input, such as a mouse click when the cursor is located on a blank part of the bulletin board window 210 for example, a note is created as shown in step 1612 and entered text is accepted as shown in step 1614. Processing then continues at decision step 1615. Returning to decision step 1610, if the user does not generate a note creation input, processing branches to decision step 1615. At decision step 1615, if an edit command, such as a mouse click when the cursor is located on a note 212 for example, is entered, the note 212 is edited based on (mouse and/or keyboard) entries as shown in step 1616, and processing continues at decision step 1620. If a double click is entered when the cursor is on a note 212, that note will be "pulled" from the bulletin board 210 and moved to a preferred viewing location as shown in FIG. 6C. If a double click is entered when the cursor is on a note in the preferred viewing location, it will be returned to the bulletin board 210 at the position that it formerly occupied. Otherwise, processing simply proceeds to decision step 1620. A note 212 being created or edited may be rendered at the foreground of the display 200'. (Recall FIG. 6C.)

Now, regarding the generation and launching of queries, if a user launches a note-based query, for example by flicking the note 212 towards the bulletin board window 210, a query, based, at least in part, on the contents of the note 212, is generated and launched. More specifically, in the context of an Internet browser, a query is run for home pages on the Internet based on the contents of the note as shown in step 1630. Then, the rank ordered web pages (Recall FIG. 12) are retrieved as shown in step 1640. Next, any factoids, such as times or dates and places, are extracted from the retrieved web pages as shown in step 1650. Next, as shown in decision steps 1660 and 1670, if there are no dates and places, the process 1515' is terminated via return node 1680. If, on the other hand, there are any places extracted, a relevant map is retrieved as shown in step 1662. If any dates are extracted, a calendar is generated on the calendar window based on such dates, or a calendar on the calendar window is updated, as shown in step 1672.

Returning to step 1620, if a query is not launched, processing continues at decision step 1690. At decision step 1690, it is determined whether the user is commanding to move the note, such as with a mouse drag operation for example. If not, the process 1515' is terminated via return node 1680. If so, the location of the note on the bulletin board is updated in step 1692. A note drag may be accompanied by a scraping sound, the pitch, volume, and timbre of which may be varied based on the velocity and direction of the note drag.

Recall from FIG. 15 that the map view manager (Recall process 856 of FIG. 8) may be invoked at step 1525. FIG. 17 is a flow diagram of an exemplary process 1525' for managing the map. Basically, the map management process 1525' permits (a) the map to be navigated and (b) events to be relocated or deleted. First, as shown in step 1710, a map is generated based on the query results. For example, if the note 212 that generated and launched a query read "visit a public aquarium", the Baltimore and Camden aquarium home pages may have been returned. The locations of these aquariums would be extracted and a map window 220, showing both Baltimore, Md. and Camden, N.J. would be generated. As shown in FIG. 4A, the map generated may include markers, such as translucent colored circles for example, matching the color of the note, at or around Baltimore, Md. and Camden, N.J. If the markers are rendered as translucent colored circles, the radius of these circles may be changed by user input.

Map navigation is now described. At decision step 1720, it is determined whether or not the user is commanding a zoom in or zoom out. If not, processing continues at step 1730. If so, as shown in step 1725, such zoom in or zoom out commands are effected. Processing continues at decision step 1730. At decision step 1730, it is determined whether or not the user is commanding a scroll east, west, north or south. If not, processing continues at decision step 1740. If so, as shown in step 1735, such scroll east, west, north, or south commands are effected. Processing then continues at decision step 1740.

Event manipulation is now described. At decision step 1740 it is determined whether a location is deleted from the map or not. If so, the deletion is effected as shown in step 1745 and processing continues at decision step 1750. Otherwise processing simply continues at decision step 1750. For example, if a map displaying and highlighting both Baltimore, Md. and Camden, N.J. is displayed, and the user decides that they want to visit the Baltimore aquarium but not the Camden aquarium, the user can delete the marker at Camden, N.J. on the map. At decision step 1750, it is determined whether not the user is commanding an event to be moved, such as with a mouse drag for example, on the map or not. If so, such a move is effected in step 1755 and the process 1525' is terminated via the return node 1760. Otherwise, the process 1525' is simply terminated via the return node 1760. For example, if the user has deleted Camden but later decides to visit the Camden aquarium instead of the Baltimore aquarium, they can drag the marker from Baltimore to Camden. In an alternative embodiment, rather than having a single map in which the user can zoom and pan, a fixed set of maps may be used by the map window 220.

Recall from FIG. 15 that the calendar view manager (Recall process 858 of FIG. 8) may be invoked at step 1535. FIG. 18 is a flow diagram of an exemplary process 1535' for managing the calendar. Basically, the calendar management process 1535' permits (a) the events to be moved on the calendar, (b) events to be deleted from the calendar, and (c) the duration of events to be lengthened or shortened on the calendar. First, as shown in decision step 1810, it is determined whether a given interval on the calendar is active or not. An interval may become active when the cursor is located, or hovers, over it. If not, the process 1535' is terminated via return node 1870. If so, processing continues to decision step 1820.

At decision step 1820, it is determined whether or not the user is commanding to lengthen the active interval, for example by an outward mouse drag when the cursor is at an edge of the interface. More specifically, when an interval is active, "handles" may be rendered at its left and right edges. (Recall handles 244a and 244b of FIG. 3.) If the user lengthens the duration of the interval, using the edge handles for example, the interface is lengthened as shown in step 1825 and processing continues at decision step 1830. Otherwise, processing simply continues at decision step 1830. At decision step 1830, it is determined whether or not the user is commanding to shorten the active interval, for example by an inward mouse drag when the cursor is at an edge of the interface. If so, the interface is shortened as shown in step 1835 and processing continues at decision step 1840. Otherwise, processing simply continues at decision step 1840.

At decision step 1840, it is determined whether or not the user is commanding the active interval to be deleted, for example by pressing a delete button or by dragging the interval to a trash icon. If so, the interval is removed from the calendar as shown in step 1845 and processing continues at step 1850. Otherwise processing simply continues at step 1850.

At decision step 1850, it is determined whether or not the user is commanding to move the active interval, by a mouse drag when the cursor is at the center of the interval for example. More specifically, when an interval is active, a drag "handle" may be rendered on it. (Recall handle 243 of FIG. 3.) If so, the interval is moved as shown in step 1855 and processing continues at decision step 1860. Otherwise, processing simply continues at decision step 1860.

At decision step 1860 it is determined whether or not the user enters a date. If so, the calendar is generated with the entered date depicted as shown in step 1862 and a query, based on the entered date, may be generated in step 1864, before the process 1535' is terminated via return node 1870. Alternatively, or in addition, if a note (or other piece of information of an event) is active, a mouse drag input on an unoccupied dates of the calendar will generate an interval related to the event. Otherwise, the process 1535' is simply terminated via the return node 1870.

Recall the calendar window 240 may have a number of alternative trip plans 242. Therefore intervals may be moved or copied from one alternative to one or more other alternatives, and an interval deleted, lengthened or shortened in one alternative will not affect an interval to the same event in one or more other alternatives. Note, however, that when an interval is automatically generated, such as when a date factoid is found in information returned in response to a query, all of the calendar alternatives may be updated to include the event. If an interval is manually entered in one calendar alternative, copies may be provided to the other calendar alternatives if the dates in question are otherwise unoccupied.

Recall from FIG. 13 that visual links (Recall process 860 of FIG. 8) may be generated between windows at step 1314. FIG. 19 is a flow diagram of an exemplary process 1314' for generating such visual links. Basically, for each event, a visual link is generated between information in each window related to the event. Recall from FIG. 12 that each event has a corresponding record 1210. Beginning at step 1910, since all events are to processed, an event count (E_CT) is initialized (set to 1). Next, as shown in step 1920, a visual link, such as a colored (which may match the color stored in field 1218) translucent ray for example, is generated from the event (marker) on the map window 220 (the location of which is stored in field 1214) to the event on the calendar window 240 (the location of which is stored in field 1212). Since the calendar window 240 may include multiple alternatives 242 which include intervals related to the event, the visual link is terminated at the relevant interval in an active or selected one of the calendar alternatives. Next, as shown in step 1930, a visual link, such as a colored translucent ray for example, is generated from the event (marker) on the map window 220 to the event on the information browser window (the location of which is stored in field 1216). Thereafter, the event count (E_CT) is incremented at step 1940. Next, as step 1950 it is determined whether all of the events have been processed (E_CT>MAX). If so, the process 1314' exits via return node 1960. If not, processing continues at step 1920 at which the next event is processed.

Recall from FIG. 13 that if a particular window is in the focus view state, then the window is displayed in focus view (Recall process 870 of FIG. 8) at step 1318. FIG. 20 is a flow diagram of an exemplary process 1318' for generating such focus views. Recall that a particular window can be brought into focus view in one of three ways; (i) if a window is maximized, (ii) if a WIM representation of the window is clicked, or (iii) if a flicking gesture is input when another window is in focus view. Accordingly, at decision step 2010 it is determined whether or not a window was maximized, for example by the user clicking its maximize (214, 224, 234, or 244) button. If so, that window is shown head on and enlarged (i.e., in the focus view) as shown in step 2015 (Recall FIGS. 3, 4A, 4B, 5A, 5B, 6A, and 6B.) and processing continues to decision step 2020. Otherwise, processing simply proceeds directly to decision step 2020.

At decision step 2020, it is determined whether the user selected a representation of a window in the WIM tool 3456. If so, that window is shown in the focus view as shown in step 2025 and processing continues to decision step 2030. Otherwise, processing simply continues directly to decision step 2030.

Finally, at decision step 2030, it is determined whether a flicking (up, down, left or right) gesture was input the by user. If so, the window above, below, to the left of, or to the right of the previous window in focus view is brought into focus view and the process 1318' is terminated via return node 2040. (Recall focus view update process 880 of FIG. 8.) The transition may be accompanied by a transition animation. Otherwise, the process 1318' is simply terminated directly via return node 2040.

Having described the methodologies that may be used by the present invention, alternative displays are now introduced in § 4.2.6 below.

§ 4.2.6 Alternative Displays and Alternative Windows

FIG. 21A is portion of an alternative display 2100 in which the locations 2122 of events on a map window 2120 are associated with the intervals related to the events on a calendar window 2140 by means of translucent arcs 2150. Note that the calendar window 2140 may use a "perspective wall" metaphor as discussed § 1.2.2.1 above. A thumb wheel tool 2162 is used to select various alternative trip plans. As shown, bar meters enable a user to quickly discern a trip alternative's cost 2164, fun factor 2166 (for example, how many desired events will actually be accomplished by a given trip plan alternative) and time 2168.

FIG. 21B is a similar display, but further conveys travel periods and relates such travel periods to routes on a map. More specifically, a time period $T_{SA}$ corresponds to a travel route from Seattle to location A, a time period $T_{AB}$ corresponds to a travel route from location A to location B, and a time period $T_{BC}$ corresponds to a travel route from location B to location C. Note that the travel periods may be indicted with a car (or plane or train or boat) icon 2170. Note further that the travel periods on the calendar are black since each of these times will typically correspond to time between "events", rather than an event itself. The locations of events on the map window are associated with the intervals related to the events on a calendar window by means of colored, perspective view ladders 2150. Finally, buttons 2184 and 2182 may be used to progress or backtrack, respectively, through a trip. FIG. 21C is a display 2100″ similar to that 2100′ of FIG. 21B but which associates the locations of events on the map window with the intervals related to the events of the calendar window by means of colored, translucent rays 2150′.

FIG. 22 is another alternative display having a map window 2220, a calendar time line 2240, and information 2230 in the form of web pages. The information may represent the desired events. The pages of information are arranged on the calendar time line 2240 and are visually linked, via lines 2150, to markers 2222 on the map window 2220. The depth of each page may be used to represent the duration of the event, depicted on the web page, on the timeline.

FIG. 23A is an alternative calendar window 2340 in which multiple trip alternatives 2341 are depicted. In this alternative calendar window 2340, ambiguity or uncertainty with respect to time is indicated by "washed out" color on an event interval. Elements 2343 and 2345 depict events with certain durations. Elements 2342 and 2345 depict travel "legs" (which may be temporally between events or destinations for example) of known durations. Element 2346 depicts a discrete event to occur at an uncertain time, while element 2347 depicts a discrete event to occur at a known time. Finally, element 2348 depicts an event having a known start time but an unknown end time, while element 2349 depicts an event having unknown start and end times.

FIG. 23B is a table 2380 of graphical representations that may be used to depict common combinations of time-slot status and event, destination, or travel-leg status in the calendar of FIG. 23A. Generally, the upper visual representation represents the duration of an event, destination, or travel leg, while the lower bar represents the available slot of time in the trip, within which an event, destination, or travel-leg may take place. More specifically, the columns of the table 2380 represent a time (e.g., a date and time), and the rows of the table 2380 represent duration.

Rows 2391 and 2394 include representations that depict events, destinations, or travel legs having fixed durations. Rows 2392 and 2395 include representations that depict events, destinations, or travel legs having uncertain durations. Row 2393 includes representations that depict events, destinations, or travel legs that occur almost instantaneously, that is, having a duration of about zero (0).

Column 2381 includes representations that depict events, destinations, or travel legs having known start and end times. Column 2382 includes representations that depict events, destinations, or travel legs having known start times but uncertain end times. Column 2383 includes representations that depict events, destinations, or travel legs having uncertain start times but known end times. Column 2384 includes representations that depict events, destinations, or travel legs having uncertain start and end times. Column 2385 includes representations, similar to those of column 2382, but in which the known start time has been fixed. Column 2386 includes representations, similar to those of column 2383, but in which the known end time has been fixed.

FIG. 24 is an alternative display having a map window 2420 on which routes 2424 of alternative trip plans are depicted. The lines 2422 at the markers are used to distinguish one alternative route from another. The duration of segments of the trip are indicated by the spacing of the lines 2422—the denser the display of the lines 2422, the longer the duration of the segment.

FIG. 25 is another alternative display having a facetted cylindrical calendar (each of the facets of the facetted cylinder, not shown, contains one of various alternative trip plans) 2540 which may be rotated to bring various trip plan alternatives to the fore. The map window 2520 includes lines 2522 which indicate travel between events.

FIG. 26 is yet another alternative display having a map window 2620, a calendar time line 2640, and event representations 2610 (spherical markers). Lines 2650 may visually link some of the events 2610 to the calendar time line 2640 and the map window 2620. Some events 2610 are not associated with the time-line 2640 or the map 2620. Note that event 2610′ has three alternative 2660 dates—(i) Saturday, (ii) Sunday and Monday, or (iii) Monday and Tuesday.

FIG. 27 is still another alternative display having a map window 2720, events 2710, and a calendar window 2730. Again, lines 2750 visually link an event 2710 with related date and location information. The projection from each event 2710 to the time-line 2730 indicates when the event occurs.

FIG. 28 is an another alternative display. Rather than faces of a cube, the windows 2812 are shown as facets of a geometric object 2810. A world-in-miniature (or "WIM") tool 2820 is provided to assist in navigating the facets of the geometric object 2810, particularly when a window is in focus view.

FIG. 29 is yet another alternative display 2900 which depicts a first person view of a trip. Events 2910 are marked in the display. A user can progress forward in space 2942 or back in space 2944 from one location to another. Indications of event locations that are not immediately viewable in the visible portion of the map may be provided. Finally, indications of event locations that are "behind" the virtual location and orientation of the user may be provided. Such indications allow the user to easily shift their view to event locations that are not currently in the field-of-view. A calendar time line 2940 is also provided.

FIG. 30 is still another alternative display in which events are shown as disks 3012 having map views on a face. A window 3040 may include a calendar time line. The thickness of the disks indicates the duration of the event. A route 3050, which may be flattened in a focus view, indicates a route from a destination of a first event to a destination of a temporally adjacent event. In this alternative display, the route is represented as a flexible ribbon 3050. The start of the flexible ribbon 3050 is attached to a start disk 3012 corresponding to a location at the start of the trip. Similarly, the end of the flexible ribbon 3050 is attached to an end disk 3012 corresponding to a location at the end of the trip. Thus, if the ribbon 3050 and disks 3012 were laid out on a flat surface, the alignment of each piece would correspond to its location on a traditional flat projection map.

FIGS. 31A and 31B are views of a display 3100 depicting alternative event and map views. More specifically, in this case, events are depicted pictorially, rather than textually. The map 3110 includes markers 3120 related to locations of the events. A pictorial representation 3130 of the event is displayed adjacent to an associated marker 3120. A route 3140 between events is also depicted. A user can navigate through their trip, traveling along the route 3140.

FIG. 32 is a display 3200 depicting alternative map and calendar views. More specifically, areas 3220 centered on the locations of events on a map 3210 are brightened. A translucent rod 3240 connects the map location of each event to a corresponding time length box 3250. The time length boxes 3250 are projected onto a plan 3257 as shadows 3255. The shadows 3255 may be labeled with corresponding days of the week as shown.

Finally, FIGS. 33A and 33B are views of a display 3300 having alternative map, calendar, and event views. As was the case with the display 3200 of FIG. 32 in the display 3300, areas 3320 centered on the locations of events on a map 3310 are brightened. (FIGS. 33A and 33B are alternatives that superimpose route indications on a map.) A translucent wall 3360 has a base which follows a route between the locations of events on the map 3310. A height of the wall 3360 corresponds to the length of time into the trip. This height value may be continuous as shown or may be quantized to days, hours, minutes or seconds, for example. The exact time is indicated by the segment's projection onto the time-line surface 3257. The translucent wall is projected onto a longitude-calendar (or alternatively latitude-calendar) plane 3367 to form projection 3365. The longitude-calendar (or latitude-calendar) plane 3367 may have horizontal lines corresponding to days. Further, vertical lines, corresponding the longitude (or latitude) of the location of the events may be provided on the longitude-calendar (or latitude-calendar) plane 3367. As can be appreciated, predominately east-west travel is best projected onto a longitude-calendar plane 3367, while predominately north-south travel is best projected onto a latitude-calendar plane (now shown).

In this example, the events are represented pictorially rather than textually. The pictorial representations 3330 of the events may be arranged on parallel projections from the longitudinal locations of the events on the map.

§ 4.3 Conclusions

In view of the foregoing, the present invention provides a user interface for facilitating a decision making process, such as planning a trip. The present invention provides a unified view of various types of information related to an event. The unified view may be presented in a simulated three-dimensional environment. A window showing a particular type of information may be brought into a focus view for closer inspection by a user. Alternative decisions may be depicted to permit vagueness or uncertainty, particularly at early iterations in the decision making process.

Although the described embodiments concern a user interface for planning a trip, the present invention can be applied to other decision making processes. Although the information related to an event were described as free form textual notes, a map, a calendar, and an Internet browser, other types of information related to an event may be depicted. For example, pictorial representations of events may be used instead of, or in addition to the free form textual notes. (Recall FIGS. 31A, 31B, 33A and 33B.) Also, a list of contacts, "to do" notes, scheduled appointments, etc., associated with an Outlook™ application or documents associated with a Word application (both from Microsoft Corporation of Redmond, Wash.) can be browsed or searched rather than, or in addition to, web pages on the Internet. Further, although events were entered in free form textual notes and queries for related information were launched based on the contents of such notes, information can be entered and queries launched based on information from any of the windows. For example, a user can enter a marker on the map, and a query can be launched based on the location of the marker on the map. Thus, the present invention is not intended to be limited to the embodiments described above

What is claimed is:

1. A man-machine interface method for assisting a user in a decision making process, for use with a machine having a video monitor device and a user input device, the man-machine interface method comprising:
   accepting a decisional event from the user input device, the decisional event utilized as a basis to query one or more external or internal data sources to gather first and second information related to the decisional event, the decisional event employed to determine a state of a man-machine interface;
   generating a three-dimensional display for output on the video monitor device where the determined state is a standby state, the display including
       a first window displaying first information of a first type, the first information being related to the decisional event, and
       a second window displaying second information of a second type, the second information being related to the decisional event; and
   generating a visual indicator that associates the first information of the first window and the second information of the second window.

2. The man-machine interface method of claim 1, the display generated simulates a three-dimensional environment in which the first and second windows reside.

3. The man-machine interface method of claim 2, the first and second windows are represented as sides of an unfolded geometric object.

4. The man-machine interface method of claim 2, the first and second windows are represented as sides of an unfolded cube.

5. The man-machine interface method of claim 2, each of the first and second windows include a maximize button,
   when the maximize button of the first window is selected, a display having the first window, arranged in normal, head-on, view, is generated, and
   when the maximize button of the second window is selected, a display having the second window, arranged in normal, head-on, view, is generated.

6. The man-machine interface method of claim 1, the visual indicator is selected from at least one of a colored line, a colored ray, and a colored arc.

7. The man-machine interface method of claim 6, the visual indicator is translucent.

8. The man-machine interface method of claim 1, the first window includes alternative representations of the first information, each of which is related to the decisional event.

9. The man-machine interface method of claim 8, the first window depicts a calendar having a number of alternative time sequences, the alternative representations of the first information may be an alternative time duration on each of the alternative time sequences.

10. The man-machine interface method of claim 1 further comprising:
forming a search query based, at least in part, on contents of the decisional event.

11. The man-machine interface method of claim 10, the search query is further based, at least in part, on a user profile.

12. The man-machine interface method of claim 10 further comprising:
returning a result of the search query;
determining whether the result includes any information of the first type or of the second type; and
if the result includes any information of the first type, generating a visual representation of such information on the first window, and if the result includes any information of the second type, generating a visual representation of such information on the second window.

13. The man-machine interface method of claim 1, the first window is a bulletin board, and
a note, having contents entered by a user, is arranged on the bulletin board and defines the decisional event.

14. The man-machine interface method of claim 1, the first window is a map, and
a place of the map related to the decisional event includes a marker.

15. The man-machine interface method of claim 14, the marker is a colored circle.

16. The man-machine interface method of claim 15, the marker is translucent.

17. The man-machine interface method of claim 15, the second window is a bulletin board, and
a note, having contents entered by a user, is arranged on the bulletin board, defines the decisional event and has a color which matches the color of the marker.

18. The man-machine interface method of claim 1, the first window is an information browser.

19. The man-machine interface method of claim 18 further comprising:
forming a search query based, at least in part, on contents of the decisional event.

20. The man-machine interface method of claim 19, the search query is further based, at least in part, on a user profile.

21. The man-machine interface method of claim 19 further comprising:
submitting the search query to the information browser;
returning a result of the search query;
determining whether the result includes any information of the second type; and
if the result includes any information of the second type, generating a visual representation of such information on the second window.

22. The man-machine interface method of claim 21, the information browser is selected from at least one of a browser for browsing HTML pages, a browser for browsing documents, a browser for browsing databased files, a browser for browsing a schedule, a browser for browsing a to do list, and a browser for browsing contacts.

23. The man-machine interface method of claim 21, the second window is a map, and the information of the second type includes places and addresses.

24. A man-machine interface for assisting a user in a decision making process, for use with a machine having a video monitor device and a user input device, the man-machine interface comprising:
a standby state in which a display including a simulated three dimensional environment having
a first window displaying first information of a first type, the first information defining an aspirational event utilized to automatically acquire first and second information related to the aspirational event from the Internet or local data sources, and
a second window displaying second information of a second type, the second information being related to the aspirational event and is generated for rendering on the video monitor device, the first information in the first window and the second information in the second window associated via a visual link;
a first window update state during which the user can update the first window by entering commands via the user input device;
a second window update state during which the user can update the second window by entering commands via the user input device;
a first window focus view state in which a display including the first window, arranged in a normal head-on view, is generated for rendering on the video monitor device; and
a second window focus view state in which a display including the second window, arranged in a normal head-on view, is generated for rendering on the video monitor device.

25. The man-machine interface of claim 24, when in the standby state,
if a first user command is received from user input device, the first window update state is entered,
if a second user command is received from user input device, the second window update state is entered,
if a third user command is received from user input device, the first window focus view state is entered, and
if a fourth user command is received from the user input device, the second window focus view state is entered.

26. The man-machine interface of claim 25, the first user command is locating a cursor over the first window, the second user command is locating a cursor over the second window, the third user command is clicking a maximize button of the first window, and the fourth user command is clicking a maximize button of the second window.

27. The man-machine interface of claim 25, each of the first window focus view state and the second window focus view state include a world-in-miniature tool which includes a representation of the standby state.

28. The man-machine interface of claim 25, when in the first window focus view state,
if a first user command is received from the input device, the standby state is entered, and
if a second user command is received from the input device, the second windows focus view state is entered.

29. The man-machine interface of claim 28, the first user command is a click on a minimize button on the first window and the second user command is a flicking gesture.

30. A method for managing a man-machine interface, including:
providing a first window for displaying first information of a first type, the first information being related to an inclinational event, the inclinational event generates a query utilized to collect at least first and second information related to the inclinational event from the Internet, and providing a second window for displaying second information of a second type, the second information being related to the inclinational event, for assisting a user in a decision making process, for use with a machine having a video monitor device and a user input device;

accepting user commands from the user input device;

updating states of the first and second windows based on the user commands accepted;

determining a state of the man-machine interface based on the user commands accepted; and if the state of the man-machine interface is a standby state, generating a display of a three dimensional environment including the first and second windows for rendering on the video monitor device, and generating a visual link from the first information in the first window to the second information in the second window if the state of the man-machine interface is a first window focus view state, generating a display of the first window in a normal, head on, view, and if the state of the man-machine interface is a second window focus view state, generating a display of the second window in a normal, head on, view.

31. The method of claim 30, updating states of the first and second windows based on the user commands accepted includes:

generating an query based on at least one of the (a) the user inputs and (b) a user profile;

processing the query to generate a return; and determining whether the return includes information of the first type or information of the second type, if the return includes information of the first type, the first window is updated, and if the return includes information of the second type, the second window is updated.

32. The method of claim 30, the first window is a bulletin board, and the updating states of the first and second windows based on the user commands accepted includes:

determining whether a cursor is on the first window and if so, determining whether a note creation command was entered and if so, accepting text via the user input device;

determining whether a note edit command was entered and if so, editing a note based on entries from the user input device;

determining whether a note posting command was entered and if so, generating a query based on the contents of the note, processing the query to generate a return, and determining whether the return includes an information of the second type and if so, updating the second window; and determining whether a note move command was entered and if so, updating a location of the note on the bulletin board.

33. The method of claim 32, the note creation command is a mouse click when a cursor is located over an empty part of the bulletin board, the note edit command is a mouse click when a cursor is located over an existing note on the bulletin board, a note posting command is a flicking gesture, and a note move command is a mouse drag.

34. The method of claim 32, if one of a note creation command and a note edit command is entered displaying the note in a normal, head on, view in a foreground of the three dimensional environment.

35. The method of claim 30 the first window is a map, the map includes a marker at a location associated with the inclinational event, and the updating states of the first and second windows based on the user commands accepted includes:

determining whether a cursor is on the first window and if so, determining whether a marker delete command is entered and if so, deleting the marker from the map, and determining whether a marker move command is entered and if so, moving the marker on the map.

36. The method of claim 35, if a marker move command is entered, the inclinational event is updated to reflect its new location.

37. The method of claim 30, the first window is a calendar, the calendar includes a number of alternative time lines, the calendar includes an interval at a data associated with the inclinational event, in each of the alternative time lines, and the updating states of the first and second windows based on the user commands accepted includes:

determining whether a cursor is on the first window and if so, determining a selected one of the alternative time lines, determining whether an interval in the selected one of the alternative time lines is subject to a move command and if so, moving the interval, determining whether an interval in the selected one of the alternative time lines is subject to a lengthen command and if so, lengthening the duration of the interval, determining whether an interval in the selected one of the alternative time lines is subject to a shorten command and if so, shortening the duration of the interval, determining whether an interval in the selected one of the alternative time lines is subject to a deletion command and if so, deleting the interval, and determining whether an interval creation command is entered and if so, generating an interval in at least the selected one of the alternative time lines.

38. The method of claim 30, if the state of the man-machine interface is the standby state, and if the first window is maximized, the first window focus view state is entered, and if the state of the man-machine interface is the standby state, and if the second window is maximized, the second window focus view state is entered.

39. The method of claim 30, if the state of the man-machine interface is the first window focus view state, and if the first window is minimized, the standby state is entered, and if the state of the man-machine interface is the first window focus view state, and if a flicking gesture is entered, the second window focus view state is entered.

40. A system for assisting a user in a decision making process, the system comprising:

an input facility for accepting user inputs;

a processing facility for:

accepting user inputs from the input facility, the user inputs used to access a plurality of external informational resources to produce a plurality of information related to a desirous event;
determining the desirous event based on user inputs from the input facility;
determining first information of a first type, the first information being related to the desirous event;
determining second information of a second type, the second information being related to the desirous event;
determining a first window including a visual representation of the first information;
determining a second window including a visual representation of the second information, the visual representation of the first information included in the first window and the visual representation of the second information included in the second window associated via a visual indicator;
generating a simulated three dimensional environment;
determining a display state based on user inputs from the input facility; and
generating video outputs including:
the first and second windows arranged in the simulated three dimensional environment when a first display state is determined, the first display state being a standby state;
the first window, in a normal, head on, view when a second display state is determined; and
the second window, in a normal, head on, view when a third display state is determined; and
a video monitor unit for rendering the video outputs generated by the processing facility.

41. The system of claim 40, the processing facility further updates states of the first and second windows based on the user commands accepted by the input facility.

42. The system of claim 41, the processing facility updates states of the first and second windows by:
generating an query based on at least one of the user inputs and a user profile;
processing the query to generate a return; and
determining whether the return includes information of the first type or information of the second type, if the return includes information of the first type, the first window is updated, and if the return includes information of the second type, the second window is updated.

43. The system of claim 41, the first window is a bulletin board, and the processing facility updates states of the first and second windows by:
determining whether a cursor is on the first window and if so,
determining whether a note creation command was entered and if so, accepting text via the user input device,
determining whether a note edit command was entered and if so, editing a note based on entries from the user input device;
determining whether a note posting command was entered and if so,
generating a query based on the contents of the note,
processing the query to generate a return, and
determining whether the return includes any information of the second type and if so, updating the second window; and
determining whether a note move command was entered and if so, updating a location of the note on the bulletin board.

44. The system of claim 43, the note creation command is a mouse click when a cursor is located over an empty part of the bulletin board,
the note edit command is a mouse click when a cursor is located over an existing note on the bulletin board,
a note posting command is a flicking gesture, and
a note move command is a mouse drag.

45. The system of claim 43, if one of a note creation command and a note edit command is entered, the note is displayed, on the video monitor, in a normal, head on, view in a foreground of the three dimensional environment.

46. The system of claim 41, the first window is a map,
the map includes a marker at a location associated with the desirous event, and
the processing facility updates states of the first and second windows by:
determining whether a cursor is on the first window and if so,
determining whether a marker delete command is entered and if so, deleting the marker from the map, and
determining whether a marker move command is entered and if so, moving the marker on the map.

47. The system of claim 46, if a marker move command is entered, the processing facility updates the desirous event to reflect its new location.

48. The system of claim 41, the first window is a calendar,
the calendar includes a number of alternative time lines,
the calendar includes an interval at a date associated with the desirous event, in each of the alternative time lines, and
the processing facility updates states of the first and second windows by:
determining whether a cursor is on the first window and if so,
determining a selected one of the alternative time lines,
determining whether an interval in the selected one of the alternative time lines is subject to a move command and if so, moving the interval,
determining whether an interval in the selected one of the alternative time lines is subject to a lengthen command and if so, lengthening the duration of the interval,
determining whether an interval in the selected one of the alternative time lines is subject to a shorten command and if so, shortening the duration of the interval,
determining whether an interval in the selected one of the alternative time lines is subject to a deletion command and if so, deleting the interval, and
determining whether an interval creation command is entered and if so, generating an interval in at least the selected one of the alternative time lines.

49. A tangible medium storing or communicating machine readable instructions which, when executed by a machine, performs:
accepting an expectational event from the user input device;
employing the expectational event to ascertain a state of a man-machine interface;

querying at least one internal data source and the Internet to access at least first information of a first type and second information of a second type related to the expectational event; and based on the ascertained state being a standby state, generating a three-dimensional display environment for output on the video monitor device, the display environment including a first window displaying first information of a first type, the first information being related to the expectational event, and a second window displaying second information of a second type, the second information being related to the expectational event; and utilizing a visual link between the first information of the first type displayed in the first window and the second information of the second type displayed in the second window.

\* \* \* \* \*